(12) United States Patent
Ogata et al.

(10) Patent No.: US 6,617,982 B1
(45) Date of Patent: Sep. 9, 2003

(54) OPERATING DEVICE

(75) Inventors: Hiroki Ogata, Chiba (JP); Kazusato Tagawa, Chiba (JP); Hiroyuki Nakazawa, Chiba (JP); Youtaro Sakakura, Fukushima (JP); Koji Mita, Fukushima (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/553,635

(22) Filed: Apr. 20, 2000

(30) Foreign Application Priority Data

Apr. 23, 1999 (JP) ............................. P11-117101
Sep. 11, 1999 (JP) ............................. P11-297203
Dec. 24, 1999 (JP) ............................. P11-367067

(51) Int. Cl.[7] ............................................. H03M 11/00
(52) U.S. Cl. ........................ 341/34; 341/20; 341/22; 345/161; 345/168; 345/157
(58) Field of Search ............................. 341/20, 22, 34; 345/161, 168, 157

(56) References Cited

U.S. PATENT DOCUMENTS

| | | | | |
|---|---|---|---|---|
| 4,680,577 A | * | 7/1987 | Straayer et al. ............. 345/160 |
| 5,049,079 A | | 9/1991 | Furtado et al. ............. 434/253 |
| 5,278,557 A | * | 1/1994 | Stokes et al. ................. 341/34 |
| 5,521,596 A | * | 5/1996 | Selker et al. ................. 341/22 |
| 5,675,329 A | * | 10/1997 | Barker et al. ................. 341/22 |
| 5,714,981 A | | 2/1998 | Scott-Jackson et al. ..... 345/161 |
| 5,923,317 A | | 7/1999 | Sayler et al. ............... 345/156 |
| 5,995,026 A | * | 11/1999 | Sellers ......................... 341/34 |
| 6,040,823 A | * | 3/2000 | Seffernick et al. .......... 345/168 |

FOREIGN PATENT DOCUMENTS

| | | |
|---|---|---|
| JP | 02082818 | 3/1990 |
| JP | 04305725 | 10/1992 |
| TW | 288636 | 6/1995 |

* cited by examiner

*Primary Examiner*—Michael Horabik
*Assistant Examiner*—Albert K. Wong
(74) *Attorney, Agent, or Firm*—Lerner, David, Littenberg, Krumholz & Mentlik, LLP

(57) ABSTRACT

It is an object of the present invention to allow both a digital operation and an analog operation by using pressing operation continuously.

An operating device has detecting elements (e.g., pressure-sensitive elements (12)) for outputting analog signals according to pressing operations of operators (11), and is configured such that analog signals output from the detecting elements are subjected to level dividing by a level dividing unit (15) and converted into multi-bit digital signals corresponding to the output levels thereof by an A/D converting unit (16), and is also configured so as to output single-bit digital signals according to change in analog signals output from the detecting element. A switching unit (18) outputs one or the other of the multi-bit digital signals and single-bit digital signals.

15 Claims, 53 Drawing Sheets

FIG. 20
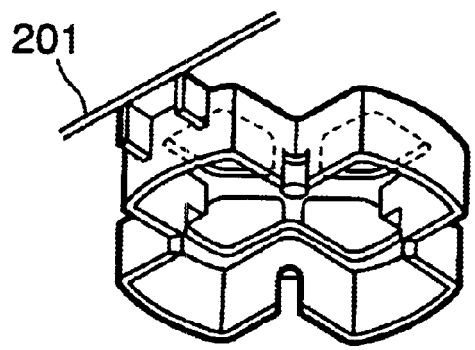
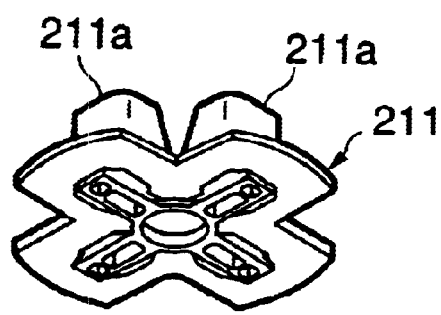
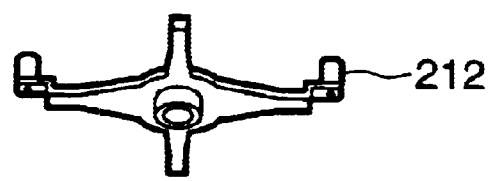
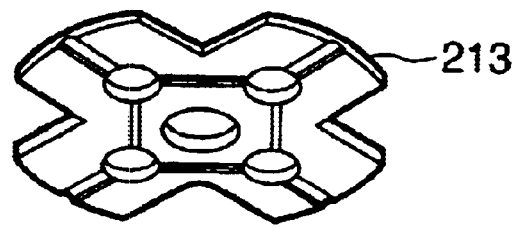

OPERATING DEVICE

BACKGROUND OF THE INVENTION

1. Field of the Invention

The present invention relates to an operating device (also called a "controller") used as peripheral equipment for entertainment apparatuses such as video game apparatuses and the like.

2. Description of the Related Art

Generally, with entertainment apparatuses such as video game apparatuses and the like, various operations are executed using an operating device. Accordingly, multiple operating buttons are provided on the operating device, and the user controls the entertainment apparatus by operating these buttons in various ways, thereby moving a character displayed on a television set, for example.

Conventionally, many of such operating devices have been configured with a cross-shaped or round direction indicating operating button positioned on the left side of the front thereof, and multiple multi-purpose buttons on the right side of the front thereof.

These indicating operating buttons and multi-purpose buttons are configured of tact switches of rubber switches, and characters are digitally moved or the states of characters are digitally changed by performing on/off operation of these switches.

As described above, with conventional entertainment apparatuses, the direction indicating operating buttons and the multi-purpose buttons only have functions for digitally changing characters displayed on a television set, so the movement and state change of characters become non-continuous, and thus there has been the problem of being jerky when viewed.

In order to solve this problem, with the game apparatus operating device disclosed in Japanese Unexamined Patent Application Publication No. H7-88252 adds analog input devices configured of a trackball, joystick, etc., so that the character displayed on the display screen of the television set can be controlled in an analog manner. Another example of conventional art with such an analog input device added is disclosed in Japanese Unexamined Patent Application Publication No. 11-90042.

However, the operability of analog input devices configured of a trackball, joystick, etc., differs greatly from that of the above described direction indicating operating buttons and multi-purpose buttons, so it takes time for users who are accustomed to using the direction indicating operating buttons and multi-purpose buttons to thoroughly learn how to operate such analog input devices, which could greatly diminish the enjoyment of the entertainment apparatus for which was intended.

SUMMARY OF THE INVENTION

The present invention has been made in light of such aspects, and accordingly, it is an object thereof to enable digital operating and analog operating, using pressure-operated operators used in conventional digital operating.

In order to achieve the above object, the operating device according to the present invention comprises: an operator operable by pressing; a detecting element for outputting analog signals corresponding to the pressing operation of the operator; first digital signal output means for converting analog signals output from the detecting element corresponding to the pressing operation of the operator into digital signals comprising multiple bits according to the output level thereof; second digital signal output means for outputting digital signals comprising single bit according to change in the analog signals output from the detecting element; and switching means for switching output between digital signals output from the first digital signal output means and digital signals output from the second digital signal output means.

According to the configuration of the present invention, with a single operator pressing operation, a digital signal comprising multiple bits enabling analog control is output from the first digital signal output means, and on the other hand a digital signal comprising a single bit enabling digital control is output from the second digital signal output means. Accordingly, arranging such that these digital signals are selected and output by switching means realizes digital operation and analog operation with a single operator.

Now, the detecting element may be a pressure-sensitive element placed at a position where pressing force acting upon the operator is transferred. Examples of such pressure-sensitive elements include resistor pressure-sensitive elements formed of pressure-sensitive electroconductive rubber. Hall devices or electrostatic device which output analog signals according to the pressing stroke of the operator may be applied, as well.

Also, the detecting element may comprise an electroconductive member which moves in conjunction with the operator and has elasticity, and a resistor placed at the position where the electroconductive member makes and breaks contact, wherein the resistor outputs analog signals according to the area of contact of the electroconductive member. Incidentally, the positional relationship of the electroconductive member and the resistor may be interchanged.

The electroconductive member preferably is of a configuration which deforms at the surface thereof facing the resistor according to the contact pressure applied thereupon with the resistor, such that the area of contact with the resistor changes, and may have forms such as the following:

(1) A mountain-shaped longitudinal-sectional form.

(2) A trapezoidal longitudinal-sectional form.

(3) A shape wherein the cross-sectional area becomes smaller in steps toward the apex facing the resistor.

(4) The surface facing the resistor has a spherical shape.

On the other hand, the resistor may be formed so as to have a shape wherein the cross-sectional area thereof becomes smaller toward the apex facing the electroconductive member. Also, the resistor may be configured so as to divide the contact area of the electroconductive member into a plurality of contact areas by gaps, and to increase in steps the contact area of the electroconductive member in conjunction with the deformation thereof.

On the other hand, according to a second aspect of the present invention, an operating device comprises: an operator operable by pressing; a detecting element for outputting analog signals corresponding to the pressing operation of the operator; first digital signal output means for converting analog signals output from the detecting element corresponding to the pressing operation of the operator into digital signals comprising multiple bits according to the output level thereof; a digital switch for turning on and off according to the pressing operation of the operator; second digital signal output means for detecting the on/off state of the digital switch and outputting digital signals comprising single bits; and switching means for switching output between digital signals output from the first digital signal output means and digital signals output from the second digital signal output means.

With the configuration of this aspect of the present invention as well, with a single operator pressing operation, a digital signal comprising multiple bits enabling analog control is output from the first digital signal output means, and on the other hand a digital signal comprising a single bit enabling digital control is output from the second digital signal output means. Accordingly, arranging such that these digital signals are selected and output by switching means realizes digital operation and analog operation with a single operator.

Now, though according to one aspect of the present invention both multiple-bit digital signals and single-bit digital signals are generated from analog signals output from the detecting element, according to another aspect of the present invention the multiple-bit digital signals are be generated from analog signals output from the detecting element while the single-bit digital signals are output by detecting the on/off state of a digital switch.

Also, with the operating device according to the present invention, the digital switch may be configured containing first and second fixed terminals, and an electroconductive movable member which makes and breaks contact with the first and second fixed terminals in conjunction with movement of the operator.

Also, in the above aspects, the first digital signal output means may comprise: level dividing means for dividing into a plurality of levels the output level of analog signals output from the detecting element in conjunction with the pressing operation of the operator, and A/D converting means for converting the analog signals into digital signals, according to each output level divided by the level dividing means. Thus, multiple-bit digital signals can easily be output based on the output level of analog signals output from the detecting element.

Now, the level dividing means preferably uniformly divides into a plurality of levels the output level of the analog signals output from the detecting element in conjunction with the pressing operation of the operator. Uniformly dividing the output level of the analog signals output from the detecting element can provide natural and smooth operability to be obtained which corresponds to the pressing force applied by the operator.

BRIEF DESCRIPTION OF THE DRAWINGS

FIG. 20 is an exploded, perspective view illustrating a configuration example of a first operating unit according to the first embodiment;

FIGS. 44A–44D are diagrams illustrating a variation example of the detecting element, wherein FIG. 44A is a frontal cross-sectional view of the operating unit including the detecting element;

FIG. 44B is a frontal view of the electroconductive member;

FIG. 44C is a view of the electroconductive member from below; and

FIG. 44D is a characteristic diagram for analog signals output from the output terminal of the resistor;

FIGS. 45A–45D are diagrams illustrating another variation example of the detecting element, wherein FIG. 45A is a frontal cross-sectional view of the operating unit including the detecting element;

FIG. 45B is a frontal view of the electroconductive member;

FIG. 45C is a view of the electroconductive member from below; and

FIG. 45D is a characteristic diagram for analog signals output from the output terminal of the resistor;

FIGS. 46A–46D are diagrams illustrating another variation example of the detecting element, wherein FIG. 46A is a frontal cross-sectional view of the operating unit including the detecting element;

FIG. 46B is a frontal view of the electroconductive member;

FIG. 46C is a view of the electroconductive member from below; and

FIG. 46D is a characteristic diagram for analog signals output from the output terminal of the resistor;

FIGS. 47A–47D are diagrams illustrating another variation example of the detecting element, wherein FIG. 47A is a frontal cross-sectional view of the operating unit including the detecting element;

FIG. 47B is a frontal view of the electroconductive member;

FIG. 47C is a view of the electroconductive member from below; and

FIG. 47D is a characteristic diagram for analog signals output from the output terminal of the resistor;

FIGS. 48A–48D are diagrams illustrating another variation example of the detecting element, wherein FIG. 48A is a frontal cross-sectional view of the operating unit including the detecting element;

FIG. 48B is a frontal view of the electroconductive member;

FIG. 48C is a view of the electroconductive member from above; and

FIG. 48D is a characteristic diagram for analog signals output from the output terminal of the resistor;

FIGS. 49A–49D are diagrams illustrating another variation example of the detecting element, wherein FIG. 49A is a frontal cross-sectional view of the operating unit including the detecting element;

FIG. 49B is a frontal view of the electroconductive member;

FIG. 49C is a view of the electroconductive member from above; and

FIG. 49D is a characteristic diagram for analog signals output from the output terminal of the resistor;

FIGS. 50A–50D are diagrams illustrating another variation example of the detecting element, wherein FIG. 50A is a frontal cross-sectional view of the operating unit including the detecting element;

FIG. 50B is a frontal view of the electroconductive member;

FIG. 50C is a view of the electroconductive member from above; and

FIG. 50D is a characteristic diagram for analog signals output from the output terminal of the resistor;

FIGS. 51A–51D are diagrams illustrating another variation example of the detecting element, wherein FIG. 51A is a frontal cross-sectional view of the operating unit including the detecting element;

FIG. 51B is a frontal view of the electroconductive member;

FIG. 51C is a view of the electroconductive member from above; and

FIG. 51D is a characteristic diagram for analog signals output from the output terminal of the resistor;

FIGS. 52A–52D are diagrams illustrating another variation example of the detecting element, wherein FIG. 52A is a frontal cross-sectional view of the operating unit including the detecting element;

FIG. 52B is a plan view of the resistor;

FIG. 52C is a plan view of another example of the form of the resistor; and

FIG. 52D is a plan view of yet another example of the form of the resistor; and

DESCRIPTION OF THE PREFERRED EMBODIMENTS

The embodiments of the present invention will hereinafter be described with reference to the drawings.

The operating device according to the embodiment of the present invention is connected to a video game apparatus serving as an entertainment apparatus, and is capable of digital or analog control of characters displayed on the display screen of a television set.

Overview of the Device

Figure 1:
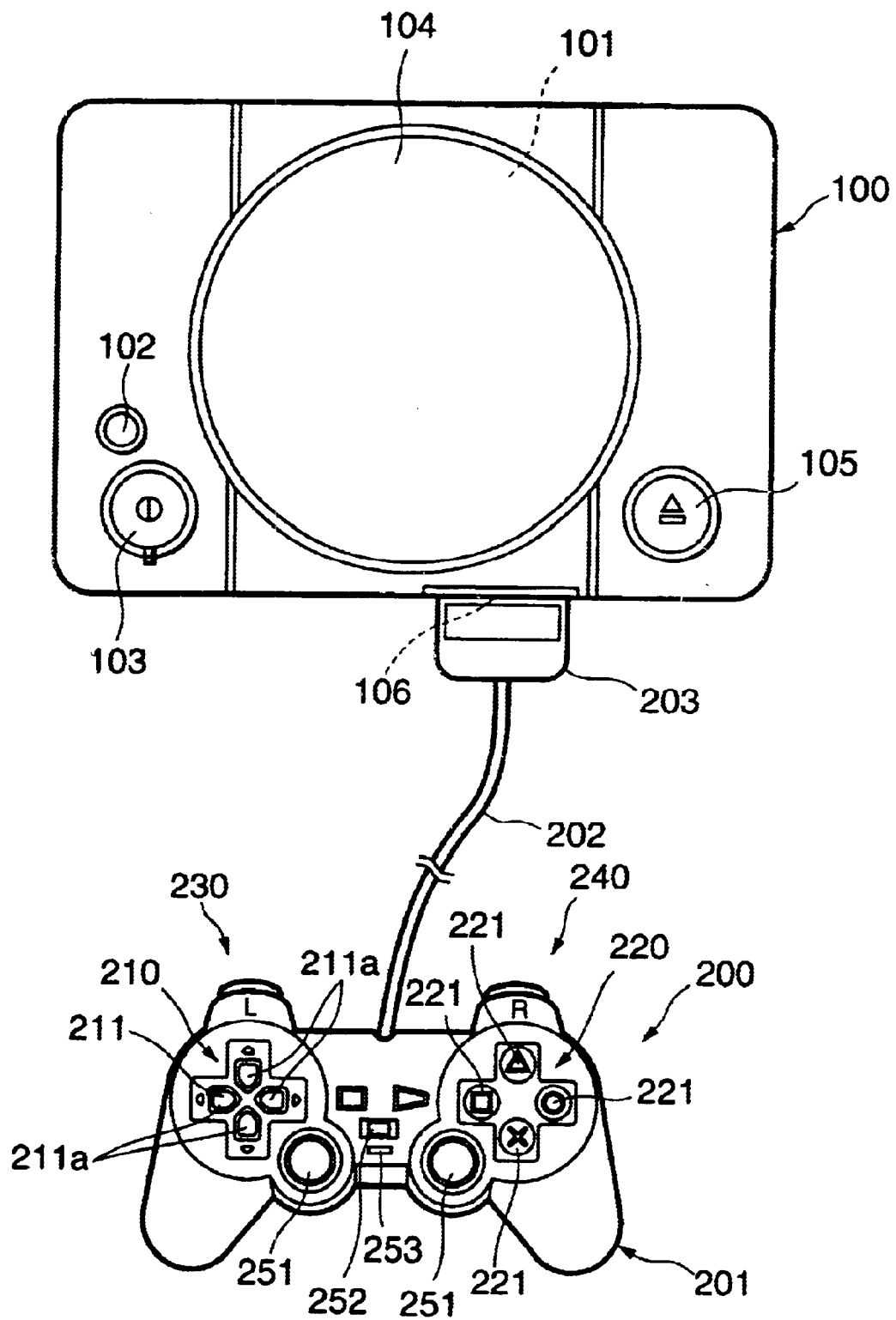
FIG. 1 is a plan view illustrating the overview of a video game apparatus with which the operating device according to an embodiment of the present invention is used.

FIG. 1 is a plan view illustrating the overview of a video game apparatus with which the operating device according to an embodiment of the present invention is used. As shown in the FIG. 1, the video game apparatus has a main game unit 100 connected to a television set to be used as a display, and an operating device 200 connected to the main game unit 100.

Built into the main game unit 100 are a disk driving unit 101 for reproducing optical disks upon which game programs are recorded, an image processing device for displaying characters along with background screens on the screen of the television set according to the game programs recorded on the optical disks, and so forth. Also provided in the main game unit 100 are a reset switch 102 for resetting a game in play, a power source switch 103, and a lid opening operation button 105 for opening the lid 104 which opens and closes the disk mounting unit for the disk driving unit 101.

Connection of the operating device 200 to the main game unit 100 is made through a connecting cord 202 extended from the main device unit 201. A connector 203 is provided in the tip of the connecting cord 202, and the operating device 200 is connected to the main game unit 100 by connecting this connector 203 into a jack 106 provided in one side of the main game unit 100.

Figure 2:
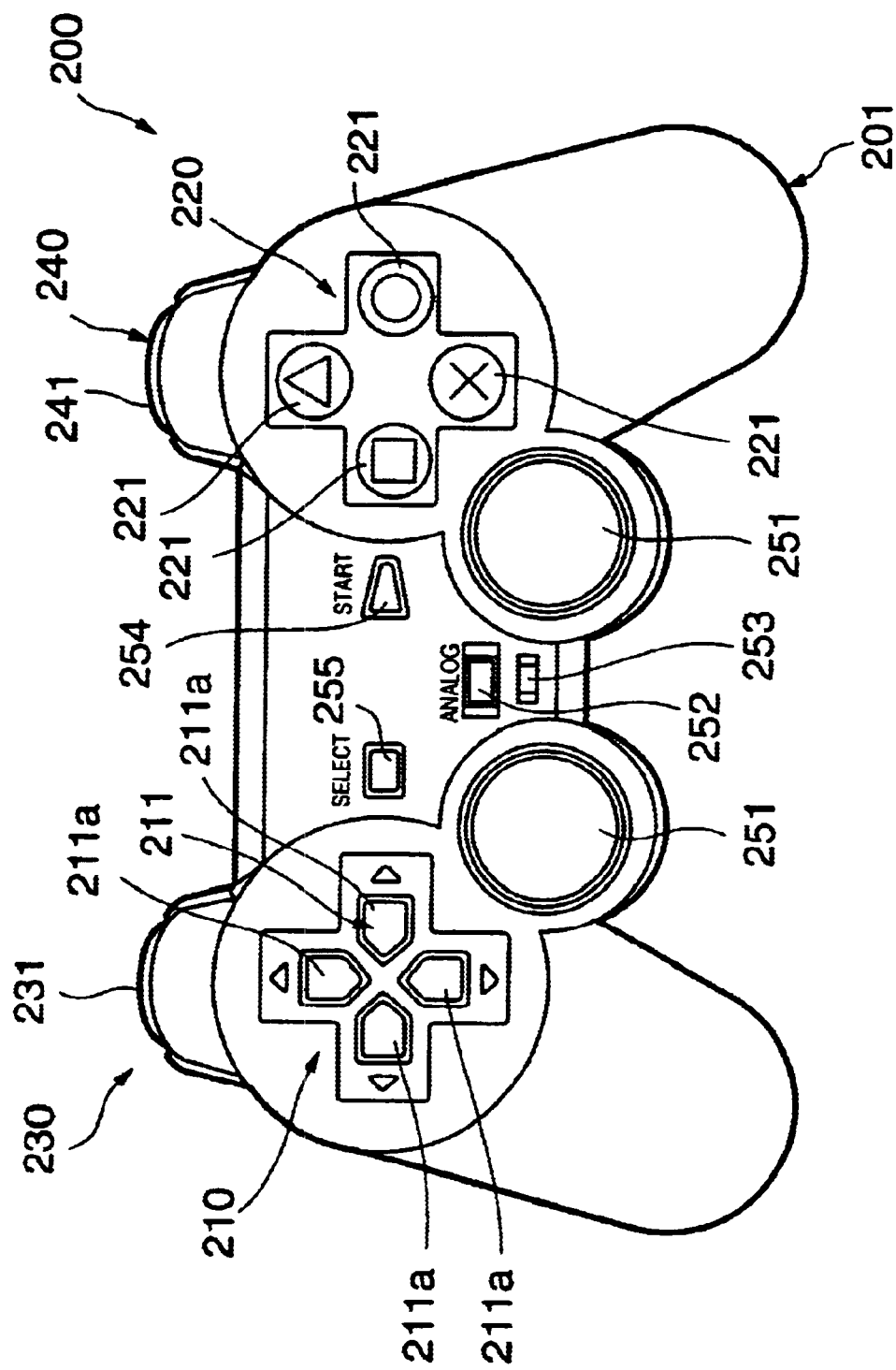
FIG. 2 is an enlarged plan view of the operating device shown in FIG. 1.

FIG. 2 is a plan view illustrating the exterior of the operating device 200. Provided in the main device unit 201 of the operating device 200 are first and second operating units 210 and 220 on the upper surface thereof, and third and fourth operating units 230 and 240 on the side thereof.

The first operating unit 210 has a cross-shaped operating member 211 for operating by pressing, with operating keys 211a forming operators extending in the four directions from this operating member 211. This first operating unit 210 is for providing motion to characters displayed on the screen of the television set, and has functions of moving the character vertically and horizontally by pressing the operating keys 211a of the operating member 211.

The second operating unit 220 has four cylindrical operating buttons 221 (operators) for operating by pressing. Each operating button 221 has identification marks such as "○", "Δ", "□", and "X" inscribed on the top portion thereof, so that each operating button 221 can be easily identified. The functions of the second operating unit 220 are set by the game program recorded in the optical disk, e.g., functions for changing the state of the game character are assigned to each operating button 221. For example, functions for moving the character's left arm, right arm, left leg, and right leg, are assigned to the operating buttons 221.

The third and fourth operating units 230 and 240 have generally the same structure, and each has two vertically arrayed operating buttons 231 and 241 (operators) for operating by pressing. The functions of the third and fourth operating units 230 and 240 are also set by the game program recorded in the optical disk, e.g., functions are assigned for special motions of the game character.

Further, a joystick 251 for performing analog operations is provided in the main device unit 201 shown in FIG. 2. The user switches between the joystick 251 and the first and second operating units 210 and 220 to enable use of one or the other. This switching is performed by an analog selection switch 252 provided in the main device unit 201. Once the joystick 251 is selected, the display unit 253 provided on the main device unit 201 is lit, indicating the state of the joystick 251 having been selected.

Also provided in the main device unit 201 are a start switch 254 for instructing the start of the game, a selection switch 255 for selecting the difficulty and the like of the game at the time of starting the game, and so forth.

First Embodiment

Next, the configuration of the first embodiment of the present invention will be described in detail.

Figure 3:
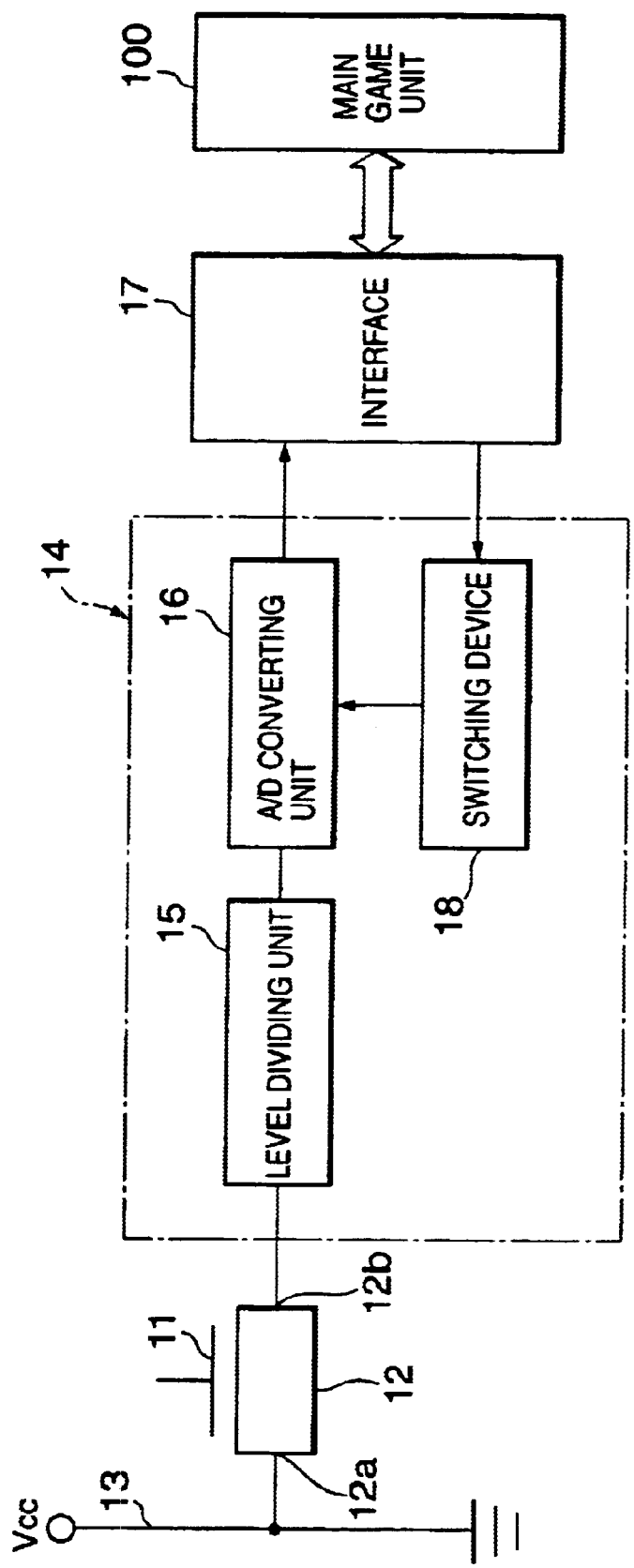
FIG. 3 is a block diagram illustrating the principal portions of the operating device according to a first embodiment of the present invention.

FIG. 3 is a block diagram illustrating the principal components of the operating device according to the first embodiment of the present invention.

The operating units 210, 220, 230, and 240 of the operating device 200 described above include the operating keys 211a of the operating member 211 and the operating buttons 221, 231, and 241 making up the operators 11, and pressure-sensitive elements 12 (detecting elements).

The pressure-sensitive element 12 may be formed of pressure-sensitive electroconductive rubber, and is of a configuration wherein electrodes 12a and 12b are formed at the two edge portions at symmetrical positions. One electrode 12a is connected to the power supply line 13, and a predetermined voltage is applied thereto from the electric power source (Vcc). The electrical resistance value between the electrodes 12a and 12b changes according to the magnitude of pressure applied on the pressure-sensitive element 12.

Figure 4:
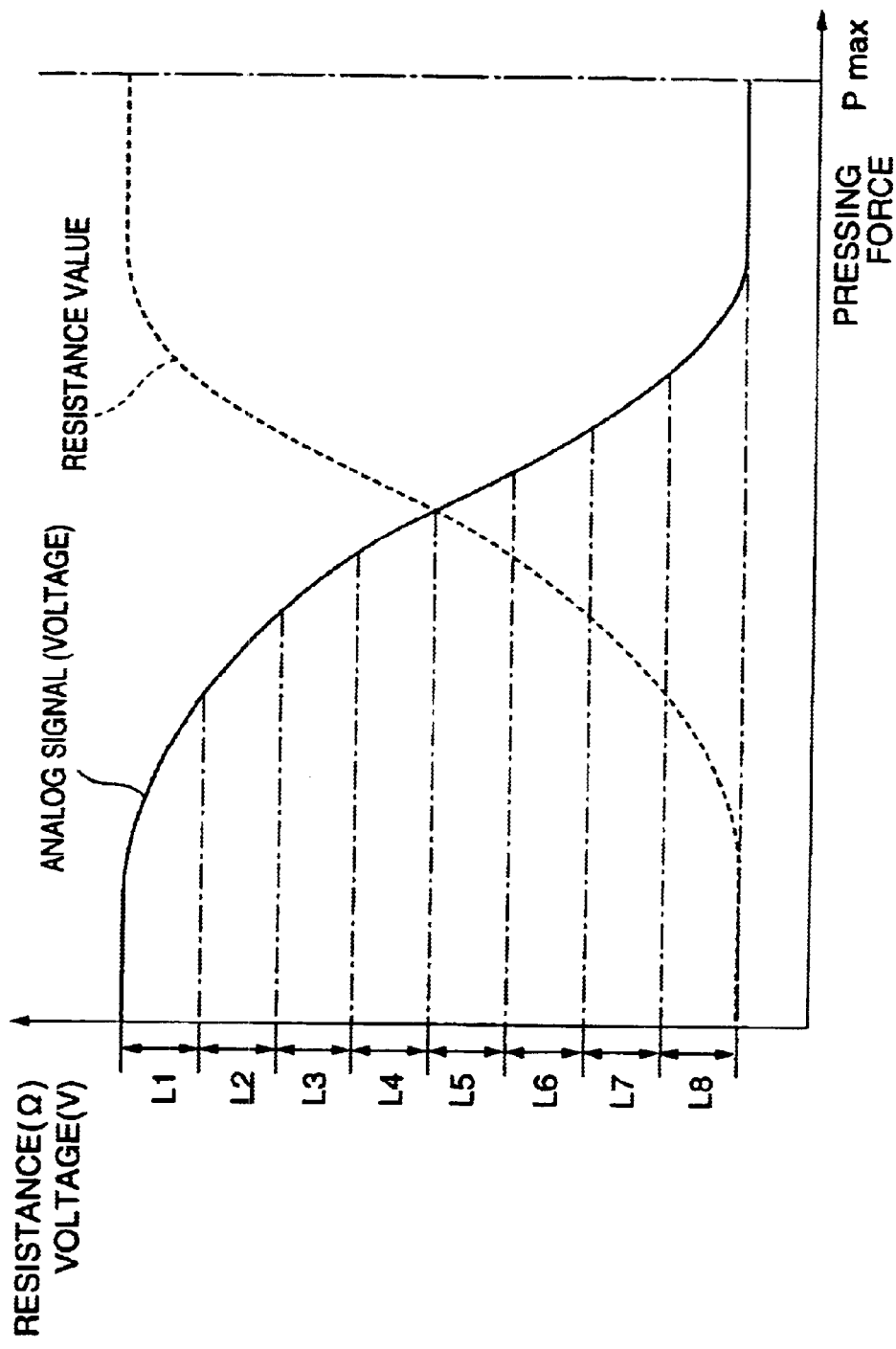
FIG. 4 is a diagram illustrating the properties of the pressure-sensitive element shown in FIG. 3.

Generally, the pressure-sensitive element 12 formed of pressure-sensitive electroconductive rubber exhibits lowest resistance values in a state where there is no pressure force applied thereupon, as indicated by the broken line in FIG. 4, and the resistance values increase as the pressure force applied thereto increases. Accordingly, as illustrated by the solid line in FIG. 4, the other electrode 12b outputs analog signals (voltage) which are greatest in a state where there is no pressure force applied, and the analog signals (voltage) output decrease as the pressure force increases.

The pressure-sensitive element 12 is positioned on the depressing path of the operator 11, and as the user performs a pressing operation with the operator 11, the resistance value changes under the pressure force, and analog signals corresponding to the pressure force are output to the electrode 12b side.

Also, a microprocessor unit (hereafter abbreviated as "MPU") 14 for governing the operating device 200 is provided in a board within. This MPU 14 comprises the functions of a level dividing unit (LS) 15 for dividing the output level of the analog signal output from the pressure-sensitive element 12 into multiple levels, an A/D converting unit 16 for converting analog signals output from the pressure-sensitive element 12 into digital signals according to the output levels divided by the level dividing unit 15, and a later-described switching device 18, with the electrode 12*b* of the pressure-sensitive element 12 connected to the input side of the level dividing unit 15.

As shown in FIG. 4, the level dividing unit 15 has the basic functions of dividing the level range of analog signals (voltage) that have been present, in uniform widths. The number of divisions can be set arbitrarily, and in the examples shown in FIG. 4, the level range of the analog signals (voltage) is uniformly divided into eight Each of the individual output levels L1 through L8 thus uniformly divided are transferred to the A/D converting unit 16. Incidentally, the level range of analog signals which are uniformly divided by the level dividing unit 15 can be arbitrarily changed.

The A/D converting unit 16 converts the analog signals into digital signals and outputs, according to the output level of the analog signals subjected to level dividing by the level dividing unit 15. That is, multi-bit digital signals are output from the A/D converting unit 16, according to the-above output levels L1 through L8. Now, the functions of the level dividing unit 15 and the A/D converting unit 16 will be described with a specific example. For example, let us say that the operating device 200 being driven with power source voltage of 3.5 V, and that analog signals output from the pressure-sensitive element 12 change within a range from 0 V to 2.4 V. In the event that the level dividing unit 15 divides the output level range 0 V to 2.4 V uniformly into eight steps, the level width for each step is 0.3 V.

Accordingly, the level dividing unit 15 performs level dividing so that output level of analog signals output from the pressure-sensitive element 12 of 2.4 V to 2.1 V is level 1 (L1), output level of 2.1 V to 1.8 V is level 2 (L2), output level of 1.8 V to 1.5 V is level 3 (L3), and so on through output level of 0.3 V to 0 V being level 8 (L8).

The A/D converting unit 16 appropriates appropriate multi-value digital signals to the output levels thus level-divided, and output these. Multiple-bit, e.g., 16-bit digital signals are appropriated to the above output levels, such that level 1 is "1f" in hexadecimal notation, level 2 is "3f", and so on through "ff" for level 8.

The multi-bit digital signals output from the A/D converting unit 16 are sent to the main game unit 100 via an interface 17 provided in the internal board of the operating device 200, and action and the like of the game character is executed based on these digital signals.

The level change of the analog signals output from the pressure-sensitive element 12 corresponds to the change in pressure force received from the operator 11 as described above. Accordingly, the multi-bit digital signals output from the A/D converting unit 16 correspond to the pressure force applied to the operator 11 by the user. Controlling the action and the like of the game character by such multi-bit digital signals related to the pressing operation by the user enable realization of movements smoother in analog fashion as compared to the control by single-bit digital signals of "1" or "0".

Also, with the present embodiment, the A/D converting unit 16 is configured to function also as single-bit digital signal output means for outputting single-bit (i.e., 1-bit) digital signals (that is, "1" or "0"), according to the change in analog signals output from the pressure-sensitive element 12, and outputs one or the other of the multi-bit digital signals and single-bit digital signals from the A/D converting unit 16 by a switching operation of the switching device 18.

With the present embodiment, the switching device 18 is controlled by control signals sent from the main game unit 100 based on game programs recorded in the optical disk. That is, control signals for instructing whether to cause the A/D converting unit 16 to function as means for outputting multi-bit digital signals or to function as means for outputting single-bit digital signals are output according to the contents of a game program being executed from an optical disk mounted in the main game unit 100. Based on these control signals, the switching device 18 selects and switches the functions of the A/D converting unit 16.

The A/D converting unit 16 follows the functions selected by the switching device 18, and converts the analog signals output from the pressure-sensitive element 12 into one or other of multi-bit digital signals or single-bit digital signals, and outputs the same. In the event that functioning as means for outputting multi-bit digital signals is selected, the output levels uniformly divided by the level dividing unit 15 as described above are converted into corresponding digital signals, and output to the main game unit 100. On the other hand, in the event that functioning as means for outputting single-bit digital signals is selected, single-bit digital signals of "1" or "0" output to the main game unit 100, according to the change in analog signals output from the pressure-sensitive element 12.

Incidentally, the switching device 18 may be configured so as to be switched by manual operations by the user. For example, an arrangement may be made wherein functions for switching the switching device 18 are appropriated to the analog selecting switch 252 provided in the operating device 200, so as to work the switching device 18 with manual operation of the switch 252, thereby switching the functions of the A/D converting unit 16.

Figure 5:
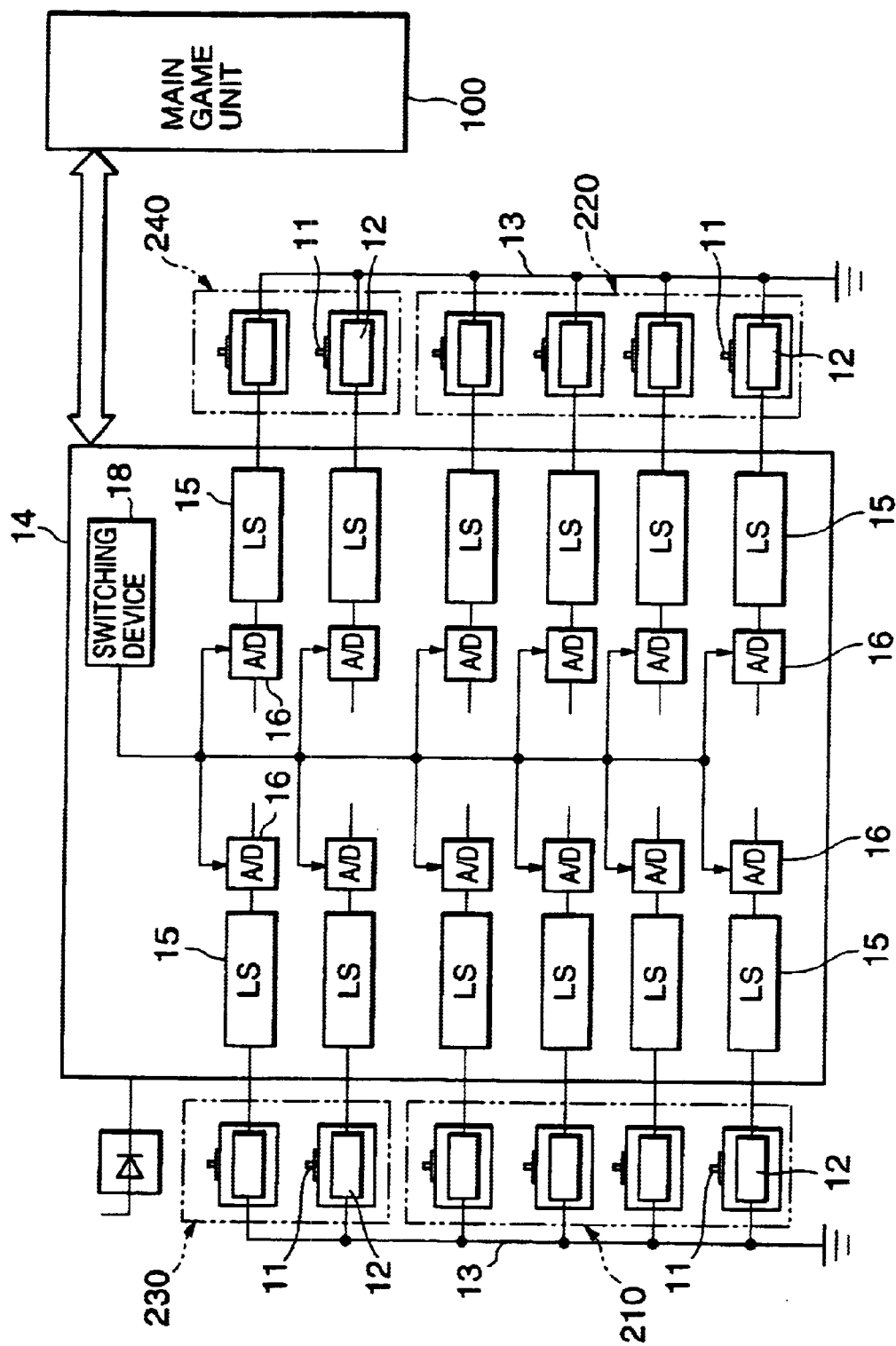
FIG. 5 is a block diagram illustrating an overall configuration example of the operating device according to the first embodiment of the present invention.

As shown in FIG. 5, in the present embodiment, the first through fourth operating units 210, 220, 230, and 240 have the configuration shown in FIG. 3. Accordingly, these operating units 210, 220, 230, and 240 have a configuration which can be used for digital operations and for analog operations. Incidentally, a configuration wherein only an arbitrarily selected operating unit or arbitrarily selected operating units of the first through fourth operating units 210, 220, 230, and 240 has or have the configuration shown in FIG. 3 is contemplated herein.

Now, as described above, the level dividing unit 15 uniformly divides the output level of analog signals output from the pressure-sensitive element 12 in preset ranges, but in the event that there is an offset between the level range of the analog signals (voltage) actually output from the pressure-sensitive element 12 and this set range, there may arise a situation wherein digital signals matching the operating state of the operator 11 cannot be output.

However, there are individual differences in the pressure-sensitive elements 12, and there is also irregularity in the power source voltage, so the output ranges of the analog signals output from the pressure-sensitive elements 12 provided in the operating units 210, 220, 230, and 240 of each operating device 200 also differ.

Accordingly, the operating device 200 according to the present embodiment is provided with a calibration function (division range setting means) for individually setting the output level ranges of analog signals divided by the level dividing unit 15.

Figure 6:
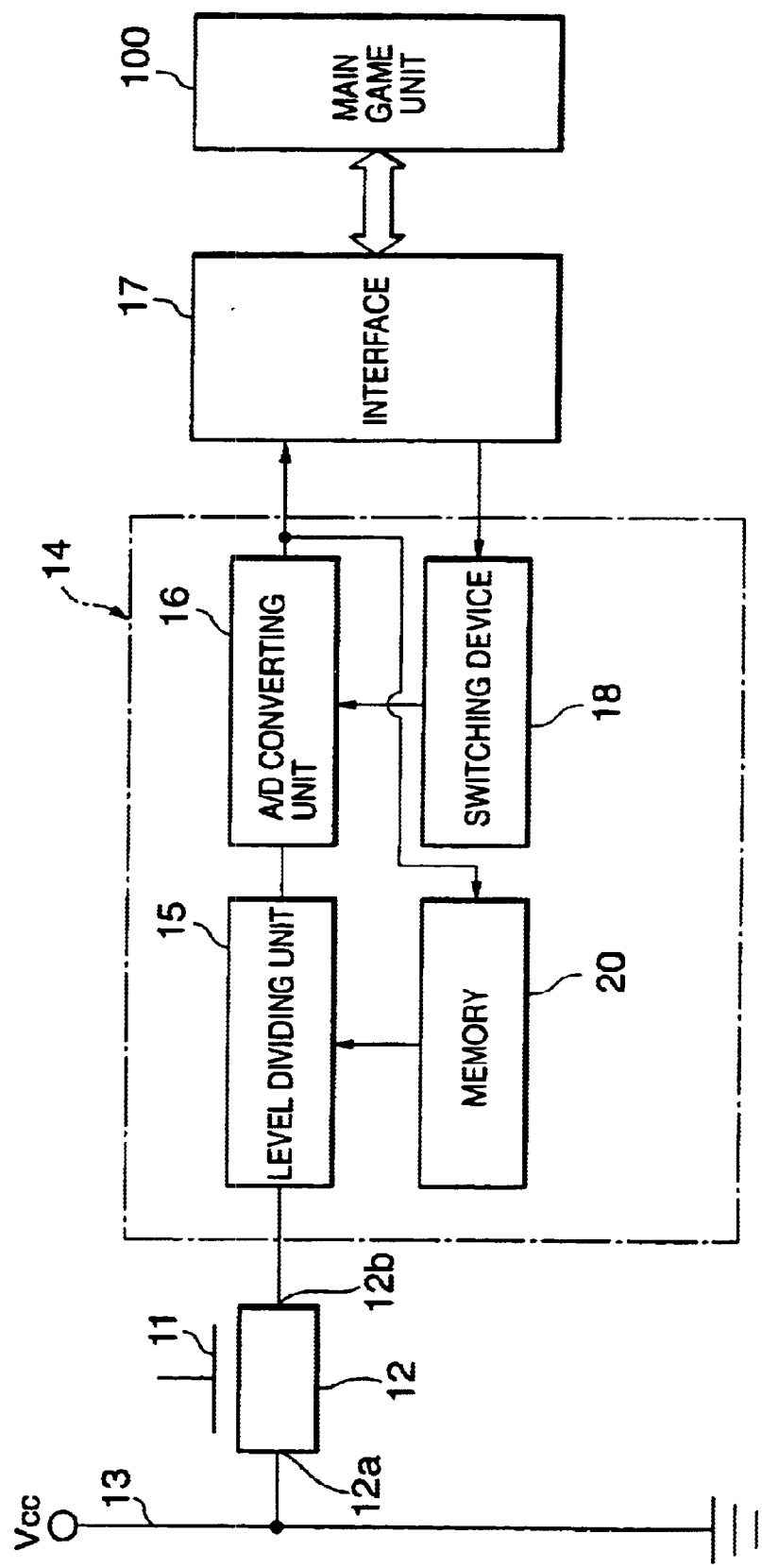
FIG. 6 is a block diagram illustrating a first configuration example for calibrating the level dividing unit.

FIG. 6 is a block diagram illustrating a first configuration example for performing calibration of the level dividing unit. With the configuration shown in the Figure, the MPU 14 is provided with memory 20, and the configuration of the memory 20 is such that the output level range of analog signals divided by the level dividing unit 15 is stored in this memory 20.

For example, at the manufacturing line of the operating device 200, a constant load such that the resistance value of the pressure-sensitive element 12 is maximal is applied to the operating device 200, and the output level of the analog signal output from the pressure-sensitive element 12 at that time is stored in the memory 20.

Making description based on the above-described specific example, it is assumed that the voltage level range 0 V through 2.4 V was set so as to be uniformly divided into eight steps, for the default value of the level dividing unit 15, and that an analog signal of 2.0 V was output from the pressure-sensitive element 12 at the time that the above constant load was applied, a digital signal "3f" corresponding to the level 2 is output from the A/D converting unit 16, as described above. This digital signal "3f" is stored in the memory 20, and the output range of the analog signals to be level-divided is adjusted by the level dividing unit 15, based on the setting value.

Incidentally, the digital signal "3f" is equivalent to the analog signal output level 2.1 V through 1.8 V, and it is preferable to stipulate beforehand to which voltage value within this range the setting is to be made to. For example, stipulation may be made beforehand so as to set the maximum voltage value of each output level (2.1 V in the above example) as the upper limit of the output level range of the analog signals to be divided by the level dividing unit 15.

Figure 7:
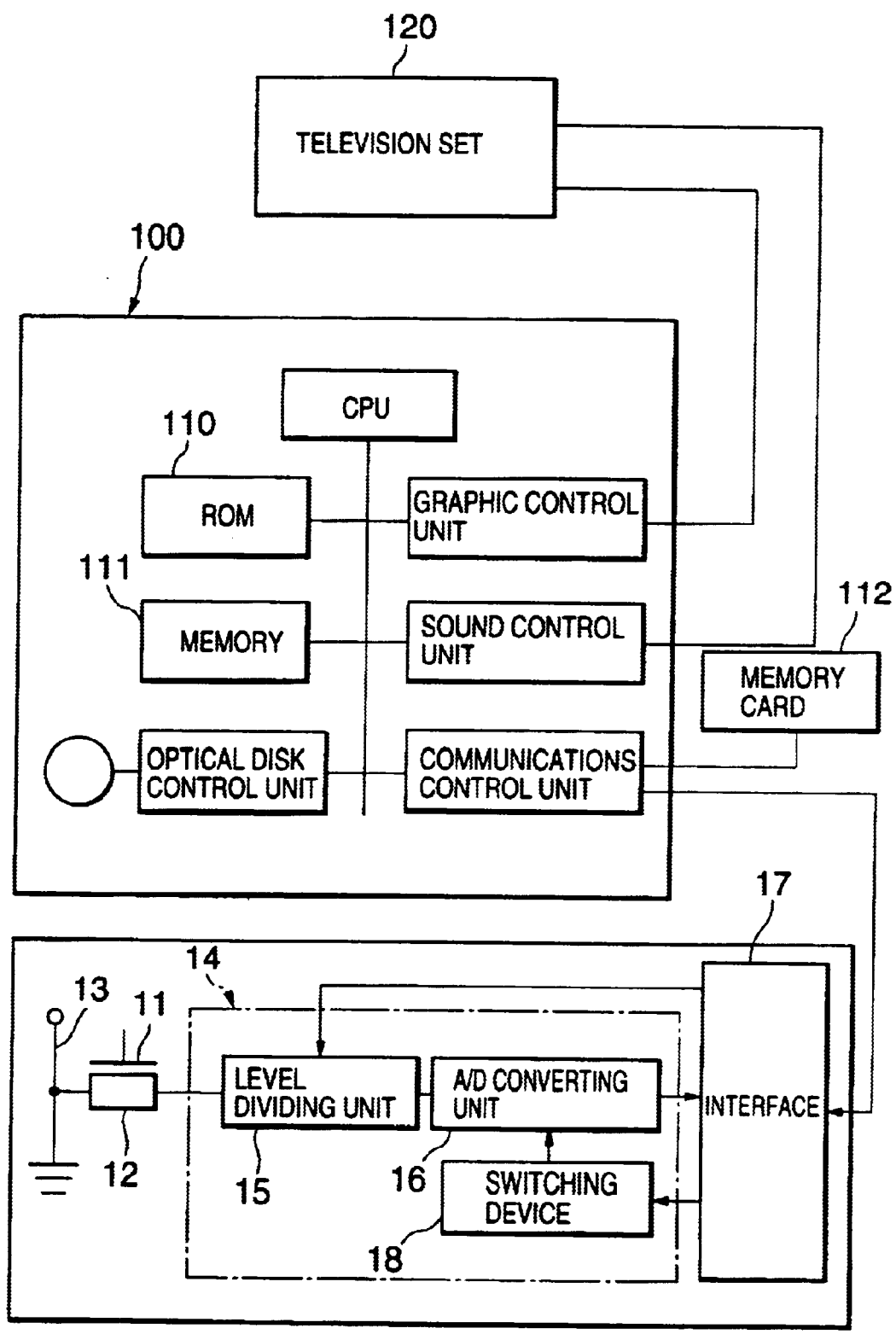
FIG. 7 is a block diagram illustrating a second configuration example for calibrating the level dividing unit.

FIG. 7 is a block diagram illustrating a second configuration example for performing calibration of the level dividing unit. With the configuration shown in the Figure, memory is not provided in the operating device 200, and instead the configuration is such that the output level range of analog signals which the level dividing unit 15 divides into is stored in built-in memory 111 in the main game unit 100 to which the operating device 200 is connected or in a detachable memory card 112.

In order to execute the calibration of the level dividing unit 15 using this configuration, a setting program for executing calibration is preferably assembled into the control program stored in the ROM 110 of the main game unit 100.

Figure 8:
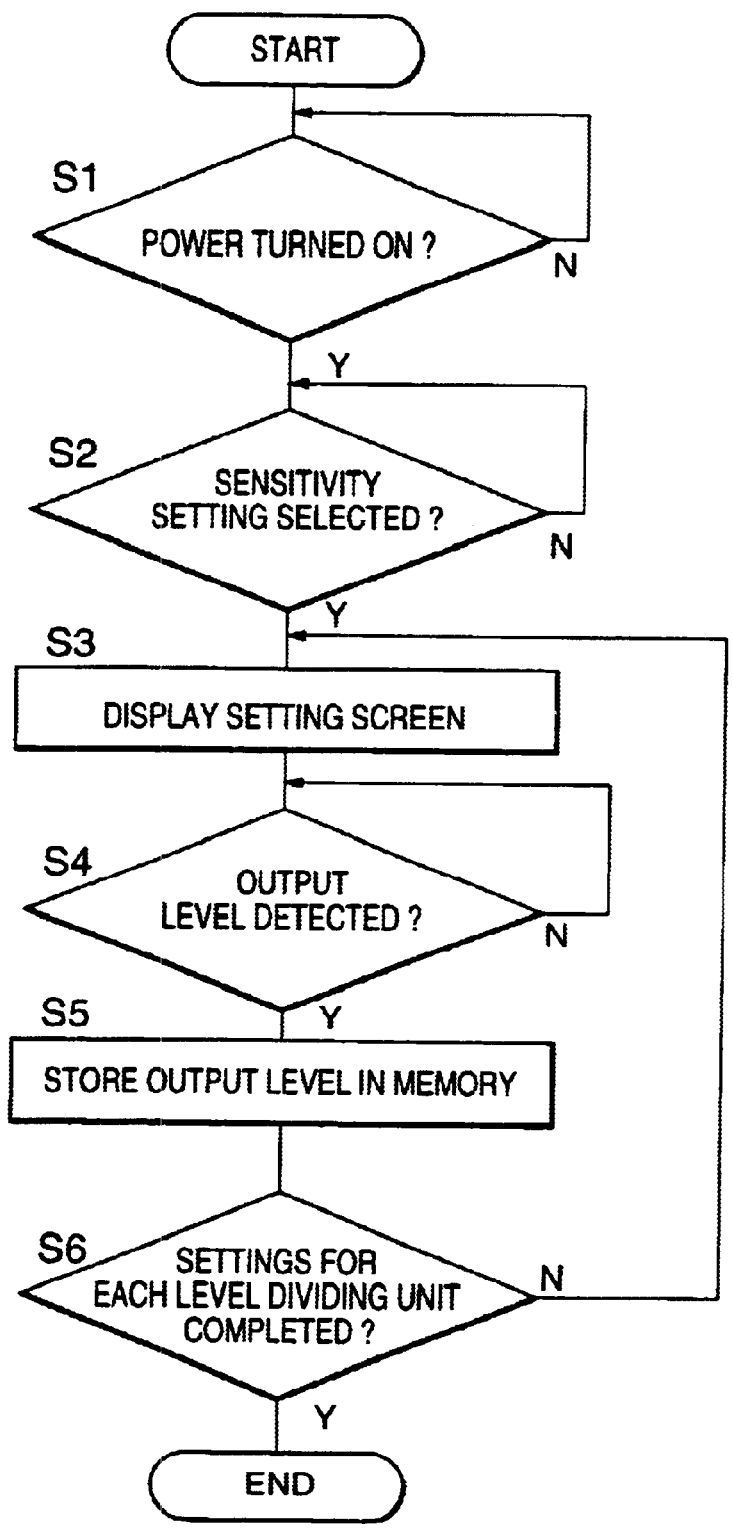
FIG. 8 is a flowchart illustrating an example of a setting program for the calibration, applied to the second configuration example shown in FIG. 7.

FIG. 8 is a flowchart illustrating an example of such a setting program.

First, the power of the main game unit 100 is turned on (S1), and the sensitivity setting (calibration) of the operating unit is selected by menu selection by the user (S2), whereby a setting screen is displayed on the television set 120 (S3). The setting screen displays a message prompting the user to firmly press the operator 11 provided in a certain operating unit, for example. When the user firmly presses the operator 11 according to this display, the output level of the analog signal from the pressure-sensitive element 12 detected at this time is output to the main game unit 100 (S4), and stored in the built-in memory 111 (S5). The above process is repeated for each level dividing unit 15 of the operating device 200 (S6), and the sensitivity setting for the operating unit is thus completed.

Each level dividing unit 15 provided in the operating device 200 adjusts the output level range of the analog signals to be divided, based on the set value stored in the built-in memory 111 in the main game unit 100.

Also, a setting program for executing the calibration operation may be assembled into the game program in the optical disk.

Figure 9:
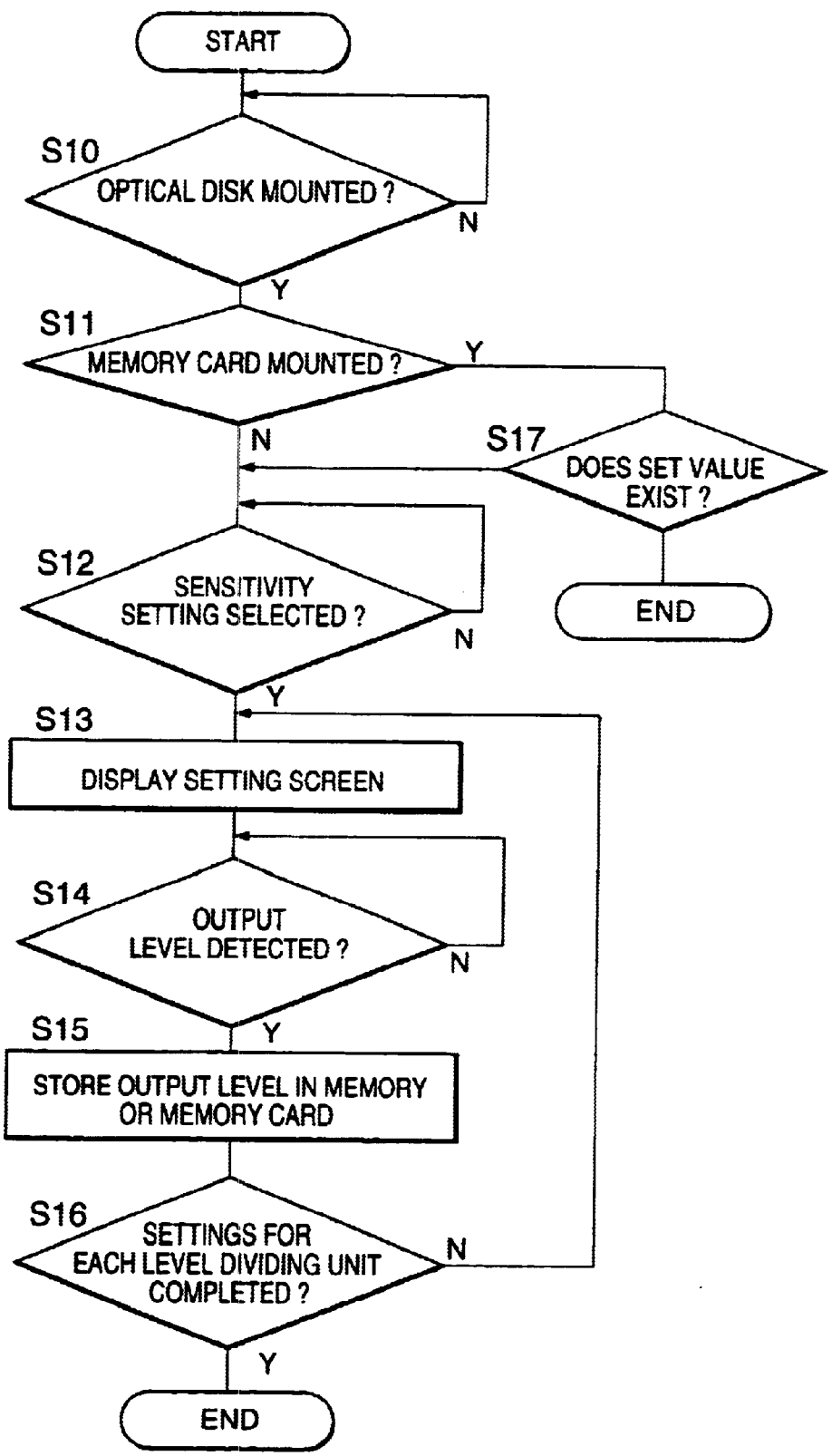
FIG. 9 is a flowchart illustrating another example of a setting program for the calibration, applied to the second configuration example shown in FIG. 7.

FIG. 9 is a flowchart for an example of such a setting program.

First, following mounting of the optical disk on the main game unit 100 (S10), confirmation is made whether or not a memory card 112 is mounted onto the main game unit 100 (S11), and in the event that a memory card 112 is not mounted, under the condition that the user selects sensitivity setting (calibration) of the operating unit by menu selection (S12), the setting screen is displayed on the television set 120 (S13). The setting screen displays a message prompting the user to firmly press the operator 11 provided in a certain operating unit, for example. When the user firmly presses the operator 11 according to this display, the output level of the analog signal from the pressure-sensitive element 12 detected at this time is output to the main-game unit 100 (S14), and stored in the built-in memory 111 (S15). The above process is repeated for each level dividing unit 15 of the operating device 200 (S16), and the sensitivity setting for the operating unit is thus completed.

In the event that a memory card 112 is discovered to be mounted in step S11, it is determined whether or not a setting value regarding calibration has already been stored in the memory card 112 (S17), and in the event that this is the case, the sensitivity setting of the operating unit is ended here. In the case, the level dividing units 15 provided in the operating device 200 adjust the output level range of the analog signals to be divided based on the set values stored in the memory card 112.

On the other hand, in the event that a setting value regarding calibration has not been stored in the memory card 112, the flow proceeds to step S12, and the above-described calibration operation is performed. Incidentally, the output level of analog signals from the pressure-sensitive element 12 detected in step S15 is stored in the memory card 112 (S16).

The level dividing units 15 provided in the operating device 200 adjust the output level range of the analog signals to be divided based on the set values stored in the memory of the main game unit 100 or in the memory card 112.

Figure 10:
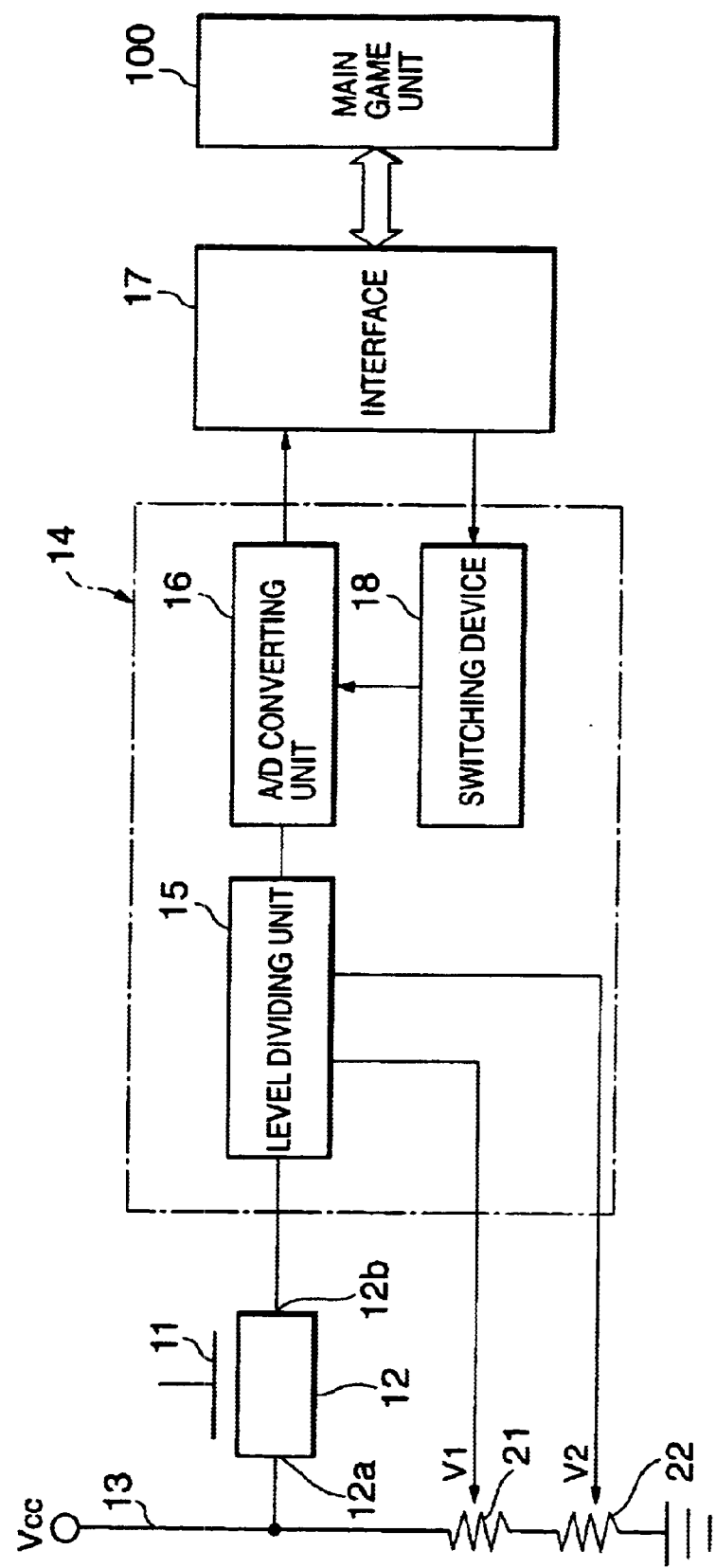
FIG. 10 is a block diagram illustrating a third configuration example for calibrating the level dividing unit.

FIG. 10 is a block diagram illustrating a third configuration example for calibrating the level dividing unit. In the configuration shown in the Figure, two volume elements 21 and 22 are serially inserted in the power source line to which the pressure-sensitive element 12 of the operating device 200 is connected, such that the intermediate voltage of the power source line 13 can be adjusted by these volume elements 21 and 22.

Figure 11:
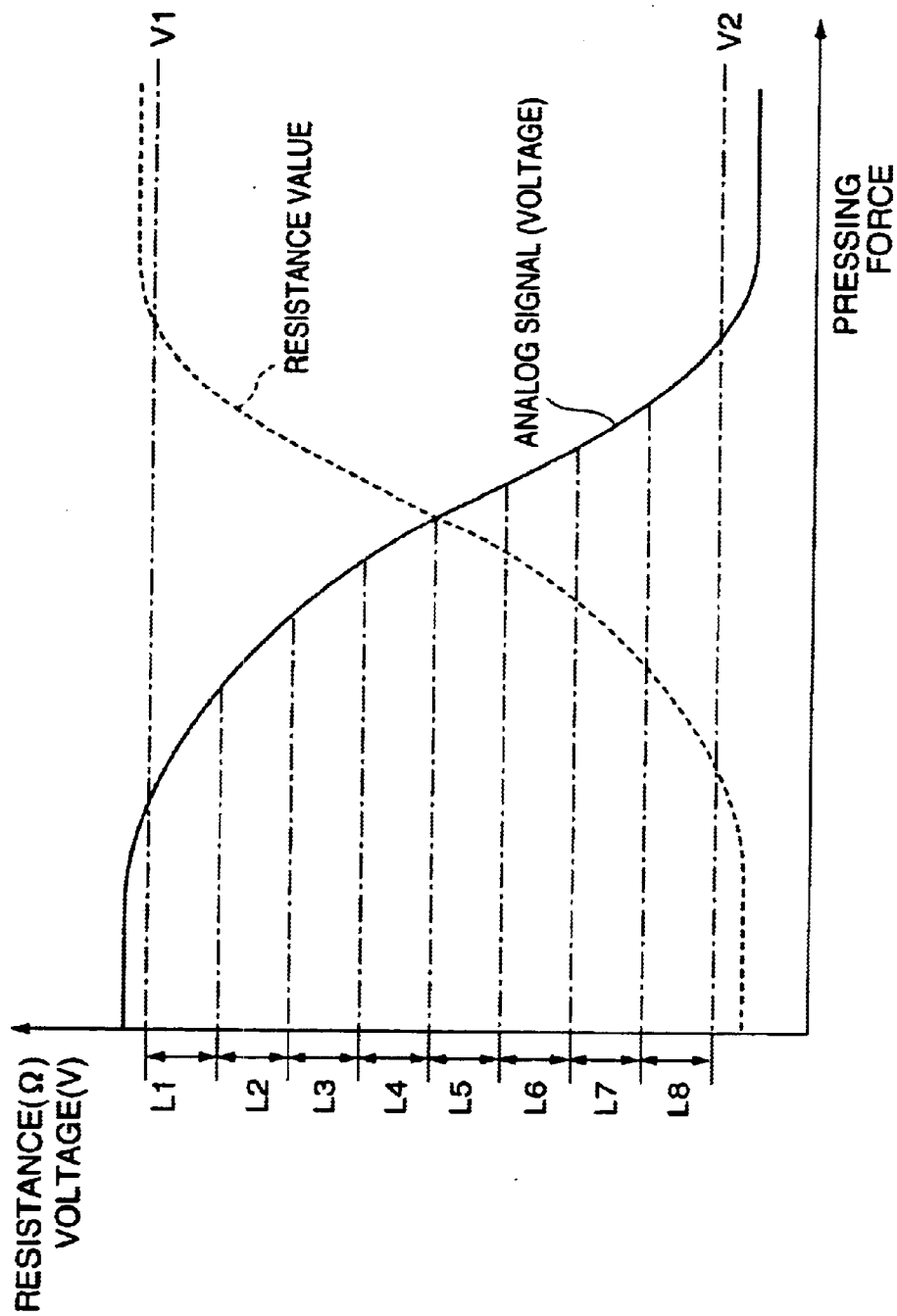
FIG. 11 is a diagram for describing the calibration action with the third configuration example shown in FIG. 10.

Then, the configuration is such that the level dividing unit 15 sets the output level range of the analog signals to be divided based on the intermediate voltages V1 and V2 of the power source line 13 adjusted by these volume elements 21 and 22, as shown in FIG. 11. That is, the level dividing unit 15 takes the intermediate voltage V1 detected at the volume element 21 closer to the power source Vcc as the maximum value of the output level range of the analog signals to be divided, takes the intermediate voltage V2 detected at the other volume element 22 as the minimum value of the output level range of the analog signals to be divided, and uniformly divides the output level of the analog signals output from the pressure-sensitive element 12, within the range between these intermediate voltages V1 and V2. The adjustment of the volume elements 21 and 22 should be executed at the time of shipping the operating device 200, for example.

Also, a configuration may be used wherein functions for monitoring the intermediate voltages V1 and V2 are added to the level dividing unit 15, so that in the event that these intermediate voltages V1 and V2 change over time or the like, the output level range of the analog signals to be divided can be adjusted according to the changed intermediate voltages V1 and V2. Adding such an automatic calibration function enables an optimal setting state to be constantly maintained even in the event that the intermediate voltages V1 and V2 change due to aging of the pressure-sensitive element 12 and volume elements or irregularities in the power source voltage, since the output level range of the analog signals to be divided is adjusted according to the changed intermediate voltages V1 and V2.

However, in the event that the level dividing unit 15 constantly performs such automatic calibration, output to the main game unit 100 may be delayed. In such cases, a configuration can be made wherein the level dividing unit 15 checks the intermediate voltages V1 and V2 of the power source line 13 only at the time of energization the operating device 200 and adjusts the output level range of the analog signals to be divided.

Figure 12:
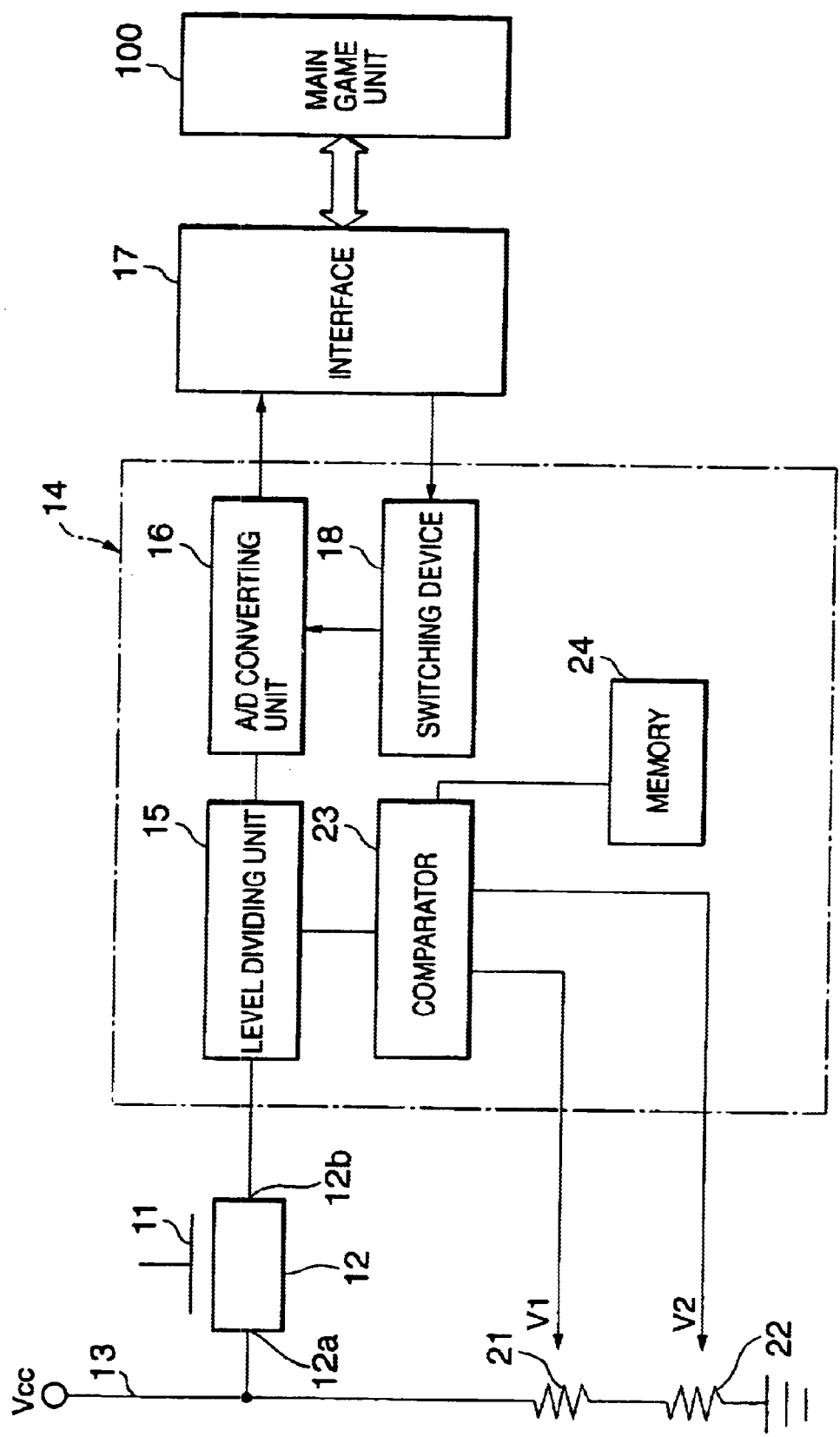
FIG. 12 is a block diagram illustrating a fourth configuration example for calibrating the level dividing unit.

FIG. 12 is a block diagram illustrating a fourth configuration example for calibrating the level dividing unit. In the configuration shown in the Figure, two volume elements 21 and 22 are serially inserted in the power source line 13 to which the pressure-sensitive element 12 of the operating device 200 is connected, and further the MPU 14 includes a comparator 23 and memory 24.

The memory 24 stores beforehand the limit value range of the output level of analog signals to be divided by the level dividing unit 15. For example, the tolerance voltage of the MPU 14 is stored in the memory 24 as the limit value. The comparator 23 constantly monitors the intermediate voltages V1 and V2 detected by the volume elements 21 and 22, makes comparison of the intermediate voltages V1 and V2 (particularly V1) with the limit value stored in the memory 24, and functions to forcibly notify the level dividing unit 15 of the limit value in the event that the intermediate voltage has exceeded the limit value. In the event that the level dividing unit 15 receives the limit value from the comparator 23, the level dividing unit 15 adjusts the output level range of the analog signals to be divided based on this limit value.

With such a configuration, even in the event that analog signals with excessively large output levels exceeding the processing capabilities of the MPU 14 are output from the pressure-sensitive element 12, normal operation of the MPU 14 can be compensated.

Next, a detailed description will be made regarding a configuration example of the operating units provided in the operating device 200 according to the first embodiment of the present invention described above, with reference to the drawings.

Figure 13:
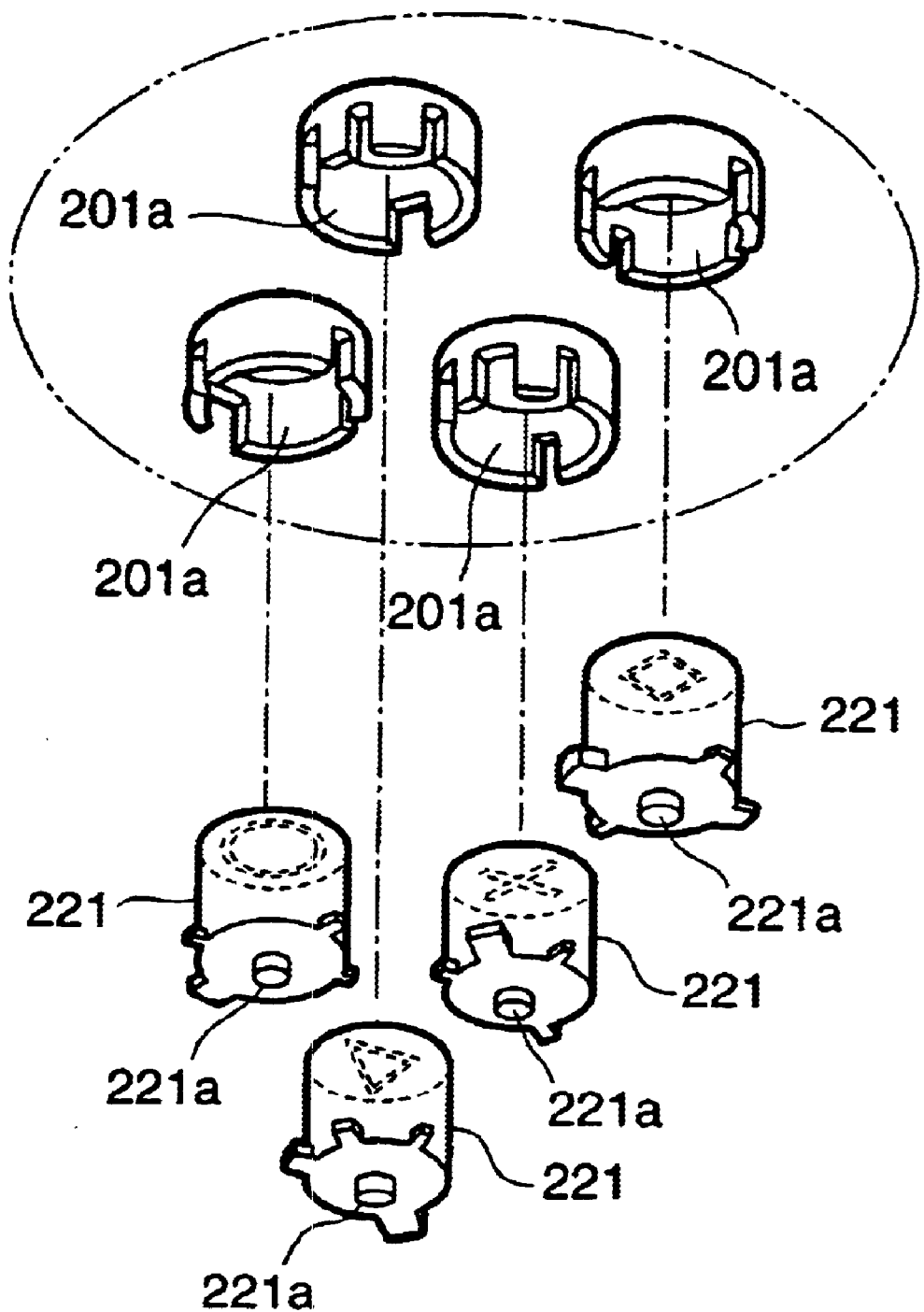
FIG. 13 is an exploded, perspective view of operating buttons (operators) provided in the second operating unit according to the first embodiment.
Figure 14:
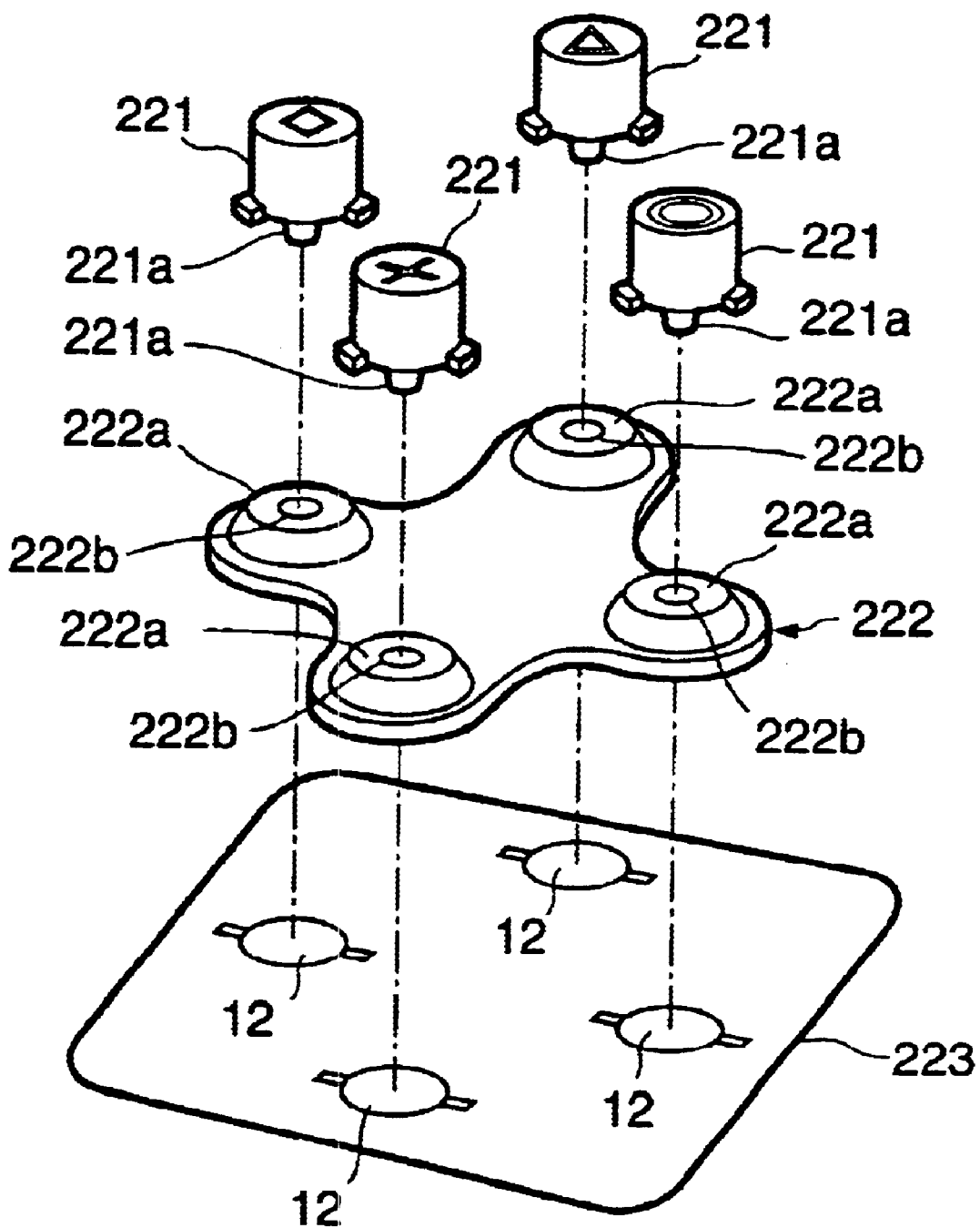
FIG. 14 is an exploded, perspective view of a first configuration example of the second operating unit according to the first embodiment.
Figure 15:
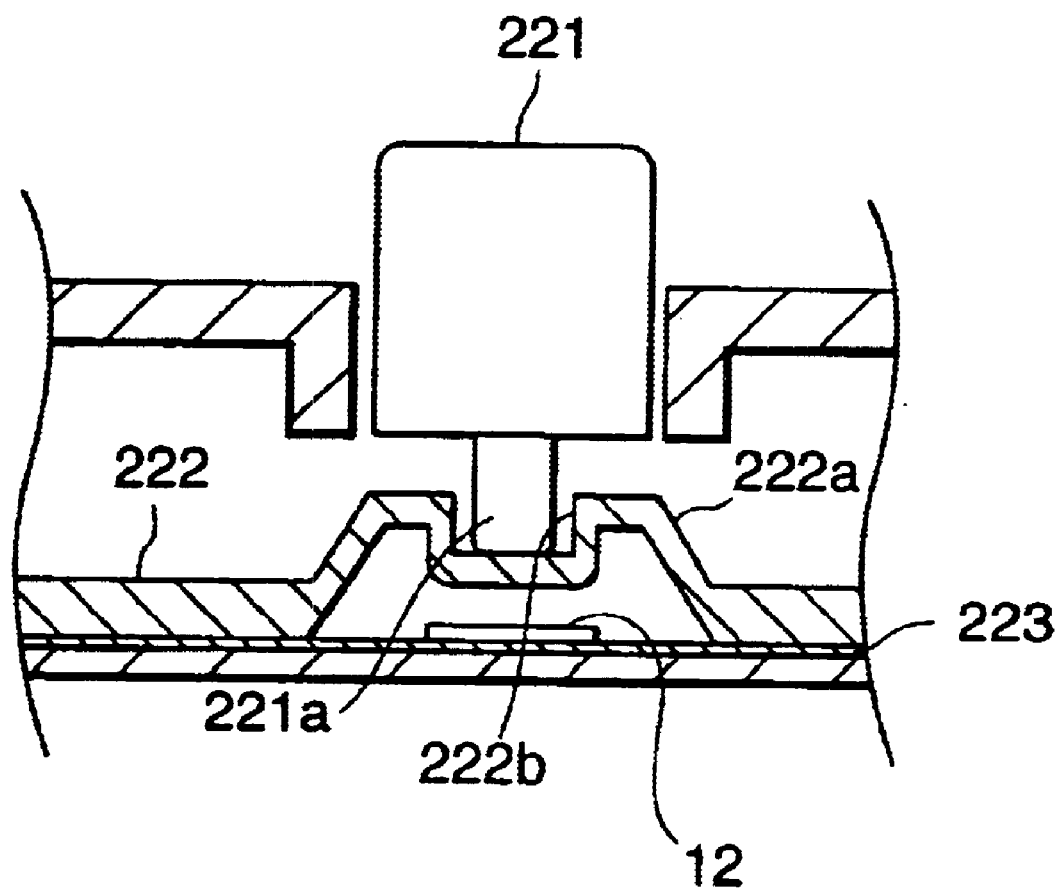
FIG. 15 is a frontal cross-sectional view of the first configuration example of the second operating unit according to the first embodiment.

FIGS. 13 through 15 are diagrams illustrating a first configuration example of the second operating unit.

As shown in FIG. 14, the second operating unit 220 has four operating buttons 221 which are operators 11, an elastic member 222, and a sheet member 223 upon which are provided pressure-sensitive elements 12. The operating buttons 221 are mounted from the rear side of mounting holes 201a provided on the upper side of the main unit 201, as shown in FIG. 13. The operating buttons 221 mounted to the mounting holes 201a are movable in the axial direction.

The elastic member 222 is formed of insulating rubber or the like, has elastic portions 222a protruding upwards, and supports the lower edges of the operating buttons 221 with the upper walls of the elastic portions 222a. In the event that an operating button 221 is pressed, the slope portion of the elastic portion 222a flexes and the upper wall moves in conjunction with the operating button 221. On the other hand, in the event that the pressure force placed upon the operating button 221 is released, the slope portion of the elastic portion 222a which had flexed is restored by elastic force, thereby pushing the operating button 221 upwards.

That is, the elastic member 222 functions as a pressing means for restoring an operating button 221 which has been pressed down by pressing force, to the original position.

The sheet member 223 is formed of a thin sheet material which is flexible and has insulating properties, such as a membrane or the like. Pressure-sensitive elements 12 are provided in appropriate positions on this sheet member 223, and as shown in FIG. 15, the pressure-sensitive elements 12 are positioned so as to be facing the operating buttons 221 across the elastic member 222.

Also, with the present example, protrusions 221a are formed on the bottom surface of the operating buttons 221 which are the operators 11, and also recessions 222b for supporting the protrusions 221a are formed to the elastic portions 222a of the elastic member 222. When an operating button 221 is pressed, the protrusion 221a presses the pressure-sensitive element 12 via the recession 222b of the elastic portion 222a.

As described above, the electrical resistance values of the pressure-sensitive element 12 change according to the pressing force applied from the operating button 221. Providing a protrusion 221a on the bottom surface of the operating button 221 and pressing the pressure-sensitive element 12 with this protrusion 221a enables the pressing force to be transferred to the pressure-sensitive element 12 with high precision.

However, as a result of pressing the pressure-sensitive element 12 with the protrusion 221a portion, the pressing force on the pressure-sensitive element 12 and the elastic member 222 acting on the recess 222b becomes excessive, thereby reducing the life of the pressure-sensitive element 12 and the elastic member 222.

Figure 16:
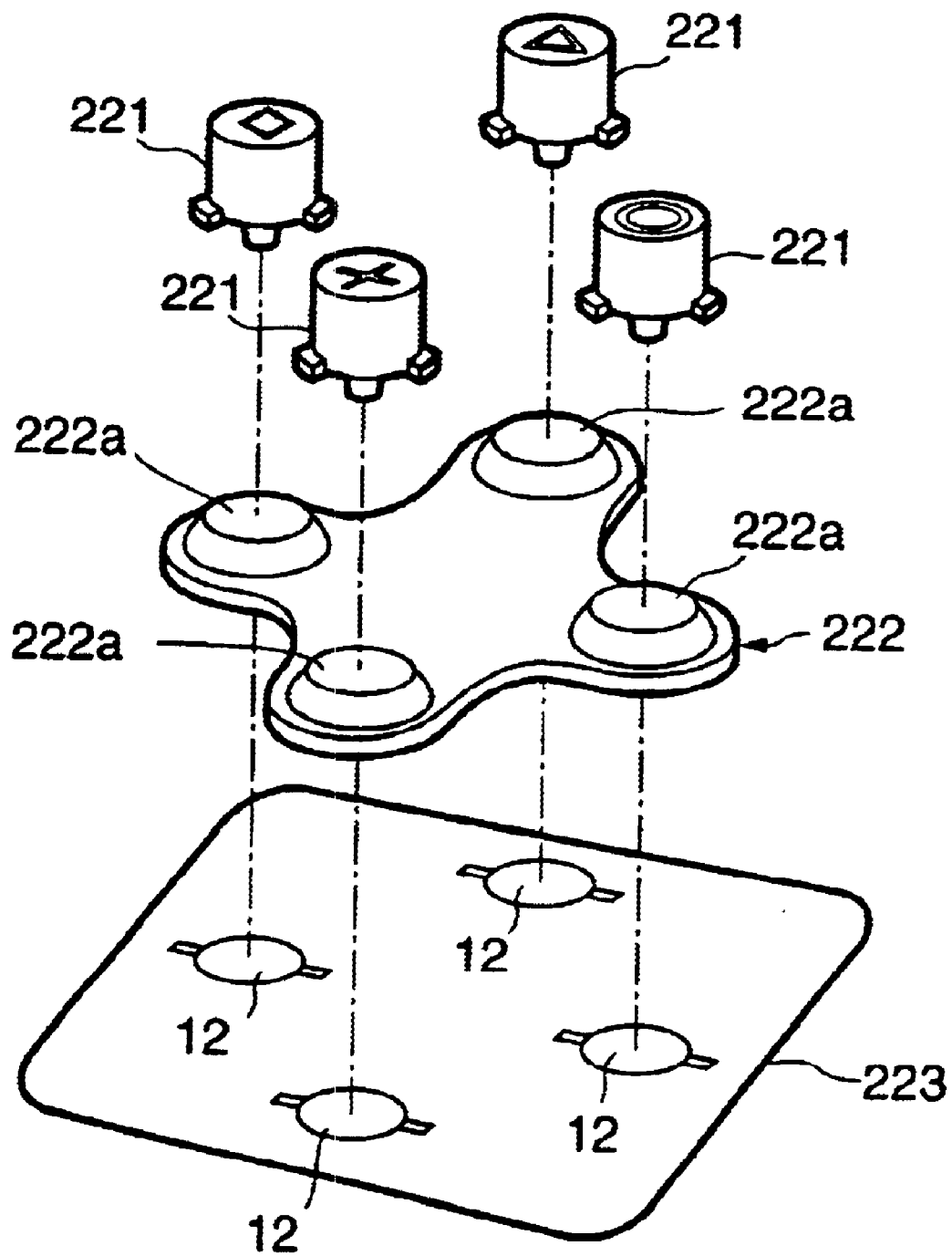
FIG. 16 is an exploded, perspective view of a second configuration example of the second operating unit according to the first embodiment.
Figure 17:
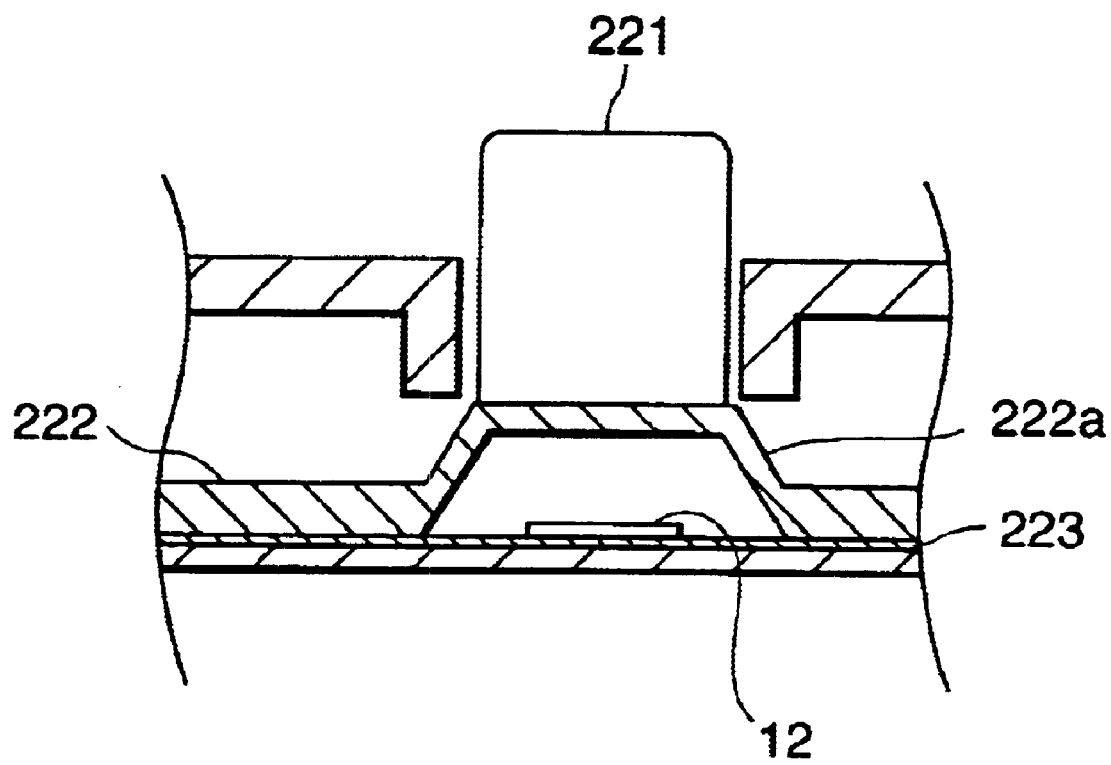
FIG. 17 is a frontal cross-sectional view of the second configuration example of the second operating unit according to the first embodiment.

Accordingly, with the second configuration example shown in FIGS. 16 and 17, the bottom surface of the operating button 221 which is an operator 11 is formed as a flat plane, such that the entirety of the flat bottom plane is used to press the pressure-sensitive element 12. Further, a recess is not formed in the elastic portion 222a of the elastic member 222, and the arrangement is made such that the bottom of the operating button 221 is supported by the flat plane. According to such a configuration, even though the sensitivity properties of transmitting the pressing force from the operating button 221 to the pressure-sensitive element 12 decrease, there is the advantage that the life of the pressure-sensitive element 12 and the elastic member 222 is improved.

Figure 18:
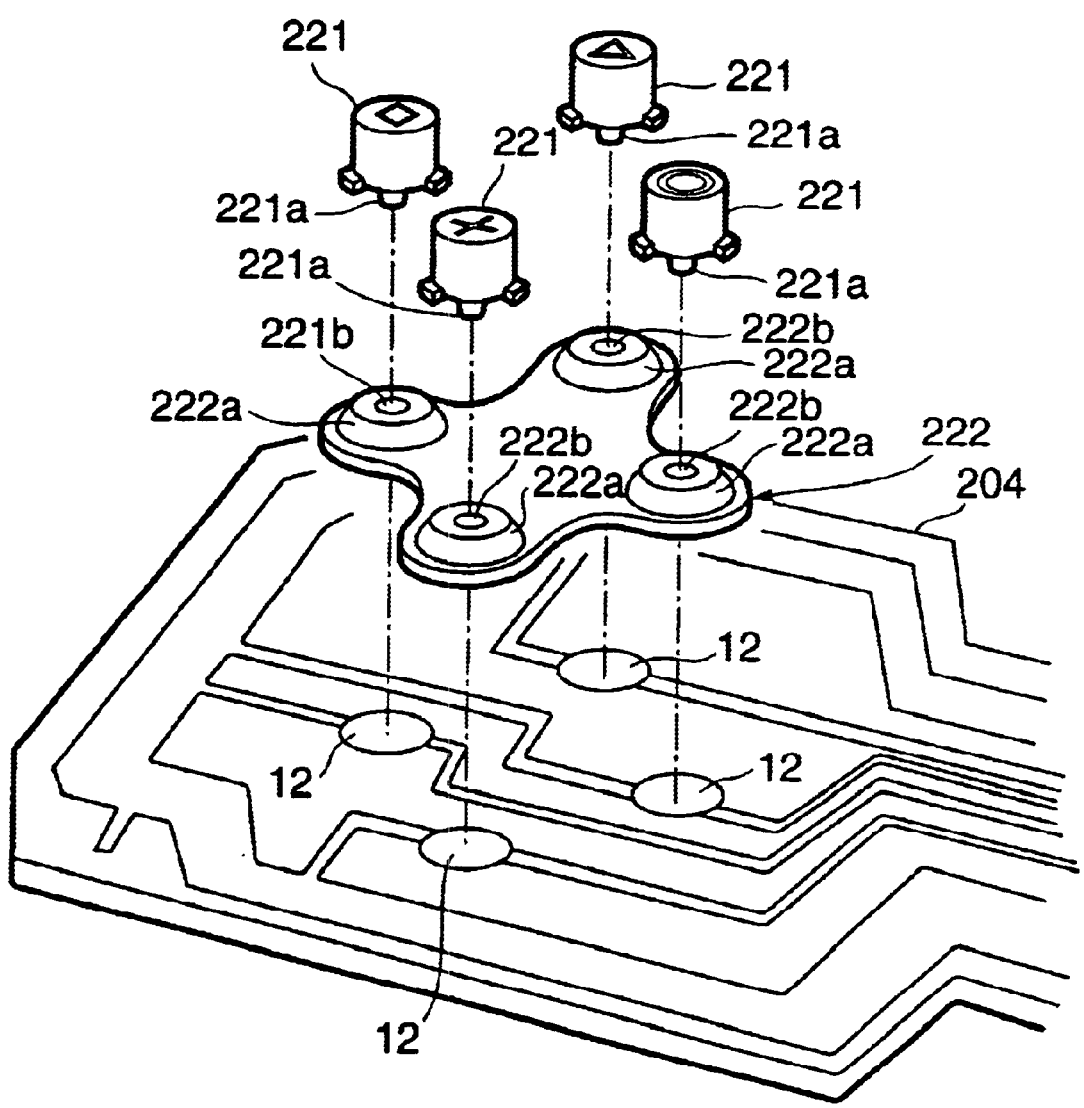
FIG. 18 is an exploded, perspective view of a third configuration example of the second operating unit according to the first embodiment.
Figure 19:
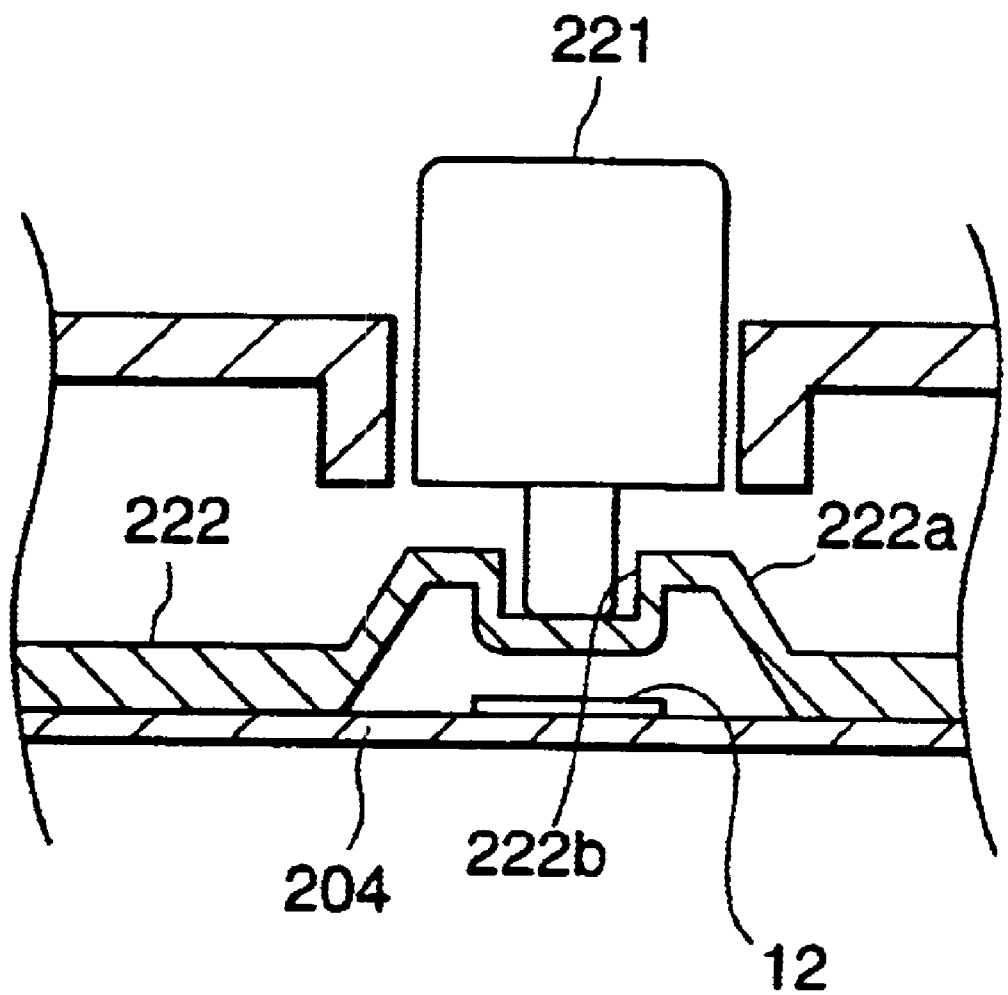
FIG. 19 is a frontal cross-sectional view of the third configuration example of the second operating unit according to the first embodiment.

FIGS. 18 and 19 are diagrams illustrating a third configuration example of the second operating unit.

With the third configuration example shown in these diagrams, the pressure-sensitive elements 12 are directly provided on appropriate positions on the internal board 204 built into the operating device 200. Providing the pressure-sensitive elements 12 to the internal board 204 allows the sheet member to be omitted and the number of parts to be reduced. Of course, the pressure-sensitive elements 12 are to be provided at positions to which the pressing force from the operating buttons 221 can be transmitted.

Figure 21:
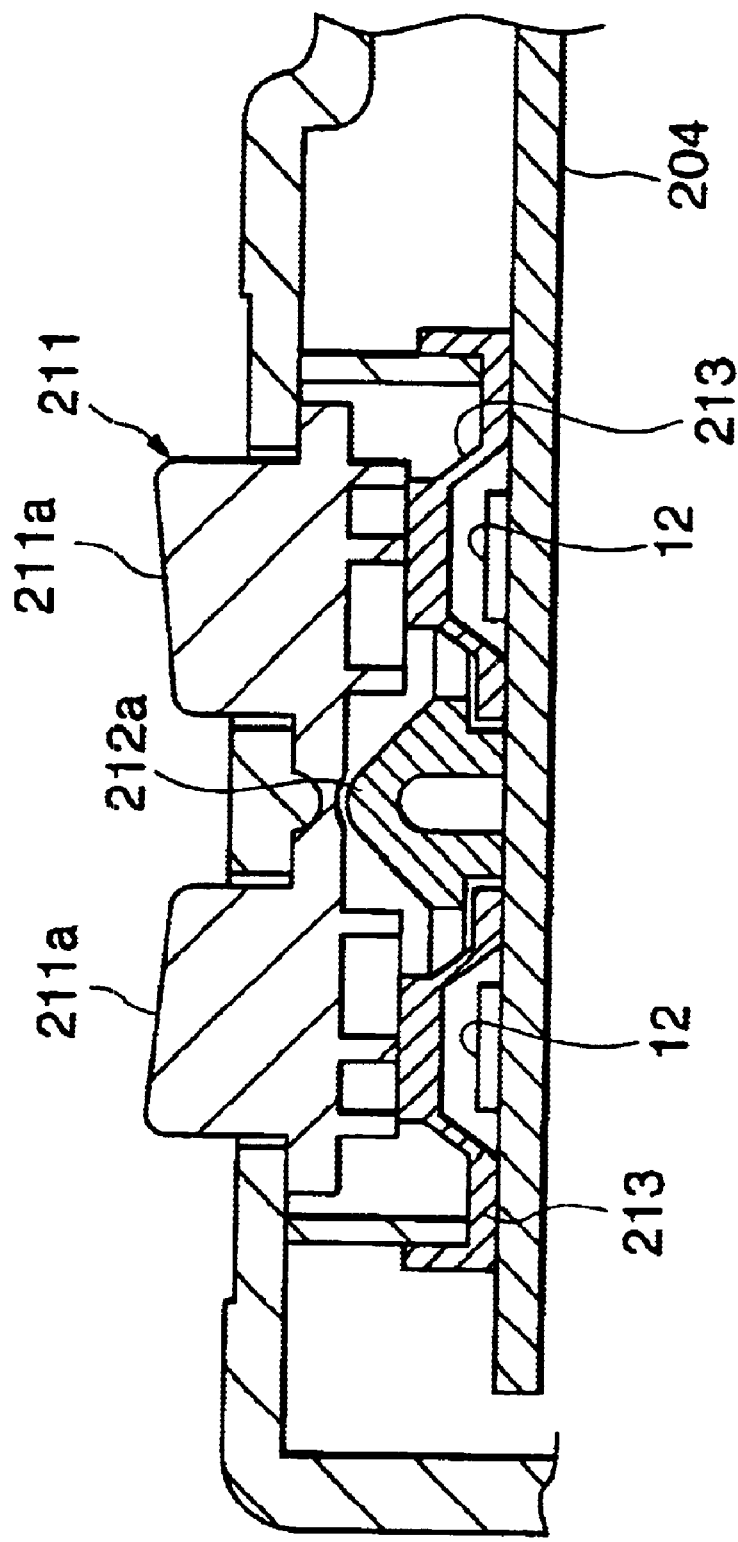
FIG. 21 is a frontal cross-sectional view illustrating a configuration example of the first operating unit according to the first embodiment.

FIGS. 20 and 21 are diagrams illustrating a configuration example of the first operating unit.

As shown in FIG. 20, the first operating unit 210 comprises a cross-shaped operating member 211, a spacer 212 for positioning the operating member 211, and an elastic member 213 for elastically supporting the operating member 211. Further, as shown in FIG. 21, pressure-sensitive elements 12 are provided at positions facing the operating keys 211a (operators 11) of the operating member 211 via the elastic member 213.

The overall construction of the first operating unit 210 is already known in Japanese Unexamined Patent Application Publication No. 8-163672 and so forth, so detailed description thereof will be omitted, but the operating member 211 is assembled on a half-spherical protrusion 212a formed at the center of the spacer 212 which serves as a fulcrum thereof, whereby the operating keys 211a (operators) can be pressed to the side of the pressure-sensitive elements 12 (see FIG. 21).

Then, in the event that operating keys 211a which are the operators 11 are pressed, the pressing force thereof acts on the pressure-sensitive elements 12 via the elastic member 213, such that the electrical resistance values of the pressure-sensitive elements 12 change according to the magnitude of the pressing force. In the configuration example shown in the Figure, a configuration wherein the pressure-sensitive elements 12 are directly provided at appropriate positions on the internal board 204 built into the operating device 200 is shown, but the pressure-sensitive elements 12 may be provided on a sheet material 223 as with the configuration example of the second operating unit 220 shown in FIGS. 14 and 15.

Figure 22:
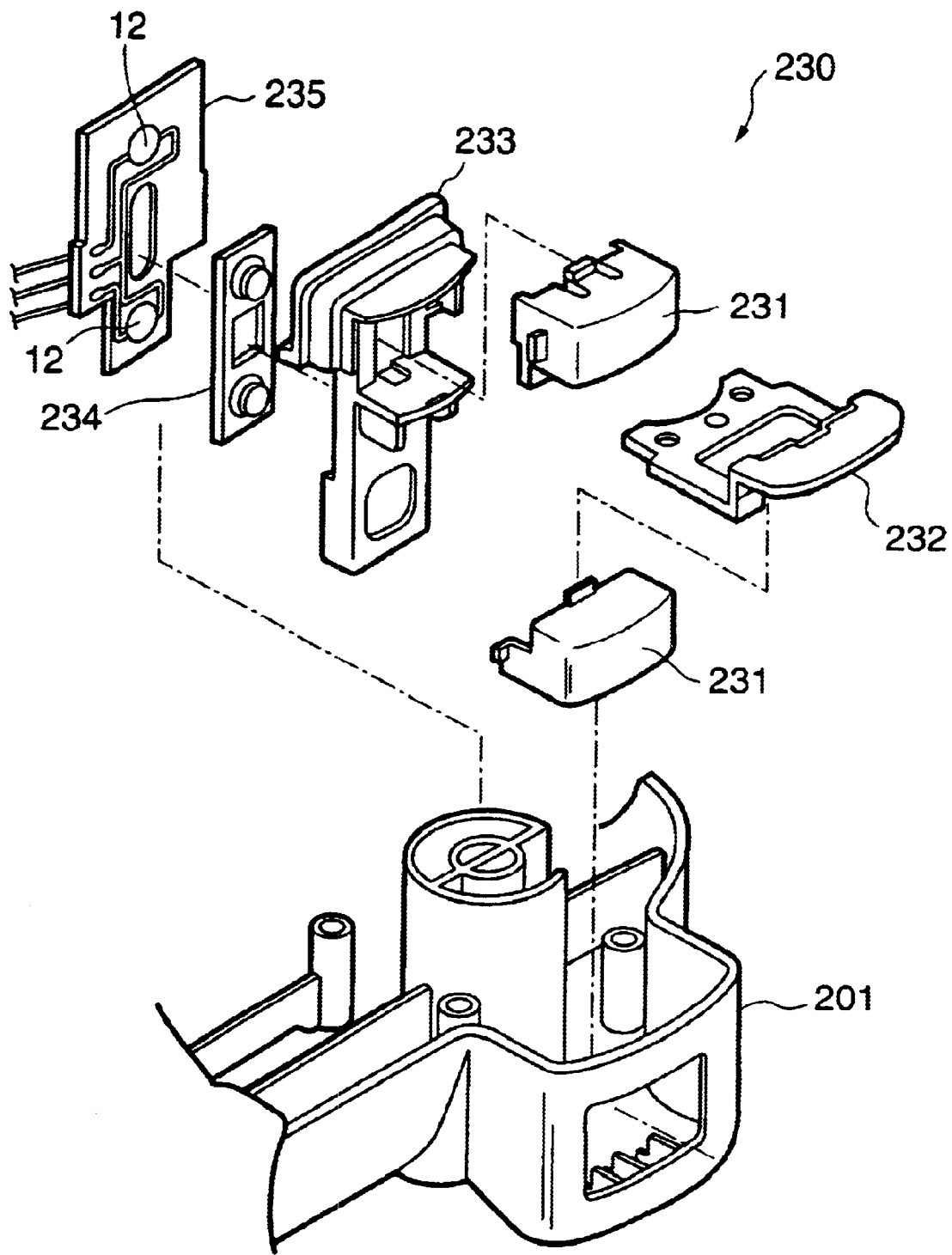
FIG. 22 is an exploded, perspective view illustrating a configuration example of a third operating unit according to the first embodiment.
Figure 23:
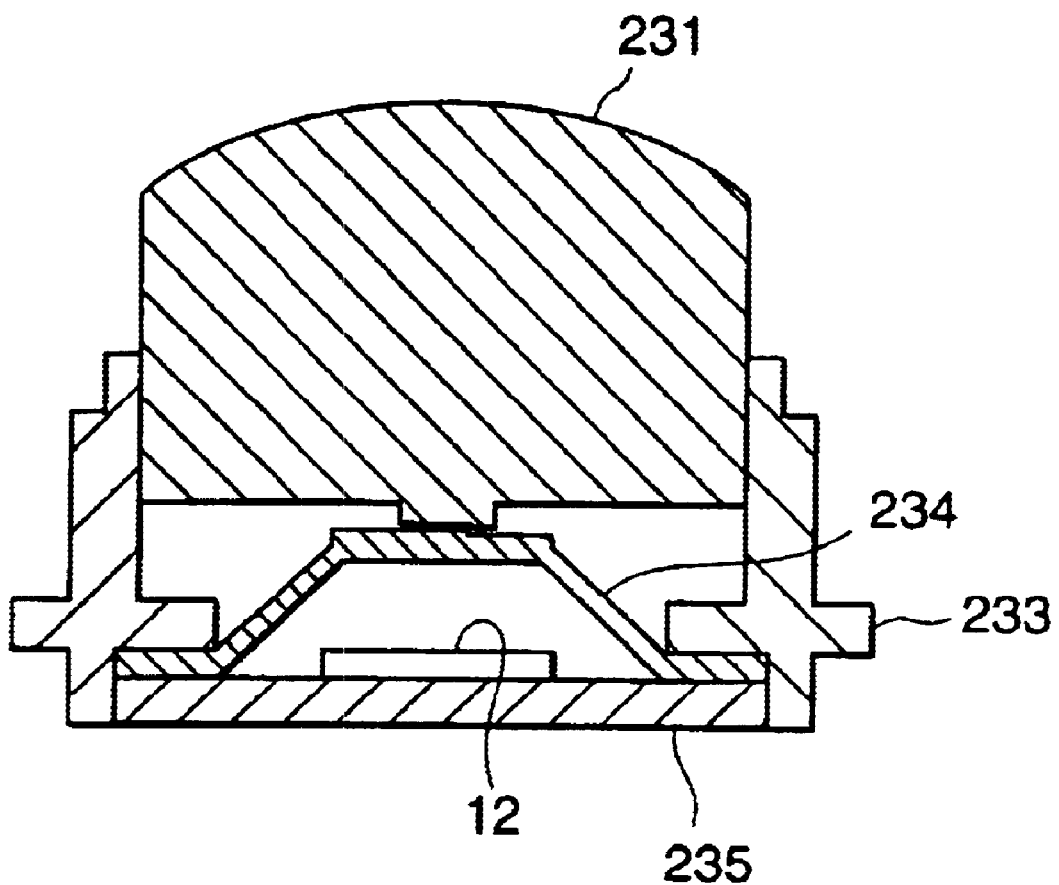
FIG. 23 is a frontal cross-sectional view illustrating a configuration example of the third operating unit according to the first embodiment.

FIGS. 22 and 23 are diagrams illustrating a configuration example of the third operating unit.

The third operating unit 230 comprises two operating buttons 231, a spacer 232 for positioning these operating buttons 231 within the operating device 200, a holder 233 for supporting the operating buttons 231, an elastic member 234, and an internal substrate 235, with the pressure-sensitive elements 12 provided at appropriate positions on the internal substrate 235.

The overall construction of the third operating unit 230 is also known in Japanese Unexamined Patent Application Publication No. 8-163672 and so forth, so detailed description thereof will be omitted, but the operating buttons 231 are configured so as to be pressed in for operation, being guided by the spacer 232, and the pressing force at the time of pressing operates on the pressure-sensitive elements 12 via the elastic member 234. The electrical resistance values of the pressure-sensitive elements 12 change according to the magnitude of the pressing force applied from the operating buttons 231. In the configuration example shown in the Figure, a configuration wherein the pressure-sensitive elements 12 are directly provided at appropriate positions on the internal board 235 built into the operating device 200 is shown, but the pressure-sensitive elements 12 may be provided on a sheet material 223 as with the configuration example of the second operating unit 220 shown in FIGS. 14 and 15.

Note that the fourth operating unit 240 is configured in the same way as the above-described third operating unit 230.

The above has been a description of configuration examples of application of the first through fourth operating units 210, 220, 230, and 240 to the present invention, but it should be noted that the preset invention is not restricted to an arrangement wherein all operating units are applied to the present invention; rather, operating units to be applied to the present invention may be arbitrarily selected, with the remaining operating units being configured in a conventional manner.

Second Embodiment

Next, a configuration relating to the second embodiment of the present invention will be described in detail. The components thereof which are the same as those in the above-described first embodiment will be denoted with the same reference numerals, and detailed description of such parts will be omitted.

With the above-described operating device 200 according to the first embodiment, the configuration involved analog signals output from the pressure-sensitive elements 12 generating both multi-bit digital signals and single-bit digital signals, but in the following second embodiment, the configuration is such that multi-bit digital signals are generated from analog signals output from the pressure-sensitive element 12 and single-bit digital signals being output by detection of the on/off state of a digital switch.

Figure 24:
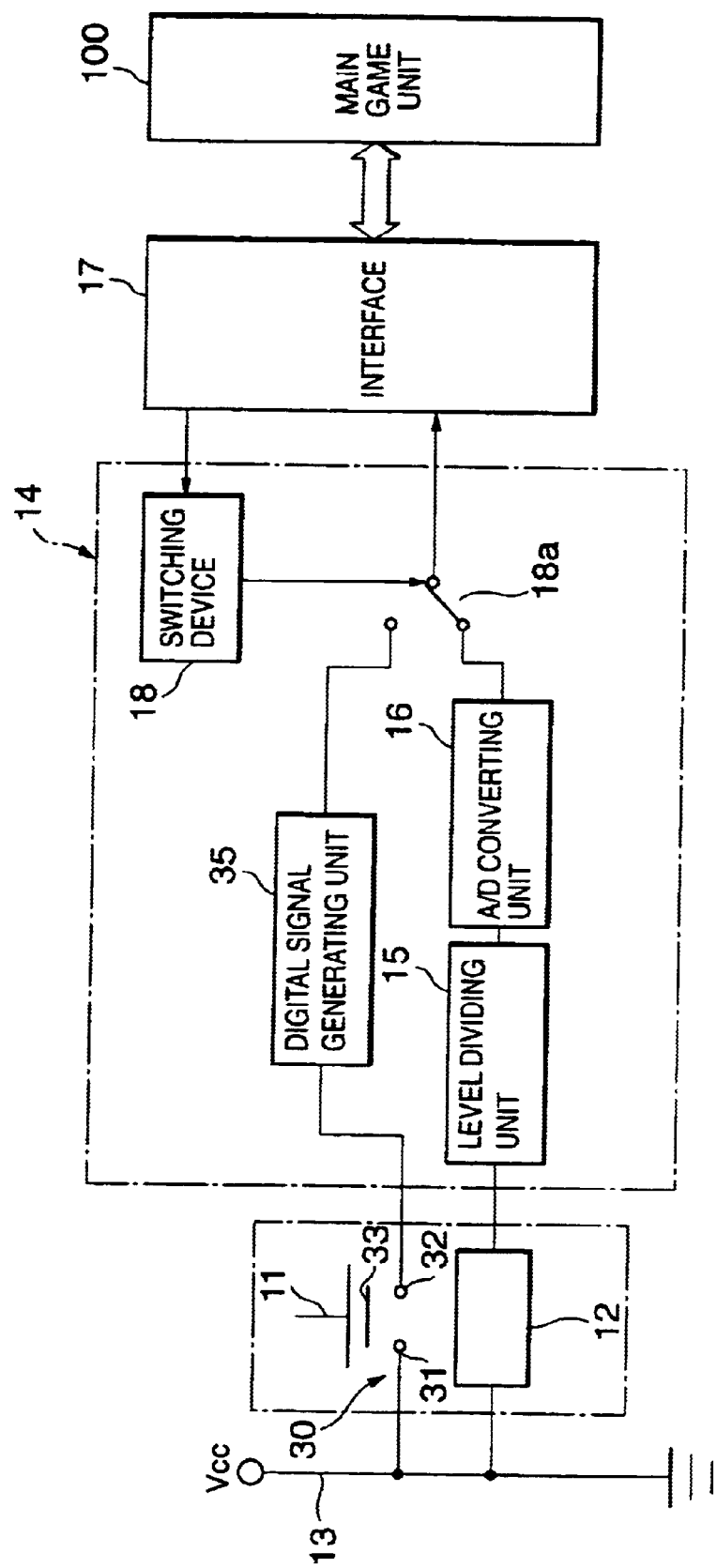
FIG. 24 is a block diagram illustrating the principal portions of the operating device according to a second embodiment of the present invention.

FIG. 24 is a block diagram illustrating the principle portions of the operating device according to the second embodiment of the present invention.

With the present embodiment, the operating units 210, 220, 230, and 240 of the operating device 200 comprise the operating keys 211a of the operating member 211 and the operating buttons 221, 231, and 241 making up the operators 11, the pressure-sensitive elements 12 (detecting elements), and a digital switch 30. Of these, the configuration of the operator 11 and pressure-sensitive element 12 is the same as those provided in the operating device 200 of the above-described first embodiment.

The digital switch 30 has first and second fixed terminals 31 and 32, and a movable member 33 which makes contact or breaks contact with the fixed terminals 31 and 32 so as to close or open the switch. The movable member 33 moves in accordance with the pressing operation of the operator 11, and makes or breaks contact between the first and second fixed terminals 31 and 32. Also, the first fixed terminal 31 of the digital switch 30 is connected to the electric power source line 13, and a predetermined voltage is applied from the electric power source (Vcc), as shown in FIG. 24.

The MPU 14 mounted to the internal board within the operating device 200 comprises, in addition to the functions of the level dividing unit (LS) 15 and A/D converting unit 16, the functions of a digital signal generating unit 35 for detecting the on/off state of the above digital switch 30 and outputting single-bit digital signals, a switching switch 18a for switching between the output of this digital signal generating unit 35 and the A/D converting unit 16 and outputting it externally, and a switching unit 18 for operating this switching switch 18a.

The A/D converting unit 16 in the present embodiment only has the function of converting analog signals output from the pressure-sensitive element 12 into multi-bit digital signals and outputting the same.

Also, the digital signal generating unit 35 is connected at the input side thereof to the second fixed terminal 32 of the digital switch 30, and monitors the voltage change occurring at the fixed terminal 32. That is, in the event that the digital switch 30 is in the closed state, the potential of the second fixed terminal 32 is the same as that of the electric power source line 13, and on the other hand, in the event that the digital switch 30 is in the open state, the voltage of the second fixed terminal 32 is zero. The digital signal generating unit 35 thus outputs single-bit digital signals "0" or "1" according to a change in the voltage occurring at the second fixed terminal 32.

The switching unit 18 is configured so as to be controlled by control signals sent from the main game unit 100, based on game programs recorded in an optical disk, in this embodiment too. That is, at the time of executing the game program recorded in the optical disk, control signals are output from the main game unit 100 to instruct either connecting the switching switch 18a to the A/D converting unit 16 side, or connecting the switching switch 18a to the digital signal generating unit 35 side, according to the contents of the game program. The switching unit 18 operates the switching switch 18a based on these control signals.

Incidentally, a configuration may be made wherein the switching unit 18 is controlled by manual operation. For example, a configuration can be made wherein an analog selection switch 252 provided in the operating device 200 is provided with a function for switching the switching switch 18, so that manual operation of the analog selection switch 252 operates the switching switch 18*a*.

According to the operating device 200 according to the second embodiment of the above configuration, the movable member 33 of the digital switch 30 conducts between the first and second fixed terminals 31 and 32 in conjunction with the pressing operation of the operator 11, and analog signals are output from the pressure-sensitive element 12 according to pressing force applied from the operator 11. Then, the digital signal generating unit 35 outputs single-bit digital signals according to the state change of the digital switch 30, and multi-bit digital signals are output from the A/D converting unit 16 at an output level according to the pressing force applied to the pressure-sensitive element 12.

Accordingly, one or the other of single-bit digital signals and multi-bit digital signals can be output from the operating device 200 to the main game unit 100, by selection made by the switching switch 18*a*.

Figure 25:
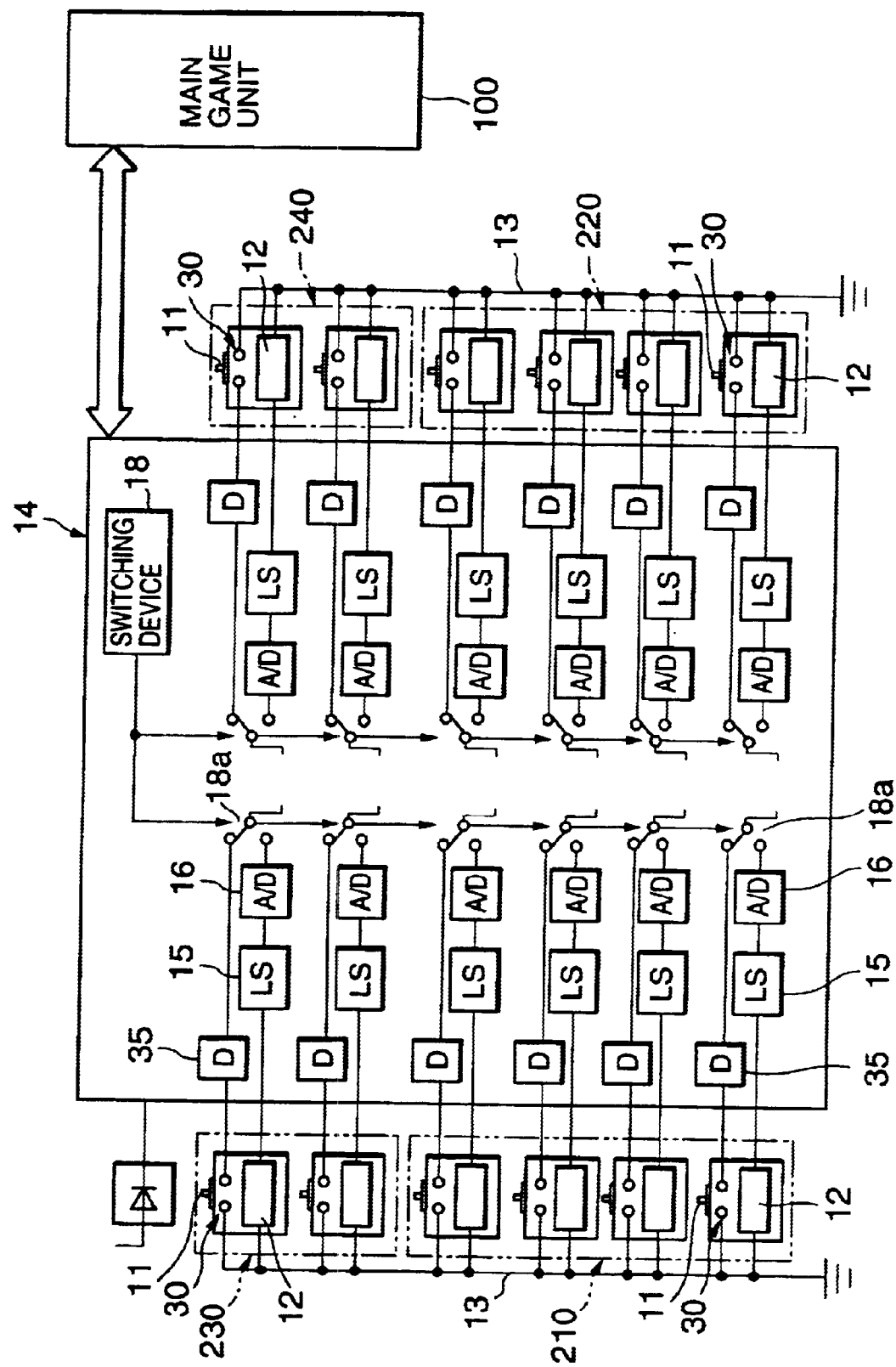
FIG. 25 is a block diagram illustrating an overall configuration example of the operating device according to the second embodiment of the present invention.
Figure 26:
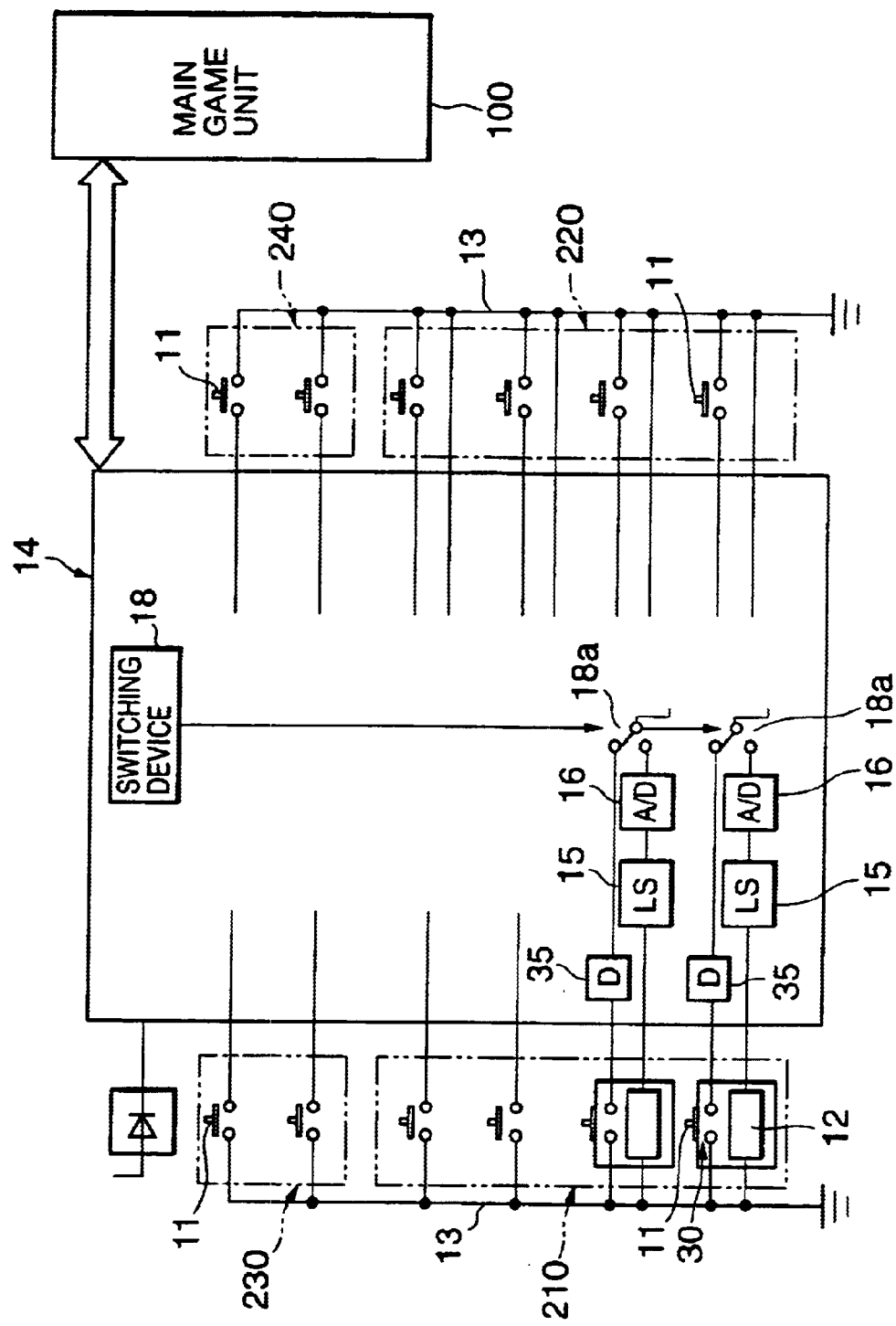
FIG. 26 is a block diagram illustrating another overall configuration example of the operating device according to the second embodiment of the present invention.

As shown in FIG. 25, the present embodiment has a configuration wherein the first through fourth operating units 210, 220, 230, and 240 have the configuration shown in FIG. 24. Accordingly, these operating units are capable of being selectviely used for digital operations and for analog operations. Incidentally, as shown in FIG. 26, an arrangement may be made wherein only operating units arbitrarily selected from the first through fourth operating units 210, 220, 230, and 240 are configured as shown in FIG. 24.

Also, the operating device 200 according to the present embodiment also has a calibration function (division range setting means) for individually setting the output level ranges of analog signals divided by the level dividing unit 15, as shown in FIGS. 6, 7, 10, and 12.

Next, a detailed description will be given regarding a configuration example of the second operating unit provided in the operating device 200 according to the second embodiment of the present invention described above, with reference to the drawings.

Figure 27:
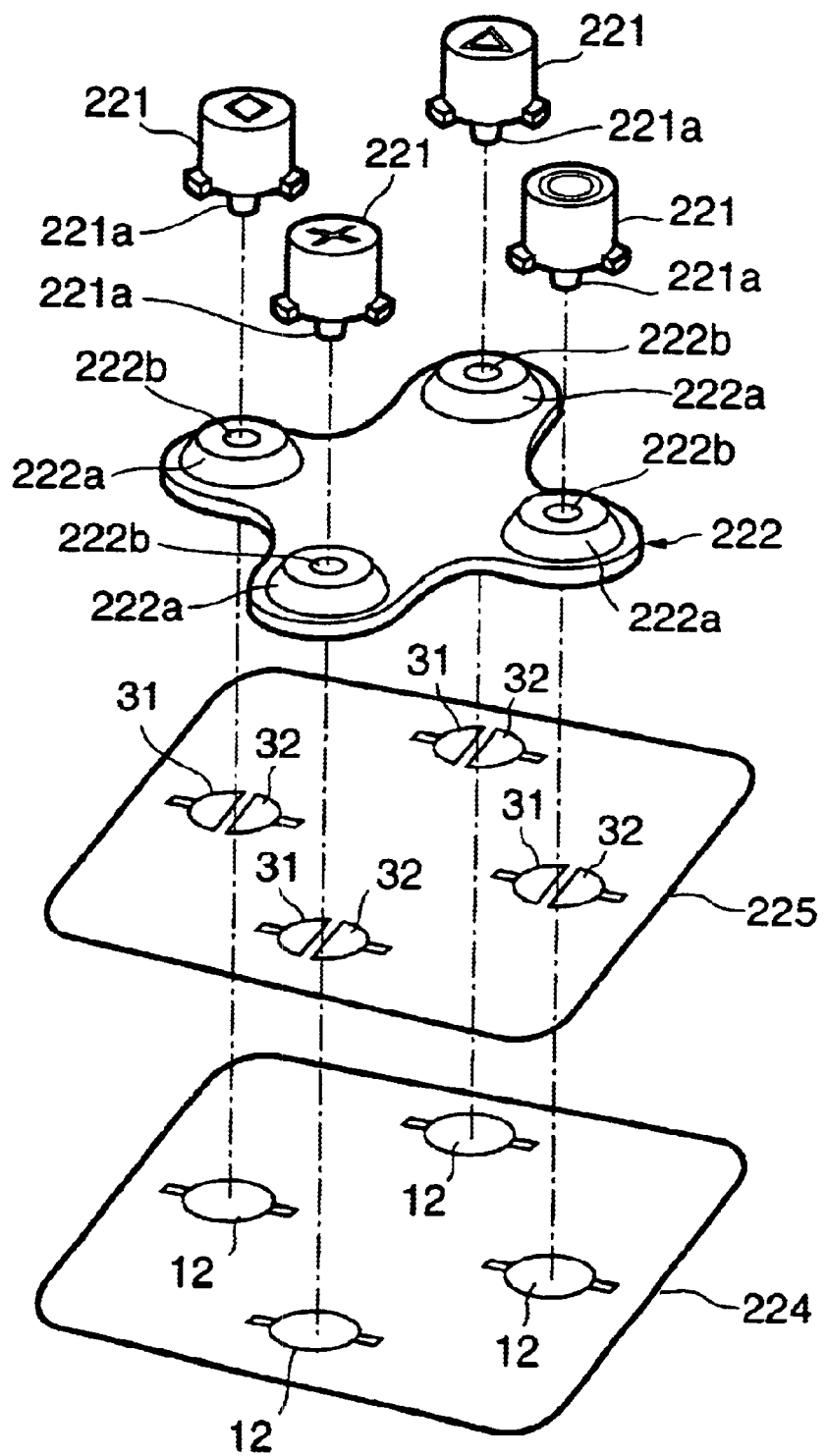
FIG. 27 is an exploded, perspective view of a first configuration example of the second operating unit according to the second embodiment.
Figure 28:
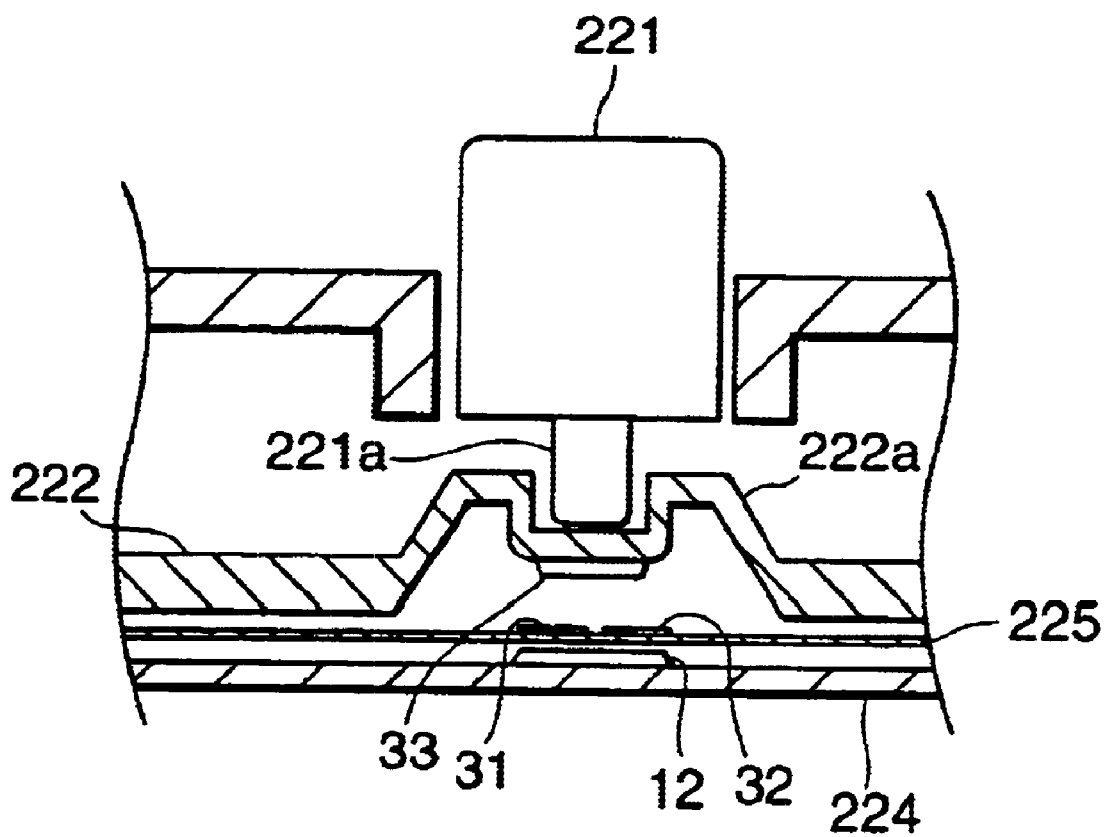
FIG. 28 is a frontal cross-sectional view of the first configuration example of the second operating unit according to the second embodiment.

FIGS. 27 and 28 are diagram illustrating a first configuration example of the second operating unit of the present embodiment.

As shown in FIG. 27, the second operating unit 220 comprises four operating buttons 221 serving as operators 11, an elastic member 222, a sheet member 224 provided with pressure-sensitive elements 12, and a sheet member 225 provided with the first and second fixed terminals 31 and 32 of the digital switch 30. Each of the operating buttons 221 is mounted from the rear side of mounting holes 201*a* formed in the upper side of the main operating unit 201, as was the case in the first embodiment described above (see FIG. 13). The operating buttons 221 mounted to the mounting holes 201*a* are movable in the axial direction.

The elastic member 222 is formed of insulating rubber or the like, has elastic portions 222*a* protruding upwards, and supports the lower edges of the operating buttons 221 with the upper walls of the elastic portions 222*a*. In the event that an operating button 221 is pressed, the slope portion of the elastic portion 222*a* flexes and the upper wall moves in conjunction with the operating button 221. On the other hand, in the event that the pressure force placed upon the operating button 221 is released, the slope portion of the elastic portion 222*a* which had flexed is restored by elastic force, thereby pushing the operating button 221 upwards.

That is, the elastic member 222 functions as a pressing means for restoring an operating button 221 which has been pressed down by the pressing operation, to the original position.

Also, the movable member 33 of the digital switch 30 is formed on the inner surface of the upper wall of the elastic portion 222*a* (see FIG. 28). This movable member 33 is formed of material having electroconductivity, and moves downwards by flexing deformation of the elastic portion 222*a* in conjunction with the pressing operation of the operating button 221.

The sheet member 225 is formed of a thin sheet material which is flexible and has insulating properties, such as a membrane or the like. The first and second fixed terminals 31 and 32 are provided in appropriate positions on this sheet member 225, and as shown in FIG. 28, the first and second fixed terminals 31 and 32 are positioned so as to be facing the movable member 33. According to this configuration, the movable member 33 formed on the upper wall of the elastic portion 222*a* moves in conjunction with the pressing operation of the operating button 221 which is an operator 11, comes into contact with the first and second fixed terminals 31 and 32, and makes electric contact between the fixed terminals 31 and 32.

Also, the sheet member 224 is also formed of a thin sheet material which has insulating properties. Pressure-sensitive elements 12 are provided in appropriate portions on this sheet member 224, and as shown in FIG. 28, the pressure-sensitive elements 12 are positioned facing the operating buttons 221 across the elastic material 222 and the sheet member 225.

As described above, the sheet member 225 is formed of a thin sheet which is flexible, so the pressing force of the operating button 221 transferred via the upper wall of the elastic portion 222*a* and the movable member 33 can be transferred to the pressure-sensitive elements 12 with almost no change.

Figure 29:
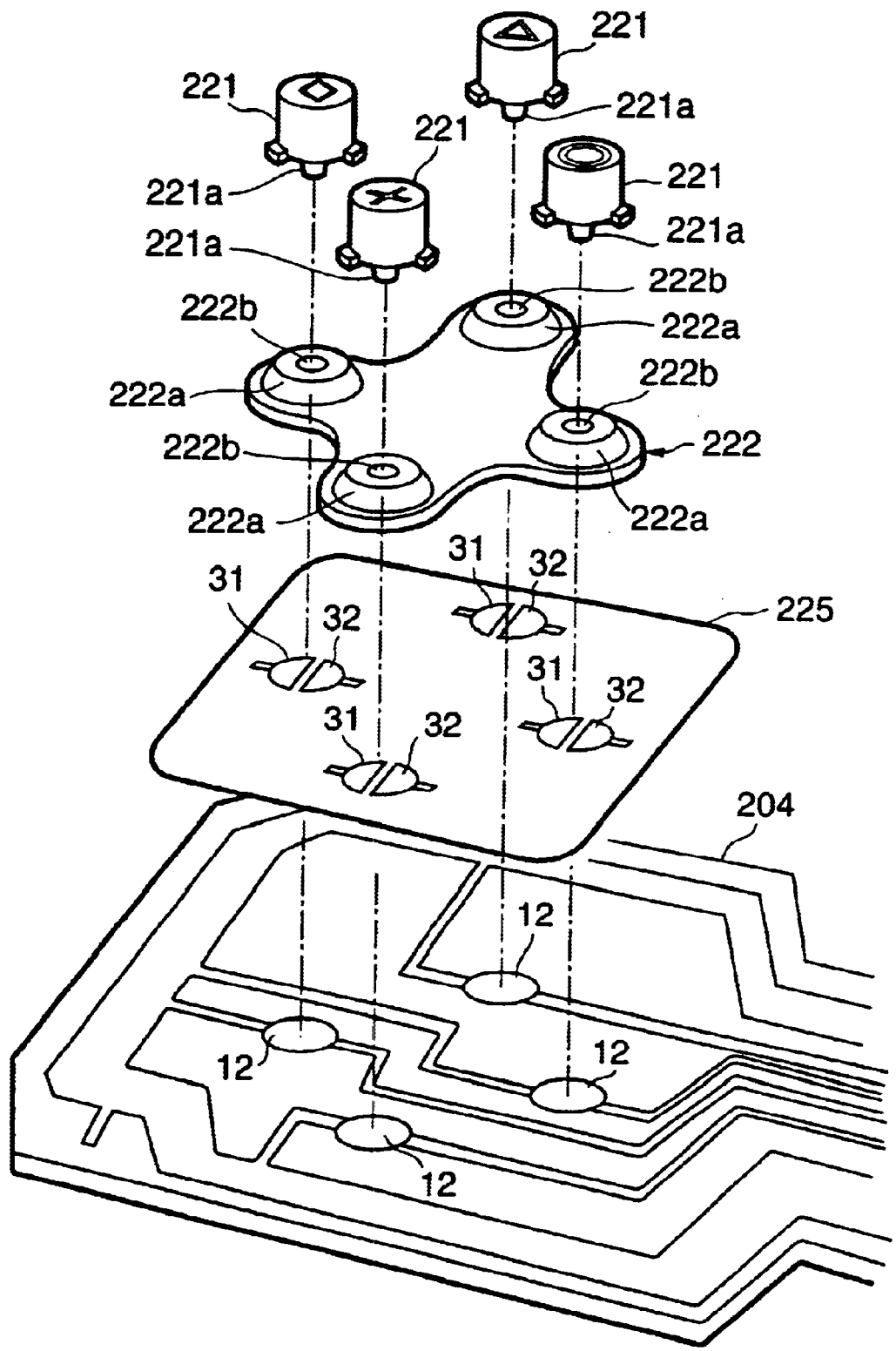
FIG. 29 is an exploded, perspective view of a second configuration example of the second operating unit according to the second embodiment.
Figure 30:
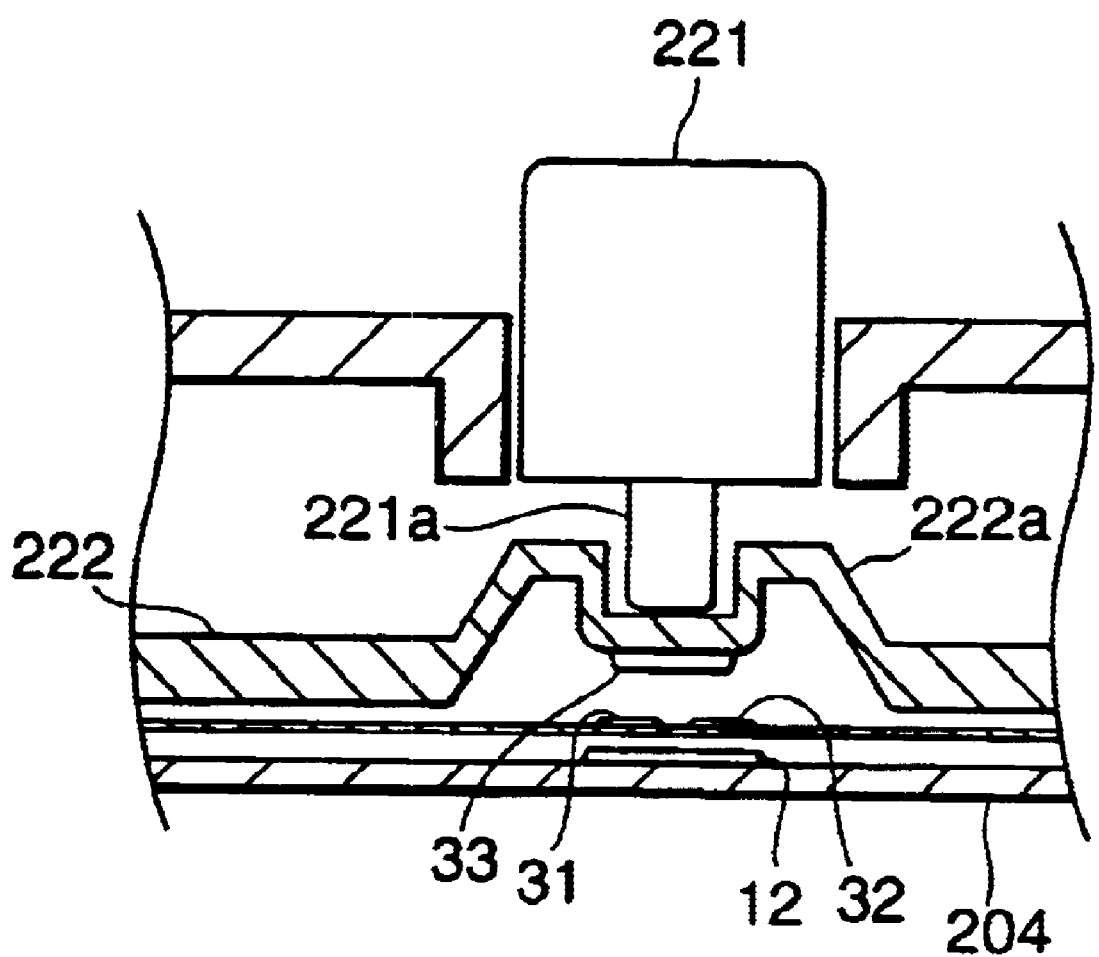
FIG. 30 is a frontal cross-sectional view of the second configuration example of the second operating unit according to the second embodiment.

FIGS. 29 and 30 are diagrams illustrating a second configuration example of the second operating unit of the present embodiment.

The second embodiment shown in these drawings is a configuration wherein the pressure-sensitive elements 12 are directly provided on appropriate positions on the internal board 204 built into the operating device 200. Providing the pressure-sensitive elements 12 to the internal board 204 allows the sheet member 224 to be omitted and the number of parts to be reduced. Of course, the pressure-sensitive elements 12 are to be provided at positions to which the pressing force from the operating buttons 221 can be transmitted.

Figure 31A:
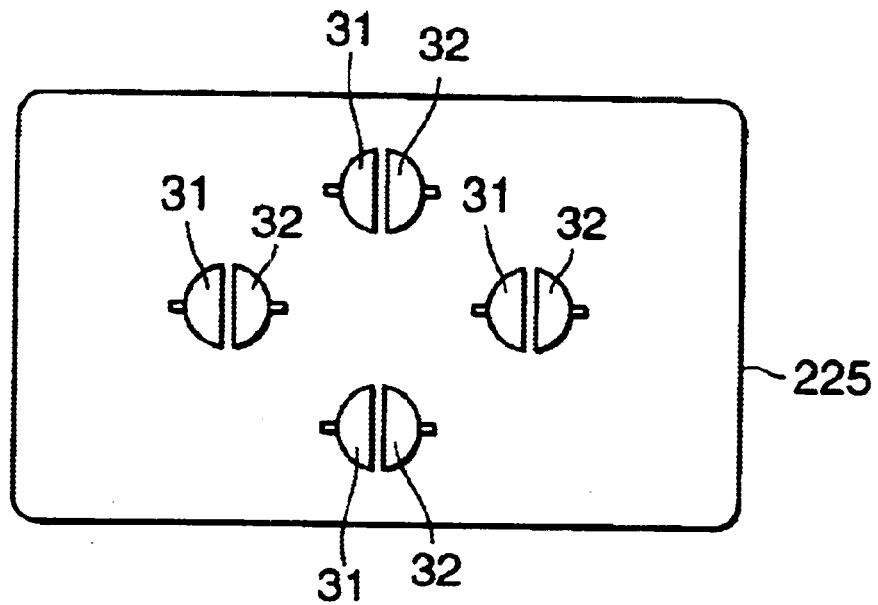
FIG. 31A is a plan view of a third configuration example of the second operating unit according to the second embodiment.
Figure 31B:
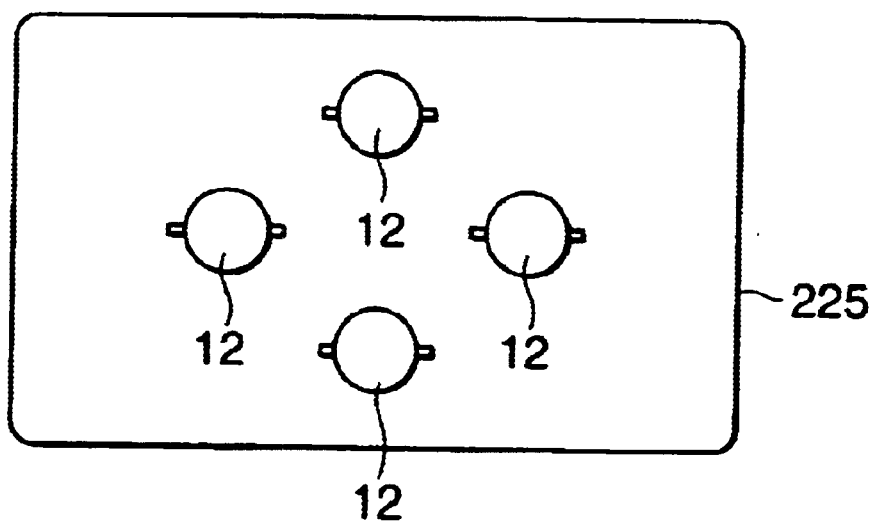
FIG. 31B is a bottom view of the third configuration example of the second operating unit according to the second embodiment.
Figure 32:
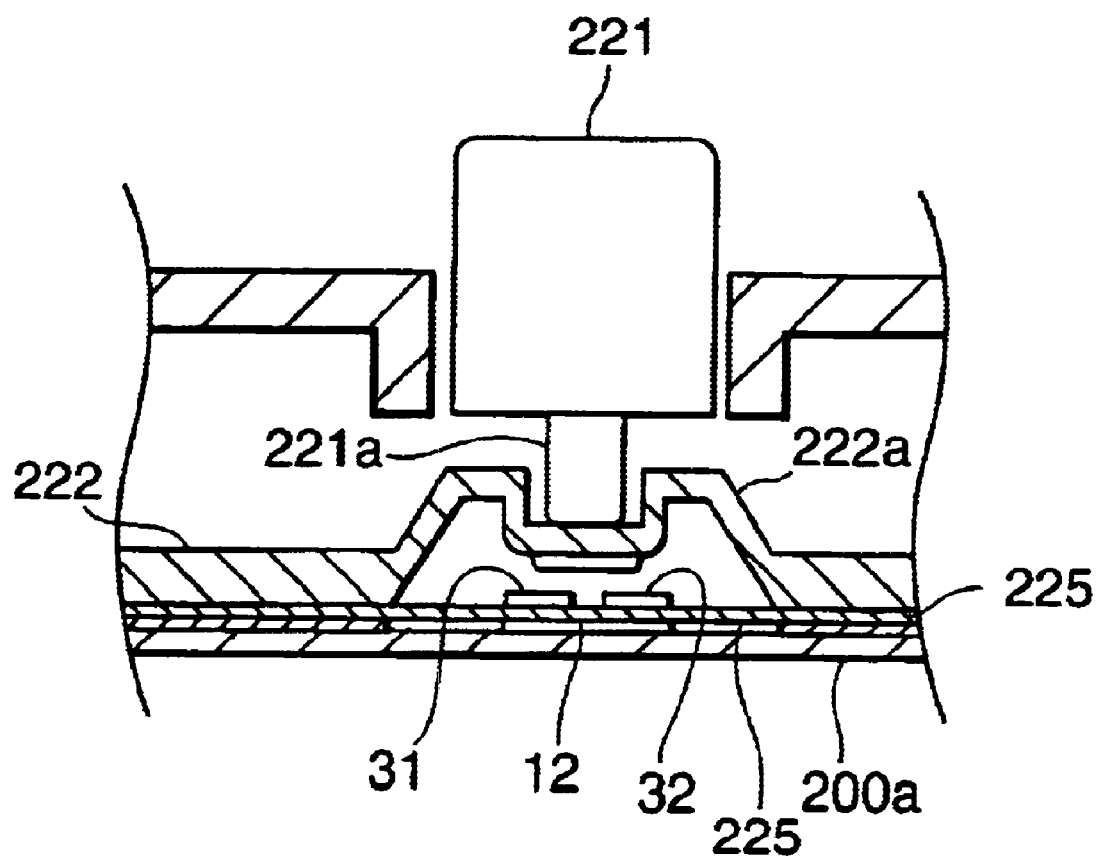
FIG. 32 is a frontal cross-sectional view of the third configuration example of the second operating unit according to the second embodiment.

FIGS. 31 and 32 are diagrams illustrating a third configuration example of the second operating unit of the present embodiment.

With the third embodiment shown in these drawings, the first and second fixed terminals 31 and 32 of the digital switch 30 are provided on the front surface of the sheet member 225, and the pressure-sensitive element 12 is provided on the rear surface of the same sheet member. Of course, the positions of the first and second fixed terminals 31 and 32 and the pressure-sensitive element 12 are arranged so as to face one another across the sheet member 225. Also, the sheet member 225 is positioned so that the pressure-sensitive element 12 is supported in a planar fashion by the inner wall 200*a* of the operating device 200 and the wiring circuit (see FIG. 32).

According to this configuration, one sheet member can be done away with.

Figure 33:
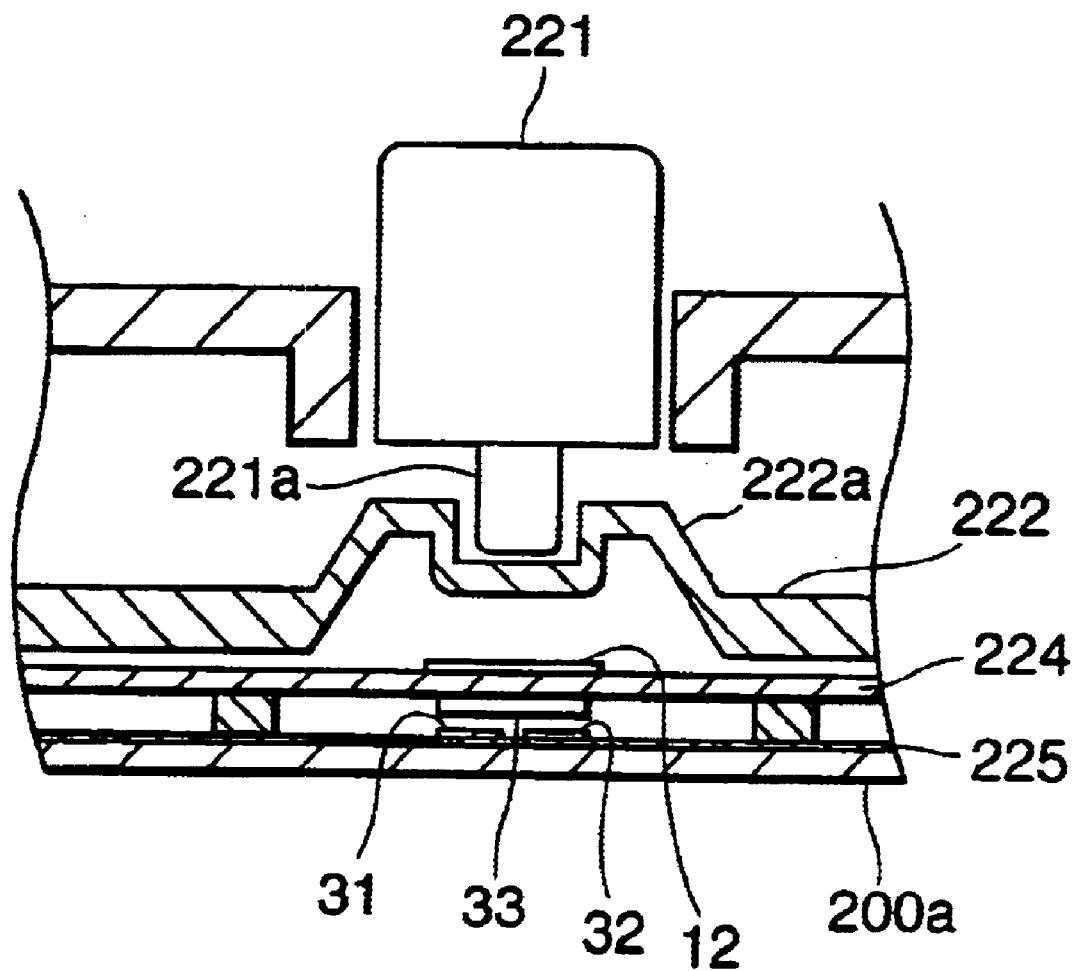
FIG. 33 is a frontal cross-sectional view of a fourth configuration example of the second operating unit according to the second embodiment.

FIG. 33 is a diagram illustrating a fourth configuration example of the second operating unit of the present embodiment.

With the fourth configuration example shown in the Figure, the movable member 33 of the digital switch 30 is provided on the rear surface of the sheet member 224 to which the pressure-sensitive element 12 has been provided on the front surface. Then, the positions of the sheet members 224 and 225 are changed, such that the above sheet member 224 is positioned between the sheet member 225 to which the first and second fixed terminals 31 and 32 have been provided and the elastic member 222. The sheet member 225 is positioned so as to be supported in a planar fashion by the inner wall 200a of the operating device 200 and the wiring circuit (see FIG. 33).

Note that though with the present embodiment various configuration examples have been described regarding the second operating unit 220, similar configurations can be made for the other operating units 210, 230, and 240, as well.

Third Embodiment

Next, a configuration relating to the third embodiment of the present invention will be described in detail. The components thereof which are the same as those in the above-described first embodiment will be denoted with the same reference numerals, and detailed description of such parts will be omitted.

With the above-described operating device 200 according to the first embodiment, the configuration involved using a pressure-sensitive element 12 as the detecting element thereof, but with the third embodiment described next, the detecting element is configured of a resistor 40 and electroconductive material 50.

Figure 34A:
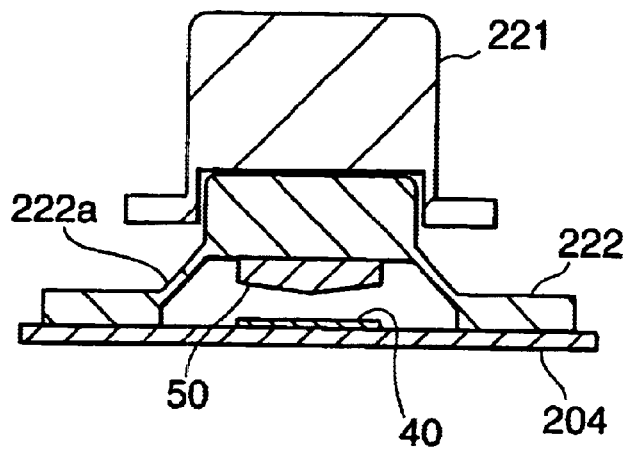
FIGS. 34A–34C are frontal cross-sectional views of a configuration example of the second operating unit according to a third embodiment of the present invention.

FIG. 34 is a diagram illustrating a configuration example of the second operating unit according to the present invention. Incidentally, though the figure only shows one operating button 221 and the related configurations, but the various operating buttons 221 provided in the second operating unit 220 may be of the same configuration, and also operating buttons 221 may be arbitrarily selected and configured as shown in the Figure.

That is, the second operating unit 220 according to the present embodiment comprises operating buttons 221 serving as operators 11, an elastic member 222, an electroconductive member 50, and a resistor 40. The electroconductive member 50 is formed of electroconductive rubber having elasticity, for example, and in the configuration example shown in FIG. 34, is formed in a mountain-like shape with the apex thereof in the center. This electroconductive member 50 is applied by adhesion to the inner top surface of the elastic portion 222a formed in the elastic member 222.

Figure 34B:
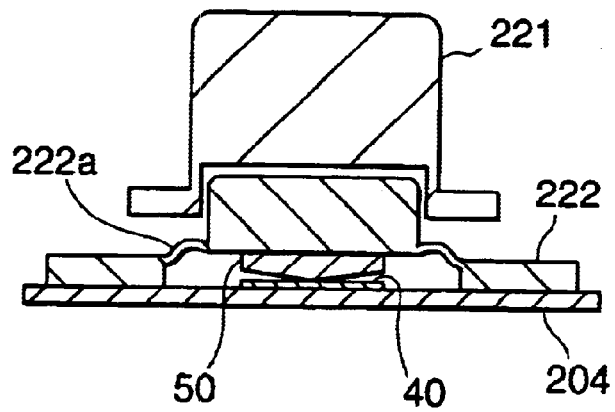
Figure 34C:
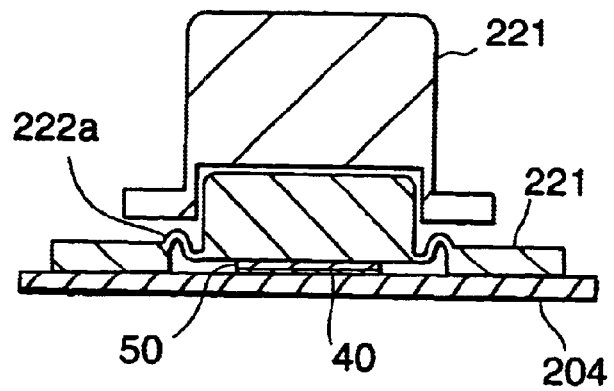

Also, the resistor 40 is provided on the internal board 204, for example, facing the electroconductive member 50, and is configured such that the electroconductive member 50 comes into contact with the resistor 40 by a pressing operation of the operating button 221. The electroconductive member 50 deforms according to the pressing force of the operating button 221 (i.e., the contact pressure with the resistor 40), and the contact area with the resistor 40 changes as shown in FIGS. 34B and 34C. That is, in the event that the pressing force of the operating button 221 is weak, the area near the apex portion of the electroconductive member 50 shaped in a mountain-like form comes into contact with the resistor 40 as shown in FIG. 34B. In the event that the operator increases the pressing force on the operating button 221, the electroconductive member 50 gradually deforms from the apex and the contact area with the resistor 40 increases.

Figure 35:
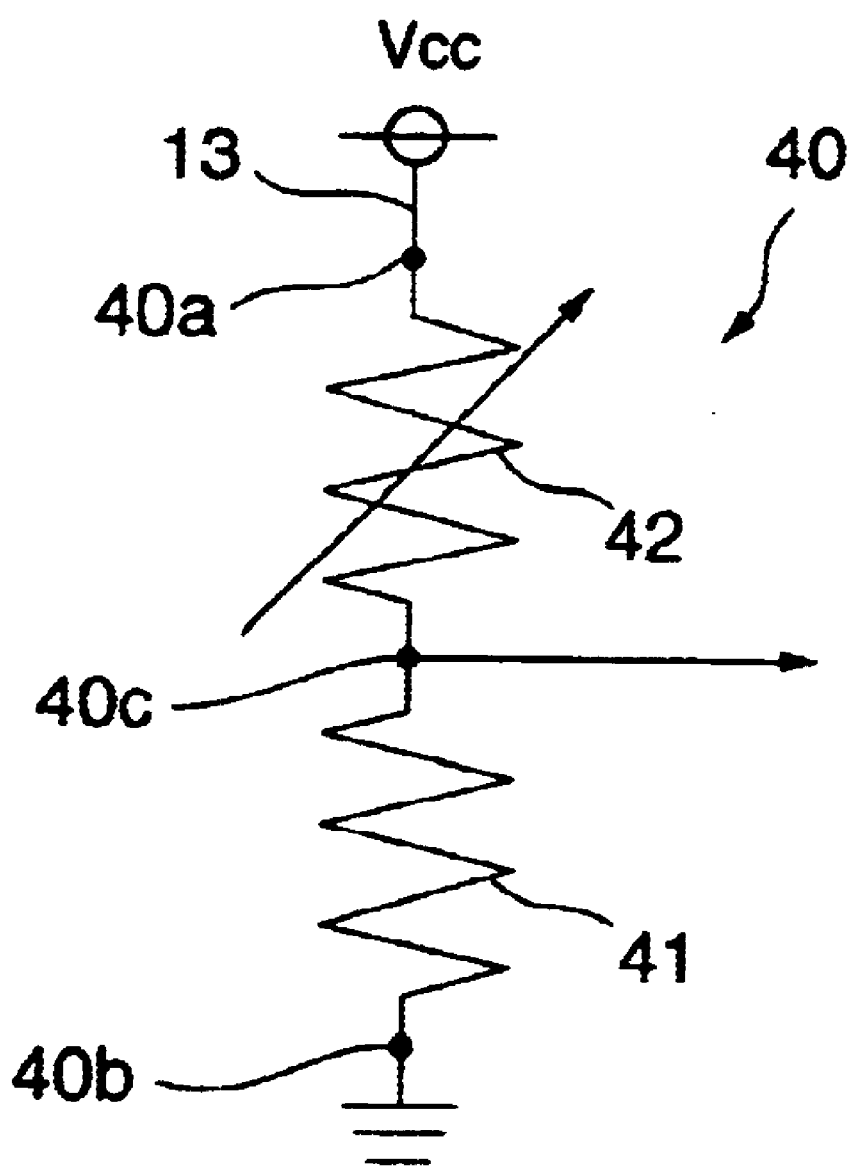
FIG. 35 is a diagram illustrating the circuit configuration of the resistor shown in FIG. 34.

FIG. 35 is a diagram illustrating the circuit configuration of a resistor. As shown in the Figure, the resistor 40 is serially inserted into the electric power source line 13, and voltage is applied between electrodes 40a and 40b. A model representation of the internal resistance of this resistor 40 shows this being divided into a fixed resistor 41 and a variable resistor 42, as shown in the Figure. Of these, the portion of the variable resistor 42 is equivalent to the contact portion of the electroconductive member 50, and changes the resistance value according to the contact area of the electroconductive member 50. That is to say, when the electroconductive member 50 comes into contact with the resistor 40, the electroconductive member 50 serves as a bridge and the current flows through that portion, so the resistance value of the contact portion becomes small. Accordingly, the greater the contact area of the electroconductive member 50 is, the more the resistance value of the resistor 40 is reduced.

With the present embodiment, an output terminal 40c is provided at the center portion of the resistor 40, and analog signals corresponding to the pressing force of the operating button 221 (operator 11) is output from this output terminal 40c.

Figure 36:
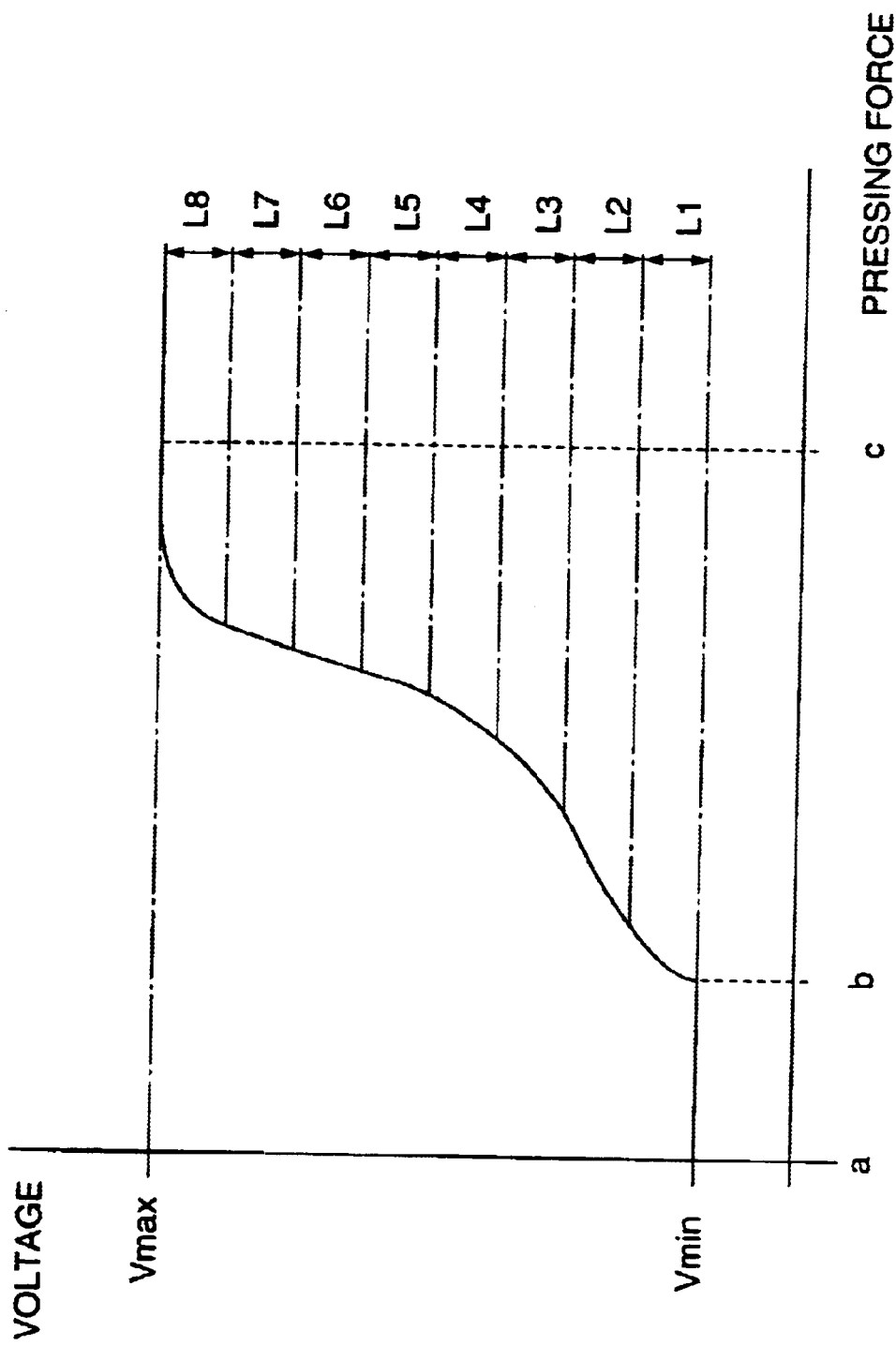
FIG. 36 is a diagram illustrating the properties of analog signals output from the output terminal of the resistor shown in FIG. 35.

FIG. 36 is a diagram illustrating the properties of analog signals (voltage) output from the output terminal of the resistor 40.

First, voltage is applied to the resistor 40 at the time of turning the power on, so even in the event that the operating button 221 is not pressed, a constant analog signal (voltage) Vmin is output from the output terminal 40c (position "a" in the Figure). Next, even in the event that the operating button 221 is pressed, the resistance value of the resistor 40 does not change until the electroconductive member 50 comes into contact with the resistor 40, so the output from the resistor 40 remains unchanged at Vmin. Further, in the event that the operating button 221 is pressed and the electroconductive member 50 comes into contact with the resistor 40 (the pressing position denoted by "b" in the Figure), the contact area of the electroconductive member 50 as to the resistor 40 subsequently increases according to the pressing force of the operating button 221, so the internal resistance of the resistor 40 decreases, and analog signals (voltage) output from the output terminal 40c of the resistor 40 increase. Then, at the point that the electroconductive member 50 has deformed as much as possible, the analog signals (voltage) output from the output terminal 40c of the resistor 40 reach a maximum Vmax (the pressing position denoted by "c" in the Figure).

Figure 37:
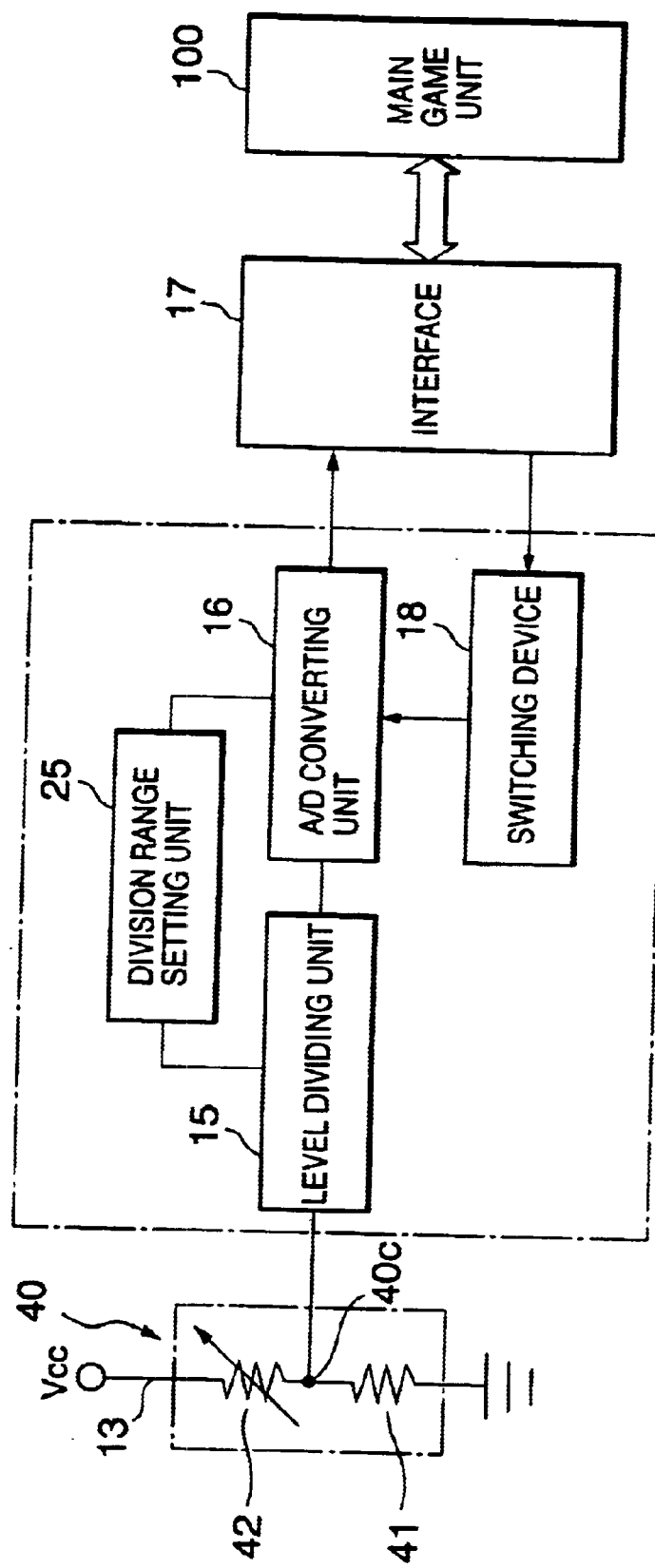
FIG. 37 is a block diagram illustrating the primary portions relating to the second operating unit according to the third embodiment.

FIG. 37 is a block diagram illustrating the principle portions of the operating device according to the third embodiment of the present invention.

In the present embodiment as well, the MPU 14 mounted to the internal board within the operating device 200 comprises the functions of the level dividing unit 15, A/D converting unit 16, and switching unit 18. With the present embodiment, analog signals (voltage) output from the output terminal 40c of the resistor 40 are input to the level dividing unit 15, the output level of the analog signals is divided into a plurality of levels at the level dividing unit 15, and further, the A/D converting unit 16 converts the analog signals output from the resistor 40 into digital signal based on the divided output level.

The functions of the level dividing unit 15 and A/D converting unit 16 are the same as with the above-described first embodiment, and the level dividing unit 15 has the basic function of dividing the level range of analog signals (voltage) output from the resistor 40 into uniform widths, as shown in FIG. 36. The number of divisions can be arbitrarily set, and with the example shown in FIG. 36, the level range of the analog signals (voltage) is uniformly divided into eight levels. Each uniformly-divided output level L1 through L8 is transferred to the A/D converting unit 16. Also, the level range of analog signals to be uniformly divided can be arbitrarily changed with the level dividing unit 15.

The A/D converting unit 16 converts analog signals into digital signals and outputs the same, according to the output level of the analog signals subjected to level-division at the level dividing unit 15. That is, multiple-bit digital signals are output from the A/D converting unit 16, according to the above output levels L1 through L8.

Then, the A/D converting unit 16 assigns appropriate multi-bit digital signals to each of the output levels subjected to level-division, and outputs these. For example, 16-bit multi-bit digital signals are assigned to the above output levels, such that level 1 is "1f", level 2 is "3f", and so on through "ff" for level 8.

The multi-bit digital signals output from the A/D converting unit 16 are sent to the main game unit 100 via an interface 17 provided in the internal board of the operating device 200, and action and the like of the game character is executed by these digital signals.

The level change of the analog signals output from the output terminal 40c of the resistor 40 corresponds to the change in pressure force received from the operating button 221 (operator 11) as described above. Accordingly, the multi-bit digital signals output from the A/D converting unit 16 correspond to the pressure force applied to the operating button 221 (operator 11) by the user. Controlling the action and the like of the game character by such multi-bit digital signals related to the pressing operation by the user enable realization of movements smoother in analog fashion as compared to the control by single-bit digital signals of "1" or "0".

Also, with the present embodiment, the A/D converting unit 16 is configured to function also as binary digital signal output means for outputting single-bit digital signals (i.e., "1" or "0"), according to the change in analog signals output from the output terminal 40c of the resistor 40, and outputs one or the other of the multi-bit digital signals and single-bit digital signals from the A/D converting unit 16 by a switching operation of the switching device 18.

With the present embodiment, the switching device 18 is controlled by control signals sent from the main game unit 100 based on game programs recorded in the optical disk. That is, controls signals for instructing whether to cause the A/D converting unit 16 to function as means for outputting multi-bit digital signals or to function as means for outputting single-bit digital signals are output according to the contents of a game program being executed from an optical disk mounted onto the main game unit 100. Based on these control signals, the switching device 18 selects and switches the functions of the A/D converting unit 16.

The A/D converting unit 16 follows the functions selected by the switching device 18, and converts the analog signals output from the output terminal 40c of the resistor 40 into one or other of multi-bit digital signals or single-bit digital signals and outputs the same. In the event that functioning as means for outputting multi-bit digital signals is selected, the output levels uniformly divided by the level dividing unit 15 as described above are converted into corresponding digital signals, and output to the main game unit 100.

On the other hand, in the event that functioning as means for outputting single-bit digital signals is selected, single-bit digital signals of "1" or "0" output to the main game unit 100, according to the change in analog signals output from the output terminal 40c of the resistor 40. That is, in the event that the A/D converting unit 16 recognizes the analog signals output from the output terminal 40c of the resistor 40 as being the minimal value Vmin, judgement is made that the operating button is not pressed, and a digital signal "0" is output. On the other hand, in the event that recognition is made based on the output from the A/D converting unit 16, that the analog signals output from the output terminal 40c of the resistor 40 are not the minimal value Vmin, judgement is made that the operating button is pressed, and a digital signal "1" is output.

Incidentally, the switching device 18 may be configured so as to be switched by manual operations by the user. For example, an arrangement may be made wherein functions for switching the switching device 18 are appropriated to the analog selecting switch 252 provided in the operating device 200, so as to work the switching device 18 manually with the switch 252, thereby switching the functions of the A/D converting unit 16.

Now, as described above, the level dividing unit 15 uniformly divides the output level of analog signals output from the resistor 40 in preset ranges, but in the event that there is an offset between the level range of the analog signals (voltage) actually output from the resistor 40 and this preset range, there may arise a situation wherein digital signals matching the operating state of the operator 11 cannot be output.

However, there are individual differences in the resistor 40 and the electroconductive member 50, and there is also irregularity in the power source voltage, so the output ranges of the analog signals output from the resistor 40 of each operating device 200 also differ.

Accordingly, the operating device 200 according to the present embodiment is provided with a division range setting unit 25 for individually setting the output level ranges of analog signals divided by the level dividing unit 15 (see FIG. 37), such that the level range of the analog signals (voltage) to be divided at the level dividing unit 15 can be calibrated.

Figure 38:
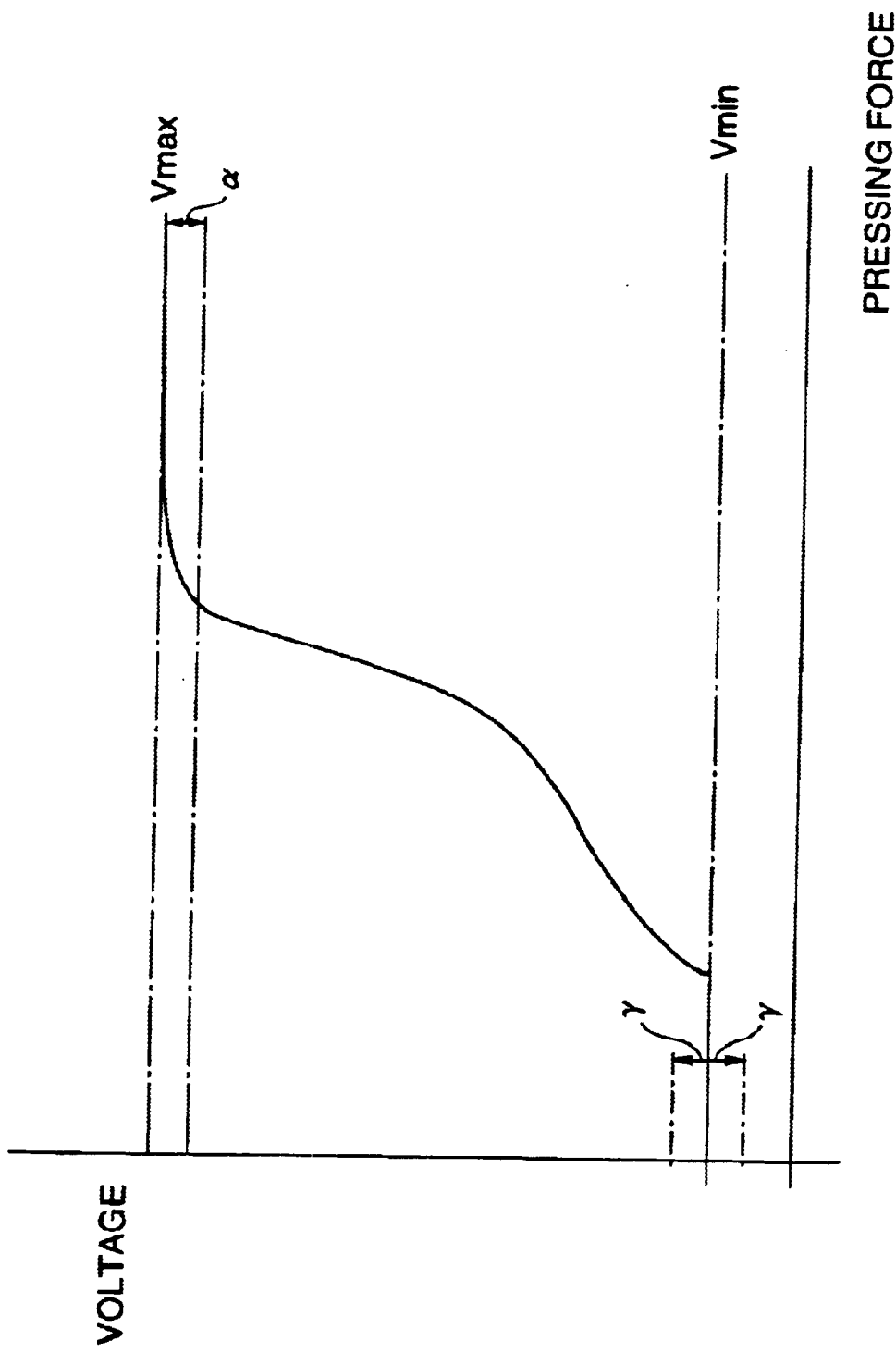
FIG. 38 is a diagram for describing the functions of the division range setting unit for the second operating unit according to the third embodiment.

FIG. 38 is a diagram for describing the functions of the division range setting unit.

As shown in FIG. 38, initial setting of the minimal value Vmin and maximal value Vmax of the analog signals (voltage) output from the resistor 40 is made beforehand at the division range setting unit 25. Also, regarding the maximal value Vmax, an arbitrary tolerance value $\alpha$ is set beforehand. This arbitrary tolerance value $\alpha$ is for absorbing irregularities in the recognition of the output of the resistor (i.e., analog signals) from the information from the A/D converting unit 16. Further, a judging value $\gamma$ for judging whether or not the operating button is in a pressed state is set beforehand around the minimal value Vmin.

The division range setting unit 25 executes the calibration operation as follows under such settings.

Once the power is turned on to the operating device 200, first, the division range setting unit 25 recognizes the level Vmin(Real) of the analog signal (voltage) actually being output from the resistor 40 based on information from the A/D converting unit 16, in order to adjust the minimal value Vmin of the analog signals (voltage) output from the resistor 40.

At this time, the user may be pressing the operating button 221, so judgement is made whether Vmin(Real) is within the range of the margin of error tolerance value γ centered around Vmin. In the event that Vmin(Real) is out of the range of (Vmin+γ)<Vmin(Real)<(Vmin−γ), an action for notifying the user that calibration is running is executed.

As for this action, for example, a display portion 253 provided in the operating device 200 may be lit or may blink, or in the event that the operating device 200 has a vibration function built in this function may be activated, or like means can be used.

Next, under the condition that Vmin(Real) is within the range of (Vmin+γ)<Vmin(Real)<(Vmin−γ), the value of Vmin(Real) is compared with Vmin. In the event that the comparison results in Vmin(Real)>Vmin, the initial setting value Vmin is set as the minimal value of the analog signals (voltage) output from the resistor 40. On the other hand, in the event that Vmin(Real)<Vmin holds, the actual output value Vmin(Real) is newly set as the minimal value of the analog signals (voltage) output from the resistor 40.

Next, the user is made to firmly press the operating button 221 following an operating manual or the like, and the level Vmax(Real) of the analog signal (voltage) actually being output from the resistor 40 based on information output from the A/D converting unit 16 is recognized.

In the event that Vmax(Real) is greater than (Vmax−α) which includes the tolerance value α, recognition is made that the user has pressed the operating button 221 to the limit, and thus Vmax(Real) and Vmax are compared. In the event that the comparison results in Vmax(Real)<Vmax, the initial setting value Vmax is set as the maximal value of the analog signals (voltage) output from the resistor 40. On the other hand, in the event that Vmax(Real)>Vmax holds, the actual output value Vmax(Real) is newly set as the maximal value of the analog signals (voltage) output from the resistor 40.

The division range setting unit 25 controls the level dividing unit 15 so as to uniformly divide the analog signals (voltage) output from the resistor 40, within the range from the minimal value Vmin to maximal value Vmax set as described above.

Figure 39:
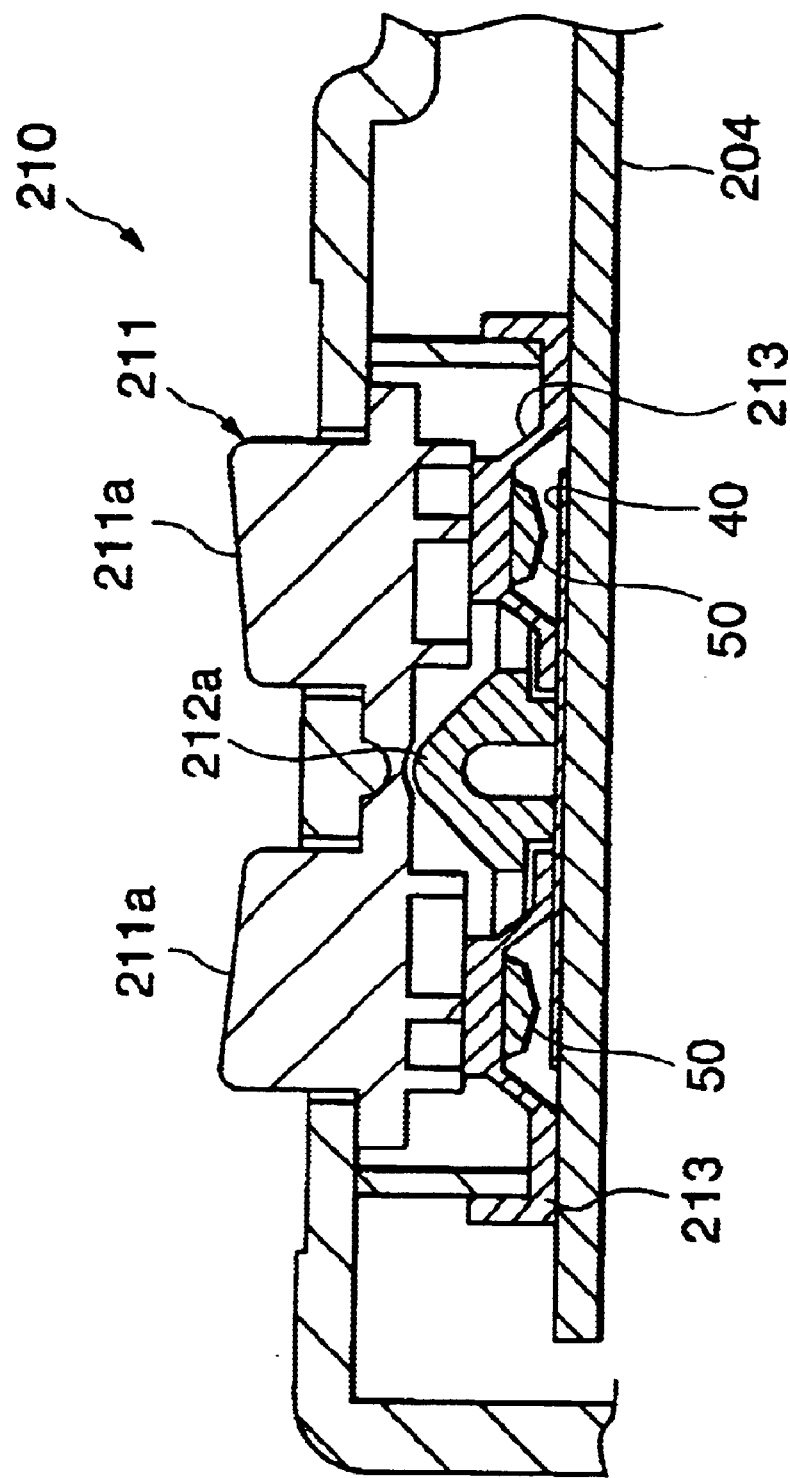
FIG. 39 is a frontal cross-sectional view of a configuration example of the first operating unit according to the third embodiment of the present invention.

FIG. 39 is a diagram illustrating a configuration example of the first operating unit according to the present embodiment.

With the configuration example of the first operating unit shown in the Figure, electroconductive members 50 are applied by adhesion to the inner side ceiling plane of the elastic member 213 of the operating keys 211*a* (operators 11) of the cross-shaped operating member 211 is a corresponding manner. Also, the resistors 40 are arranged such that singular items are positioned so as to face each of the electroconductive members 50.

Figure 40:
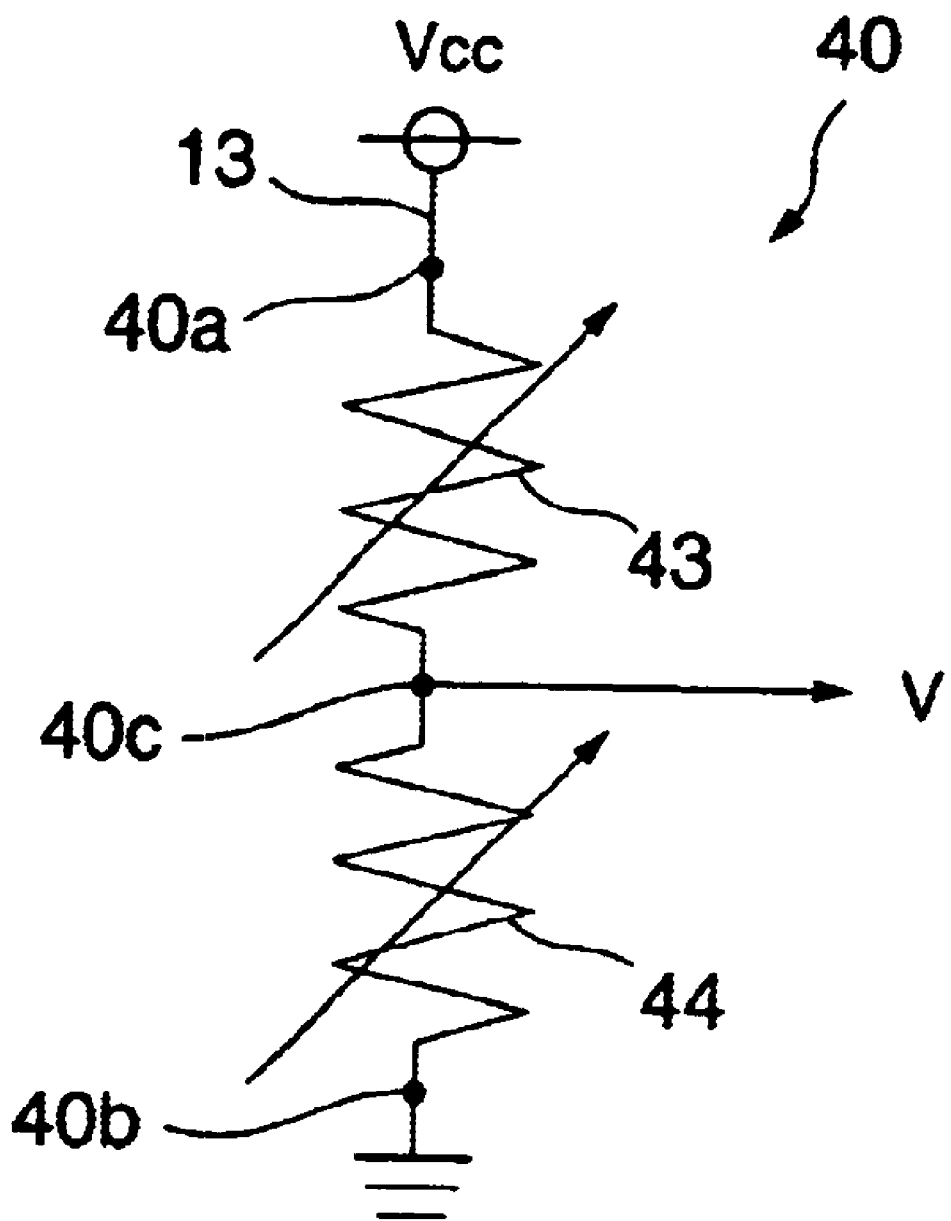
FIG. 40 is a diagram illustrating the circuit configuration of the resistor shown in FIG. 39.

FIG. 40 is a diagram illustrating the circuit configuration of the resistor. As shown in FIG. 40, the resistor 40 is serially inserted into the electric power source line 13, and voltage is applied between electrodes 40*a* and 40*b*. A model representation of the internal resistance of this resistor 40 shows this being divided into first and second variable resistors 43 and 44, as shown in the Figure. Of these, the first variable resistor 43 is arranged such that, for example, the electroconductive member 50 moving with the operating key 211*a* for moving the character in the upwards direction (the up key), and the electroconductive member 50 moving with the operating key 211*a* for moving the character in the left direction (the left key) each comes into contact therewith, and the resistance value changes according to the area of contact with the electroconductive members 50. Also, the second variable resistor 44 is arranged such that, for example, the electroconductive member 50 moving with the operating key 211*a* for moving the character in the downwards direction (the down key), and the electroconductive member 50 moving with the operating key 211*a* for moving the character in the right direction (the right key) each comes into contact therewith, and the resistance value changes according to the area of contact with the electroconductive members 50.

An output terminal 40*c* is provided at the intermediate portion between the variable resistors 43 and 44, such that analog signals corresponding to the pressing force of the operating keys 211*a* (operators 11) are output from this output terminal 40*c*.

The output from the output terminal 40*c* can be calculated from the division ratio of the resistance values that the first and second variable resistors 43 and 44 have, and for example, with R1 representing the resistance value of the first variable resistor 43 and R2 representing the resistance value of the second variable resistor 44, and with the power source voltage as Vcc, the output voltage V manifested at the output terminal 40*c* can be expressed as follows:

$$V = Vcc \times R2/(R1+R2)$$

Accordingly, in the event that the resistance value of the first variable resistor 43 decreases, the output voltage increases, and on the other hand, in the event that the resistance value of the second variable resistor 44 decreases, the output voltage decreases as well.

Figure 41:
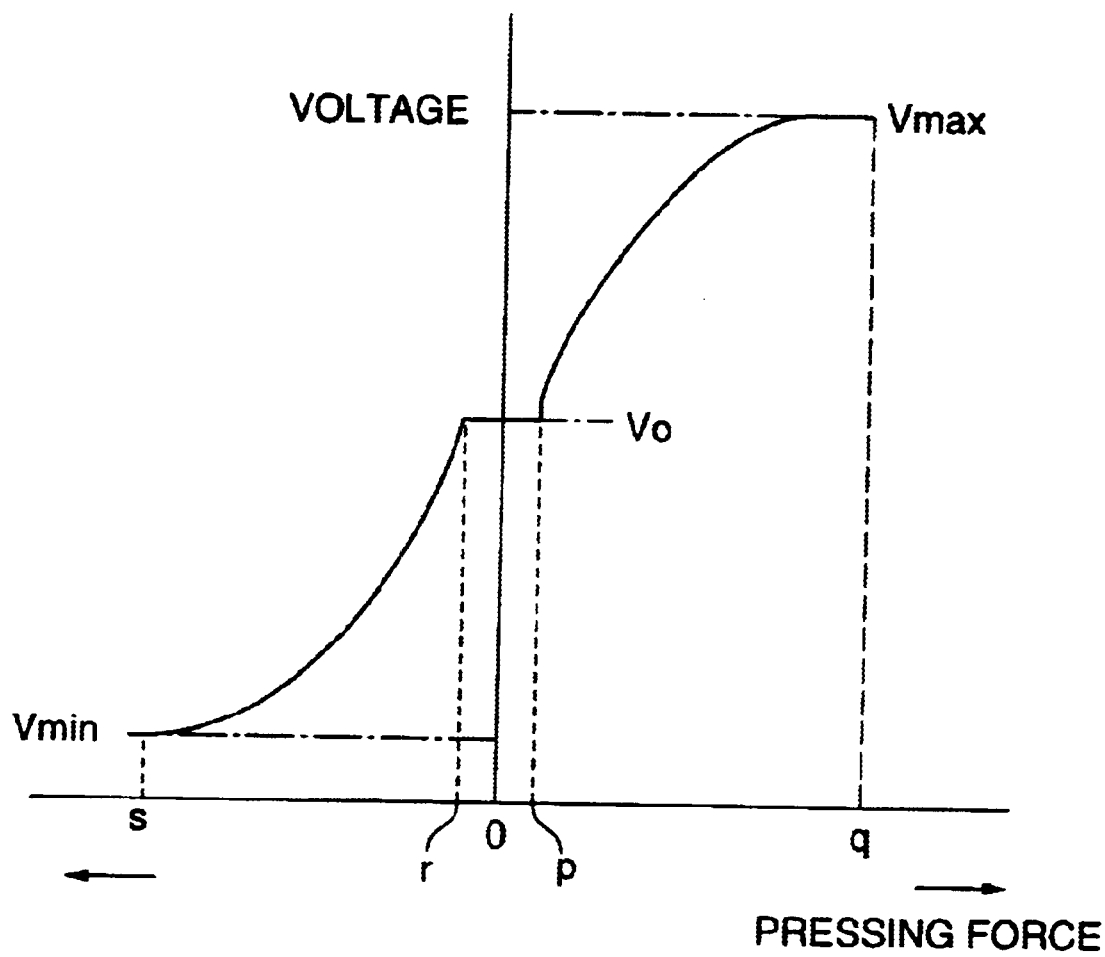
FIG. 41 is a diagram illustrating the properties of analog signals output from the output terminal of the resistor shown in FIG. 40.

FIG. 41 is a diagram illustrating the properties of analog signals (voltage) output from the output terminal of the resistor.

First, voltage is applied to the resistor 40 at the time of turning the power on, so even in the event that the operating keys 211*a* of the operating member 211 are not pressed, a constant analog signal (voltage) V0 is output from the output terminal 40*c* (position "o" in the Figure).

Next, even in the event that an operating key 211*a* is pressed, the resistance value of the resistor 40 does not change until the electroconductive member 50 comes into contact with the resistor 40, so the output from the resistor 40 remains unchanged at V0.

Further, in the event that the up direction key or left direction key is pressed and the electroconductive member 50 comes into contact with the first variable resistor 43 portion of the resistor 40. (the pressing position denoted by "p" in the Figure), the contact area of the electroconductive member 50 as to the first variable resistor 43 portion subsequently increases according to the pressing force of the operating key 211*a* (operator), so the resistance value at that portion decreases, and analog signals (voltage) output from the output terminal 40*c* of the resistor 40 increase. Then, at the point that the electroconductive member 50 has deformed as much as possible, the analog signals (voltage) output from the output terminal 40*c* of the resistor 40 reach a maximum Vmax (the pressing position denoted by "q" in the Figure).

On the other hand, in the event that the down direction key or right direction key is pressed and the electroconductive member 50 comes into contact with the second variable resistor 44 portion of the resistor 40 (the pressing position denoted by "r" in the Figure), the contact area of the electroconductive member 50 as to the second variable resistor 44 portion subsequently increases according to the pressing force of the operating key 211*a*, so the resistance value at that portion decreases, and consequently analog signals (voltage) output from the output terminal 40*c* of the resistor 40 decrease. Then, at the point that the electroconductive member 50 has deformed as much as possible, the analog signals (voltage) output from the output terminal 40c of the resistor 40 reach a minimum Vmin (the pressing position denoted by "s" in the Figure).

Figure 42:
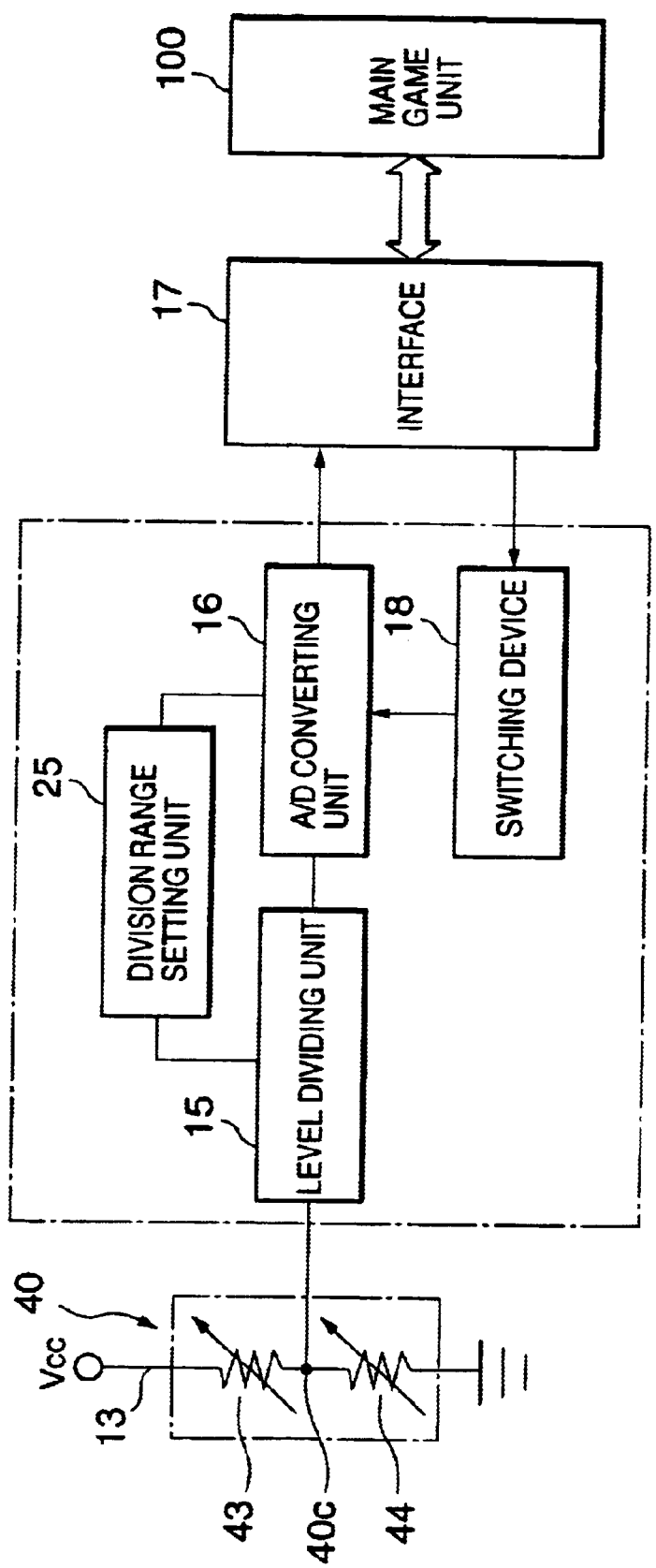
FIG. 42 is a block diagram illustrating the primary portions relating to the first operating unit according to the third embodiment.

The analog signals (voltage) output from the output terminal 40c of the resistor 40 are input to the level dividing unit 15 as shown in FIG. 42, the output level of the analog signals is divided into a plurality of levels at the level dividing unit 15, and further, the A/D converting unit 16 converts the analog signals output from the resistor 40 into digital signals according to the divided output level. The functions of the level dividing unit 15, A/D converting unit 16, and switching unit 18, shown in FIG. 42, are the same as already described based on FIG. 37, so detailed description will be omitted here.

Figure 43:
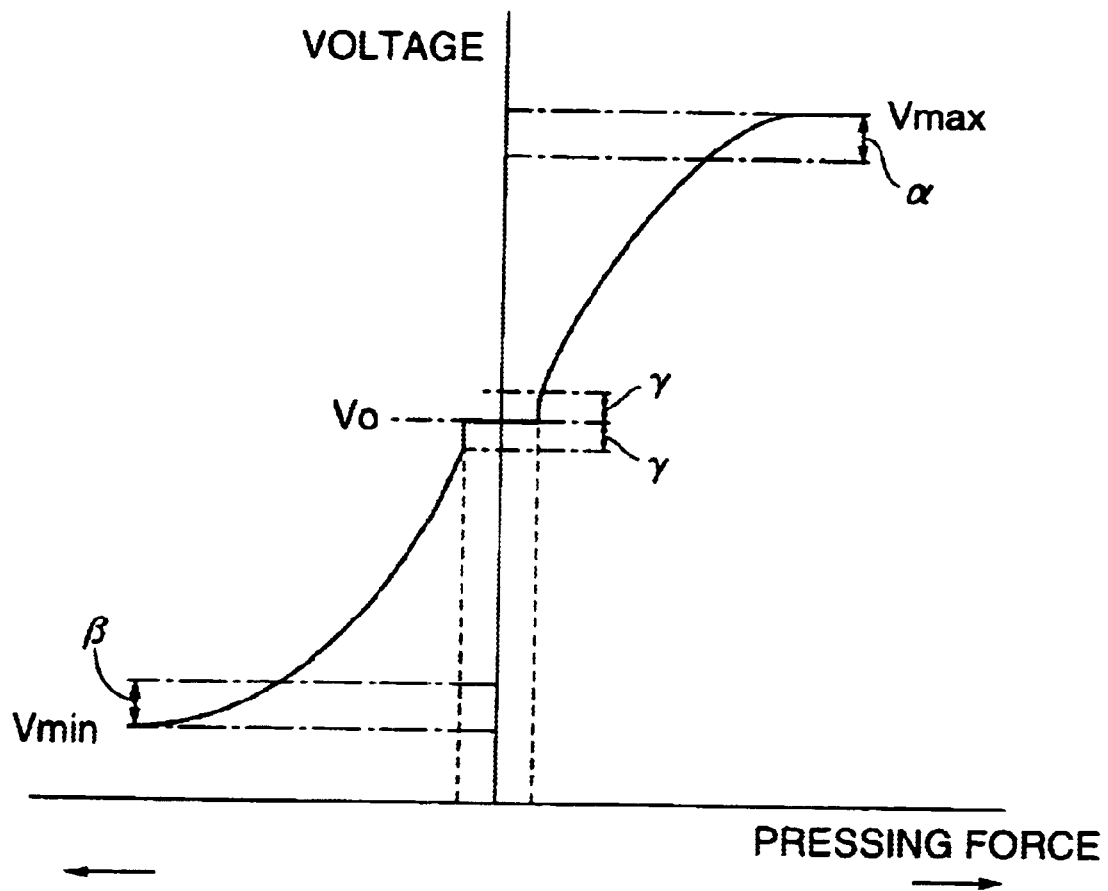
FIG. 43 is a diagram for describing the functions of the division range setting unit for the first operating unit according to the third embodiment.
Figure 44A:
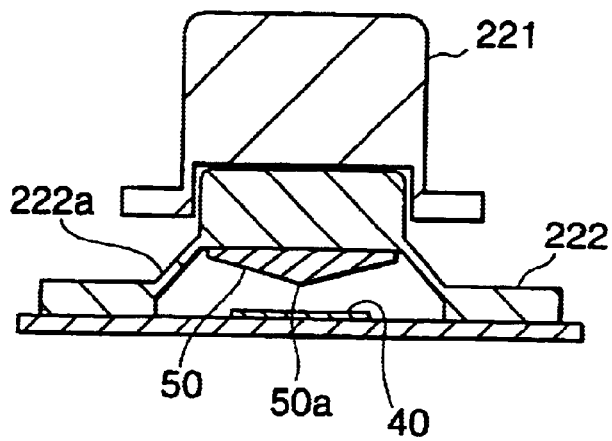
Figure 44B:
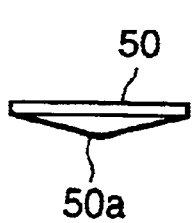
Figure 44C:
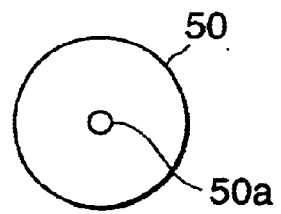
Figure 44D:
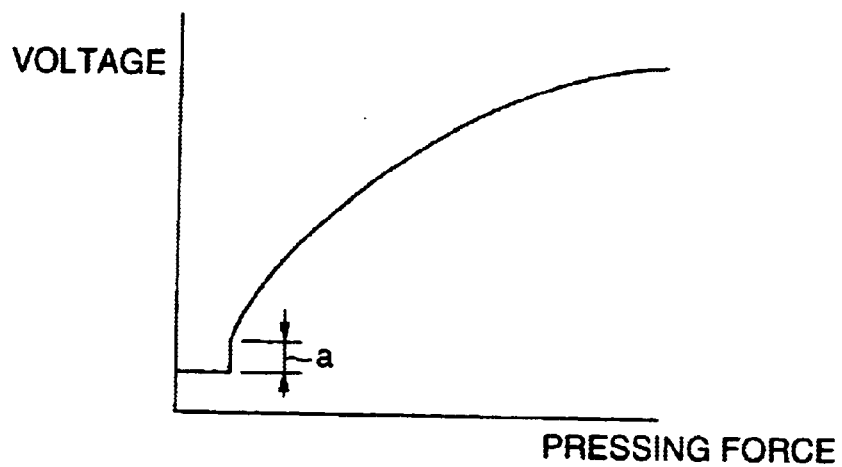
Figure 45A:
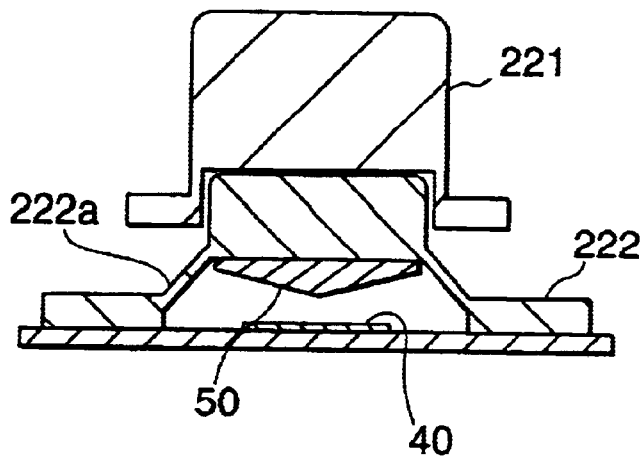
Figure 45B:
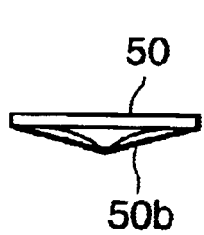
Figure 45C:
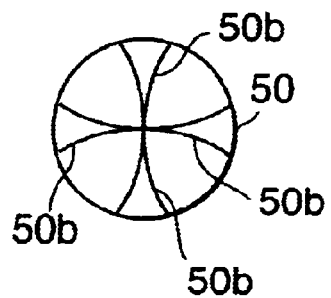
Figure 45D:
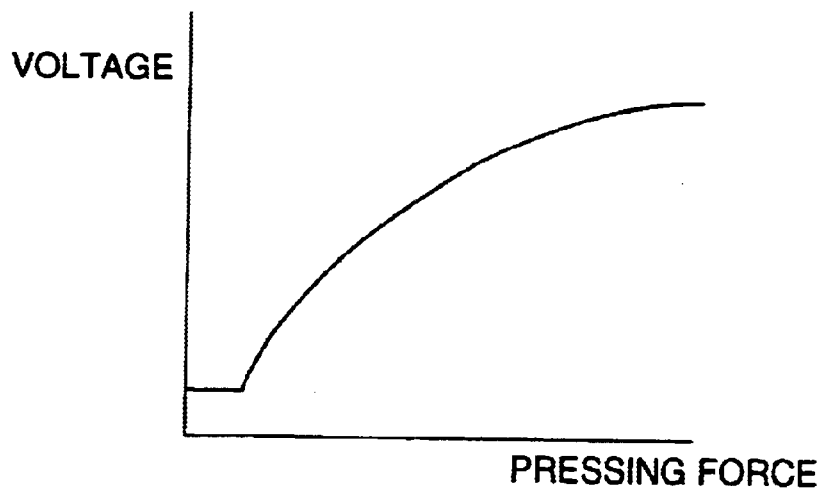
Figure 46A:
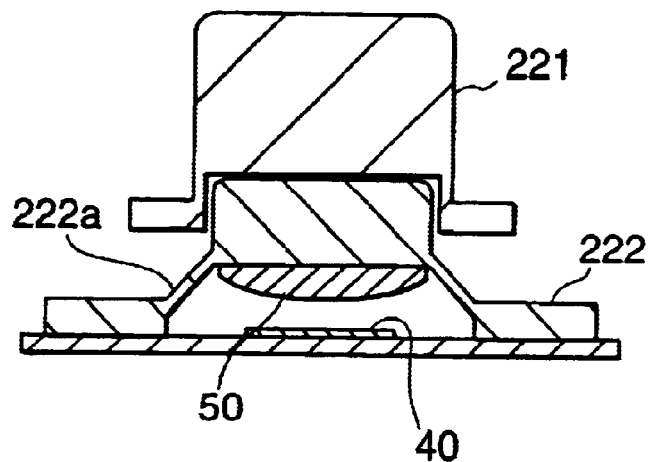
Figure 46B:
Figure 46C:
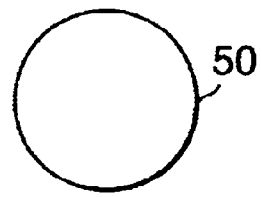
Figure 46D:
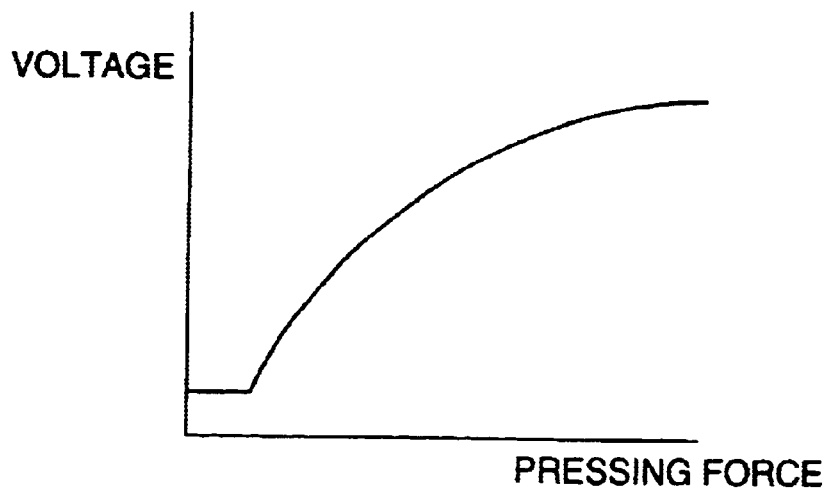

As shown in FIG. 43, initial setting of the non-pressing value V0, minimal value Vmin, and maximal value Vmax, of the analog signals (voltage) output from the resistor 40 at the time of operating is made beforehand at the division range setting unit 25, for individually setting (calibrating) the output level range of the analog signals divided by the level dividing unit 15. Also, regarding the maximal value Vmax, an arbitrary tolerance value α is set beforehand, and regarding the minimal value Vmin, an arbitrary tolerance value β is set beforehand. These tolerance values α and β are for absorbing irregularities in the recognition of the output of the resistor (i.e., analog signals) from the information from the A/D converting unit 16. Further, a judging value γ for judging whether or not the operating button is in a pressed state is set beforehand around the analog signal (voltage) V0 output in the case of no pressing operation.

The division range setting unit 25 executes the calibration operation as follows under such settings.

Once the power is turned on to the operating device, first, the division range setting unit 25 recognizes the level V0(Real) of the analog signal (voltage) actually being output from the resistor 40 based on information from the A/D converting unit 16, in order to adjust the analog signals (voltage) V0 output from the resistor 40 at the time of the button not being pressed.

At this time, the user may be pressing an operating key, so judgement is made whether or not V0(Real) is within the range of the margin of error tolerance value γ centered around V0. In the event that V0(Real) is out of the range of (V0+γ)<V0(Real)<(V0−γ), an action for notifying the user that calibration is running is executed.

As for this action, for example, a display portion 253 provided in the operating device may be lit or may blink, or in the event that the operating device has a vibration function built in this function may be activated, or like means can be used.

Next, under the condition that V0(Real) is within the range of (V0+γ)<V0(Real)<(V0−γ), the value of V0(Real) is compared with V0. In the event that the comparison results in V0(Real)>V0, the initial setting value V0 is set as the value of the analog signals (voltage) output from the resistor 40 at the time of non-pressing. On the other hand, in the event that V0(Real)<V0 holds, the actual output value V0(Real) is newly set as the minimal value of the analog signals (voltage) output from the resistor 40 at the time of non-pressing.

Next, the user is made to firmly press the up direction key following an operating manual or the like, and the level Vmax(Real) of the analog signal (voltage) actually being output from the resistor 40 based on information output from the A/D converting unit 16 is recognized.

In the event that Vmax(Real) is greater than (Vmax−α) which includes the tolerance value α, recognition is made that the user has pressed the up direction key to the limit, and thus Vmax(Real) and Vmax are compared. In the event that the comparison results in Vmax(Real)<Vmax, the initial setting value Vmax is set as the maximal value of the analog signals (voltage) output from the resistor 40. On the other hand, in the event that Vmax(Real)>Vmax holds, the actual output value Vmax(Real) is newly set as the maximal value of the analog signals (voltage) output from the resistor 40.

The same operation is performed for the left direction key also, and the maximum value Vmax for the analog signals (voltage) output from the resistor 40 at the time of pressing the left direction key is set.

Next, the user is made to firmly press the down direction key following an operating manual or the like, and the level Vmin(Real) of the analog signal (voltage) actually being output from the resistor 40 based on information output from the A/D converting unit 16 is recognized.

In the event that Vmin(Real) is greater than (Vmin−β) which includes the tolerance value β, recognition is made that the user has pressed the down direction key to the limit, and thus Vmin(Real) and Vmin are compared. In the event that the comparison results in Vmin(Real)>Vmin, the initial setting value Vmin is set as the minimal value of the analog signals (voltage) output from the resistor 40. On the other hand, in the event that Vmin(Real)<Vmin holds, the actual output value Vmin(Real) is newly set as the minimal value of the analog signals (voltage) output from the resistor 40.

The same operation is performed for the right direction key also, and the minimal value Vmin for the analog signals (voltage) output from the resistor 40 at the time of pressing the right direction key is set.

The division range setting unit 25 controls the level dividing unit 15 regarding the up direction key and left direction key so as to uniformly divide the analog signals (voltage) output from the resistor 40, within the range from the output V0 at the time of non-pressing to the maximal value Vmax, set as described above. The division range setting unit 25 also controls the level dividing unit 15 regarding the down direction key and right direction key so as to uniformly divide the analog signals (voltage) output from the resistor 40, within the range from the output V0 at the time of non-pressing to the minimal value Vmin.

Incidentally, though in the above description, the up direction key and left direction key are appropriated to the first variable resistor portion of the resistor 40, and the down direction key and right direction key are appropriated to the second variable resistor portion, but the present invention is by no means restricted to this arrangement, and it is needless to say that appropriation of the keys and variable resistor portions may be carried out arbitrarily.

Also, regarding the fist operating unit 210, individually provided resistors 40 may be positioned for the electroconductive members 50 provided for the operating keys 211a of the operating member 211, so as to have a circuit configuration such as shown in FIG. 35. In this case, the properties of the analog signals (voltage) output from the output terminal 40c of the resistor 40 are as shown in FIG. 36.

Variation of Detecting Element

Next, a variation example of the detecting element made up of a resistor 40 and electroconductive member 50 will be described. Incidentally, though the following description is made regarding an example of a detecting element provided in the second operating unit 220, it is needless to say that application of the following detecting element can be made to other operating units as well.

FIGS. 44 through 47 illustrate a detecting element wherein the form of the electroconductive member 50 has been changed. Here, FIGS. 44A through 47A are frontal cross-sectional views of the operating unit including the detecting element, FIGS. 44B through 47B are frontal views of the electroconductive member, FIGS. 44C through 47C are views of the electroconductive member from below, and FIGS. 44D through 47D are properties diagrams for analog signals output from the output terminal of the resistor.

The electroconductive members 50 shown in these drawings are of a form in each case wherein the area of contact with the resistor 40 is changed according to the pressure of contact with the resistor 40.

That is, the detecting element shown in FIGS. 44A–44D is formed so that the electroconductive member 50 has a trapezoidal longitudinal-sectional form (a conical trapezoid in the Figure). With an electroconductive member 50 formed such, the apex 50a of the electroconductive member 50 comes in contact with the resistor 40 in conjunction with the pressing operation of the operating button 221, but the apex 50a is a flat plane, so the resistance value greatly drops at the instant of contact, and there is rapid increase of output voltage (analog signal) as indicated by "a" in FIG. 44D, following which the output voltage continuously changes in a manner corresponding with the pressing force.

Accordingly, digital on/off action can be realized at the instant of the electroconductive member 50 making contact or breaking contact with the resistor 40. Now, though the example in FIGS. 44A–44D shows a conical trapezoid, other arrangements may be used for the electroconductive member 50, e.g., longitudinal-sectional trapezoid forms of pyramids with a triangular base, quadrangular base, or polygonal base.

The detecting element shown in FIGS. 45A–45D uses an electroconductive member 50 formed having vertical ribs 50b formed on the perimeter of a mountain-like formation. Though the electroconductive member 50 with a mountain-like form shown in FIG. 44 may buckle in the event that the direction of application of pressing force tilts away from the center axis, forming ribs 50b on the electroconductive member 50 as shown in FIGS. 45A–45D suppresses the danger of the electroconductive member 50 buckling. Combining this form with a cross-shaped operating member 211 such as shown in FIG. 39 in particular markedly manifests the effects thereof.

The detecting element shown in FIGS. 46A–46D has the surface of the electroconductive member 50 formed in a spherical shape. Buckling of the electroconductive member 50 can also be avoided by thus forming the electroconductive member 50 in a spherical shape.

Figure 47A:
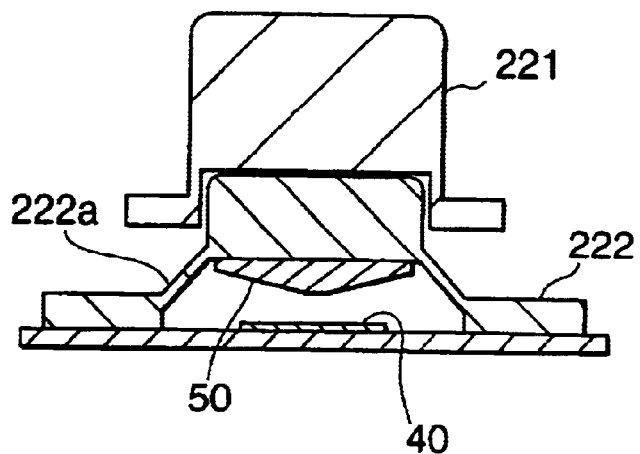
Figure 47B:
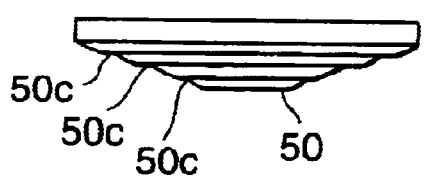
Figure 47C:
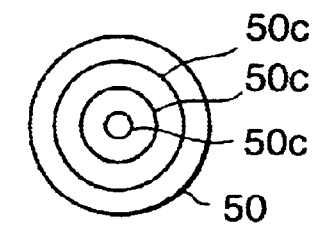
Figure 47D:
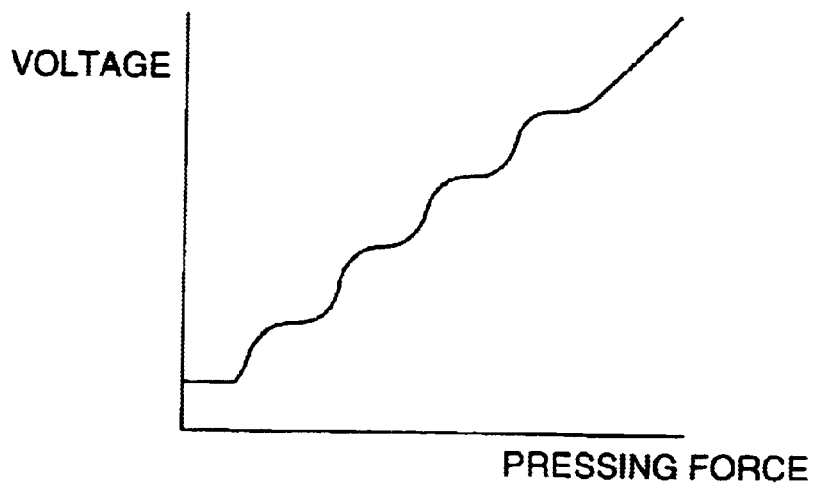

The detecting element shown in FIGS. 47A–47D has the electroconductive member 50 formed in a stepped mountain-like form wherein the cross-sectional area thereof becomes smaller in steps toward the apex facing the resistor 40. With an electroconductive member 50 of such a form, the amount of deformation increases as the pressing force increases, but in the processes, at the point that the step portion 50c comes into contact with the resistor 40, the contact area suddenly increases and the resistance value drops. Accordingly, the analog signals output from the output terminal of the resistor 40 change in steps, as shown in FIG. 47D. Accordingly, boundaries at which analog output rapidly changes can be easily recognized, and stable level division can be easily made. Also, the analog output changes in steps as to the pressing force, so the user can easily adjust the pressing force.

FIGS. 48 through 50 are diagrams illustrating a variation example of the detecting element wherein the form of the resistor 40 has been changed. In the drawings, FIGS. 48A through 50A are frontal cross-sectional views of the operating unit including the detecting element, FIGS. 48B through 50B are frontal views of the resistor, FIGS. 48C through 50C are views of the resistor from above, and FIGS. 48D through 50D are properties diagrams for analog signals output from the output terminal of the resistor.

Figure 48A:
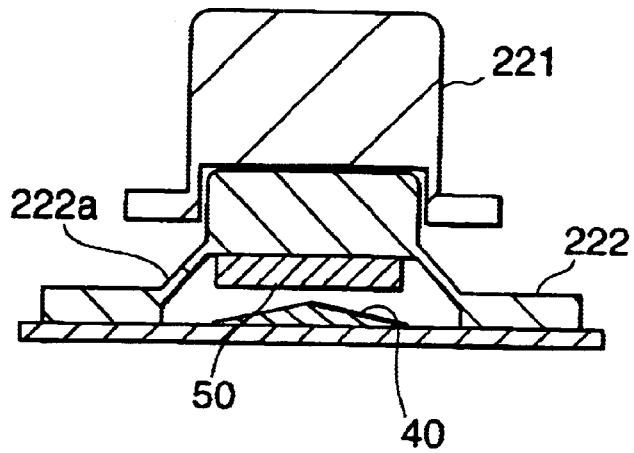
Figure 48B:
Figure 48C:
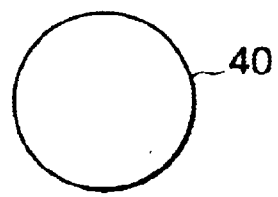
Figure 48D:
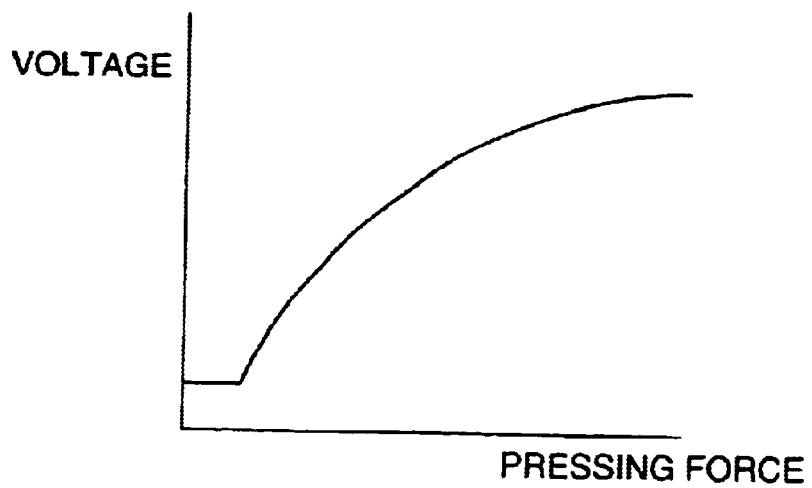
Figure 49A:
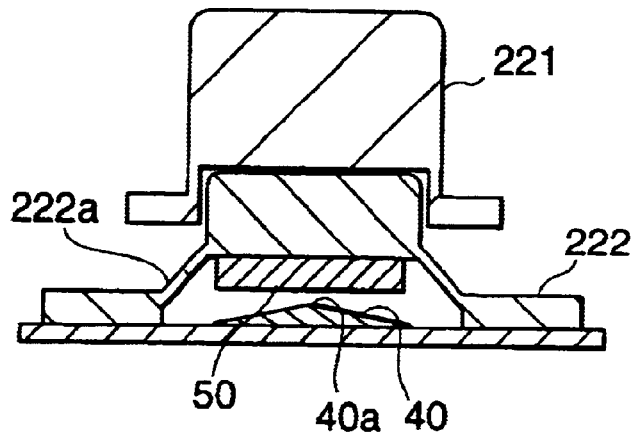
Figure 49B:
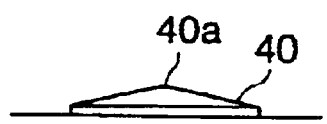
Figure 49C:
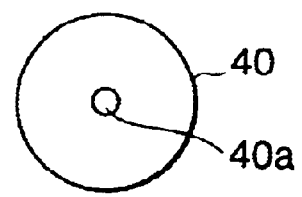
Figure 49D:
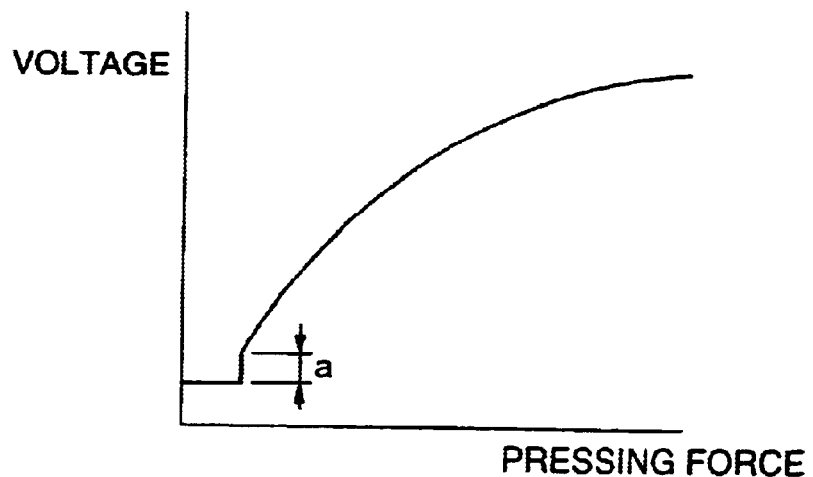
Figure 50A:
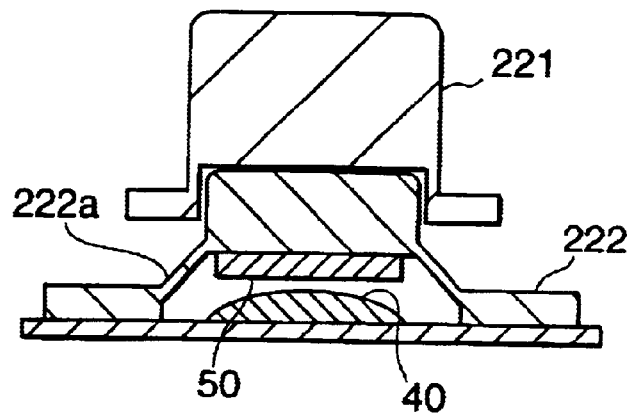
Figure 50B:
Figure 50C:
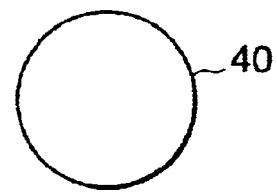
Figure 50D:
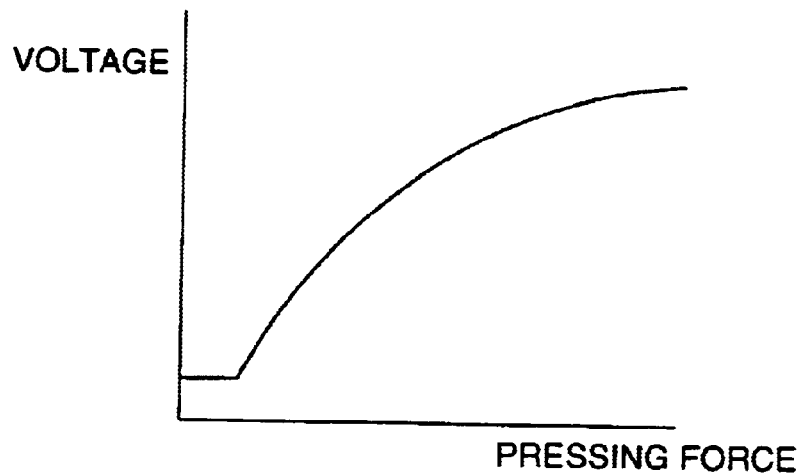

The resistors 40 shown in these drawings each has a form wherein the cross-sectional area decreases toward the apex facing the electroconductive member 50. With the detecting element shown in FIGS. 48A–48D, the resistor 40 is formed in a mountain-like shape, such that in the event that the electroconductive member 50 descends in conjunction with the operating button 221, the electroconductive member 50 comes into contact with the resistor 40 and deforms. The resistor 40 is formed in a mountain-like shape, so the area of contact with the electroconductive member 50 increases continuously in accordance with the pressing force, and analog signals output from the output terminal of the resistor 40 continuously change as shown in FIG. 48D.

The detecting element shown in FIGS. 49A–49D is formed so that the resistor 40 has a trapezoidal longitudinal-sectional form (a conical trapezoid in the Figure). With a resistor 40 formed such, the apex 40a of the resistor 40 first comes in contact with the electroconductive member 50 in conjunction with the pressing operation of the operating button 221, but the apex 40a is a flat plane, so there is rapid increase of output voltage as indicated by "a" in FIG. 49D at the instant of contact, following which the output voltage continuously changes in a manner corresponding with the pressing force.

Accordingly, digital on/off action can be realized at the instant of the electroconductive member 50 making contact or breaking contact with the resistor 40. Now, though the example in FIGS. 49A–49D shows a conical trapezoid, other arrangements may be used for the resistor 40, e.g., longitudinal-sectional trapezoid forms of pyramids with a triangular base, quadrangular base, or polygonal base.

The detecting element shown in FIGS. 50A–50D has the surface of the resistor 40 formed in a spherical shape. Thus forming the resistor 40 in a spherical shape provides properties approximately the same as those of the detecting element shown in FIGS. 46A–46D.

Figure 51A:
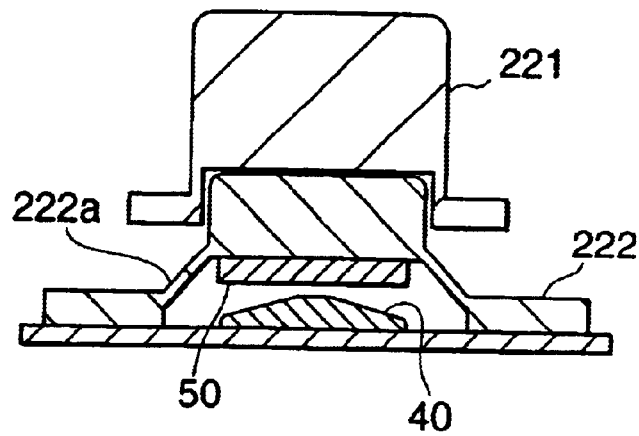
Figure 51B:
Figure 51C:
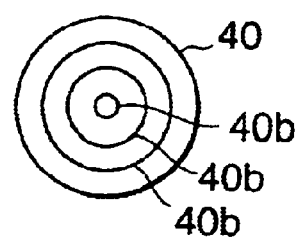
Figure 51D:
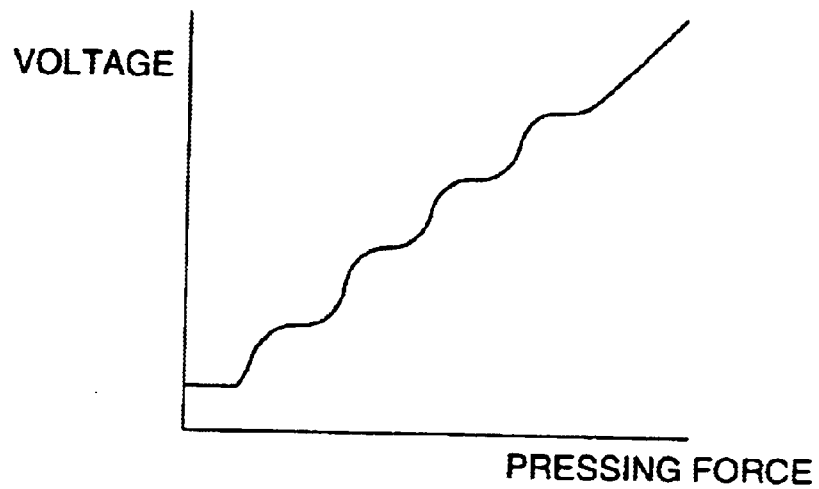

The detecting element shown in FIGS. 51A–51D has the resistor 40 formed in a stepped mountain-like form wherein the cross-sectional area thereof becomes smaller in steps toward the apex thereof facing the electroconductive member 50. In the process of a resistor 40 of such form coming into contact while deforming electroconductive member 50 in conjunction with the pressing operation, and at the point that the step portion 40c of the resistor 40 comes into contact with the electroconductive member 50, the contact area suddenly increases and the resistance value drops. Accordingly, the analog signals output from the output terminal of the resistor 40 change in steps, as shown in FIG. 51D. Accordingly, boundaries at which analog signals rapidly change can be easily recognized, and stable level division can be easily made. Also, the analog output changes in steps as to the pressing force, so the user can easily adjust the pressing force.

Figure 52A:
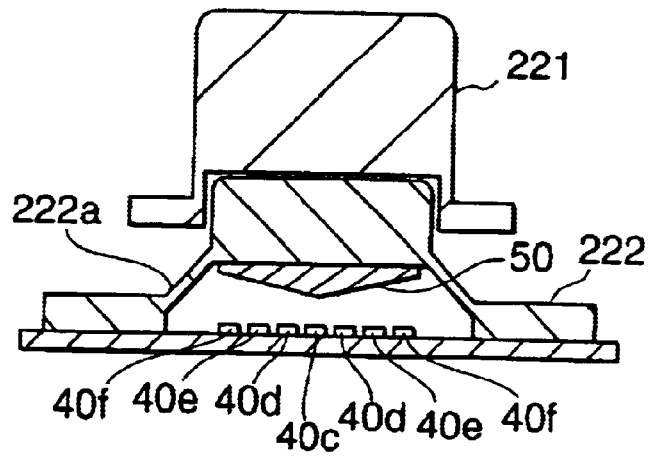
Figure 52B:
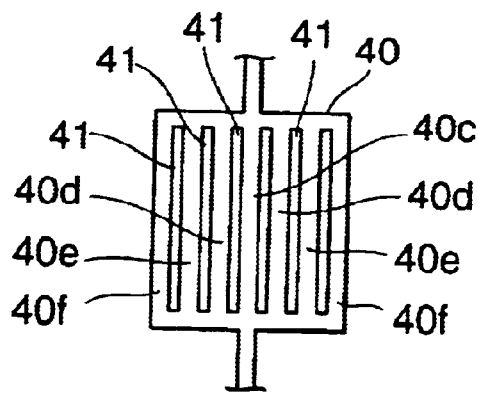
Figure 52C:
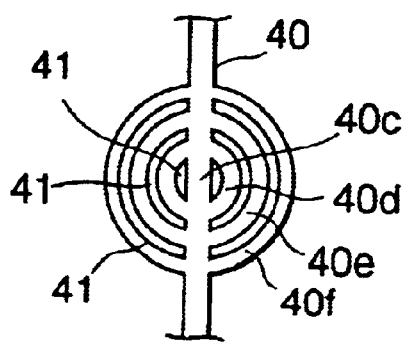
Figure 52D:
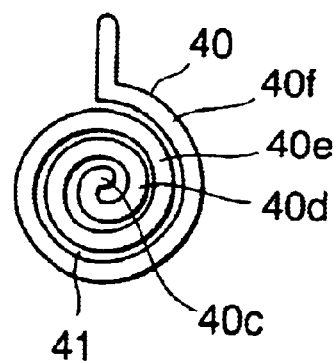

The detecting element shown in FIGS. 52A–52D has the electroconductive member 50 formed in a mountain-like form and the contact area of the resistor 40 divided by gaps 41, so as to increase the contact area in steps in conjunction with the deformation of the electroconductive member 50. More specifically, the resistor 40 is formed as shown in FIGS. 52B–52D.

With the detecting device of the configuration shown in the Figure, the apex of the electroconductive member 50 first comes into contact with the center portion 40c of the resistor 40, in conjunction with the pressing operation of the operating button 221. Subsequently, as the electroconductive member 50 deforms with the increasing pressing force, the contact area with the electroconductive member 50 increases in steps in the order of the perimeter portions 40d, 40e, and 40f of the resistor 40, and the resistance value decreases accordingly.

The portions 40c through 40f of the resistor 40 are divided by the gaps 41, so as long as the electroconductive member 50 passes through the gaps 41, there is no change in the resistance value, and accordingly the output voltage (analog signal) is generally constant.

Accordingly, the analog signals output from the output terminal of the resistor 40 change in steps, such as shown in FIG. 51D. Accordingly, boundaries at which analog output rapidly changes can be easily recognized, and stable level division can be easily made.

Figure 53:
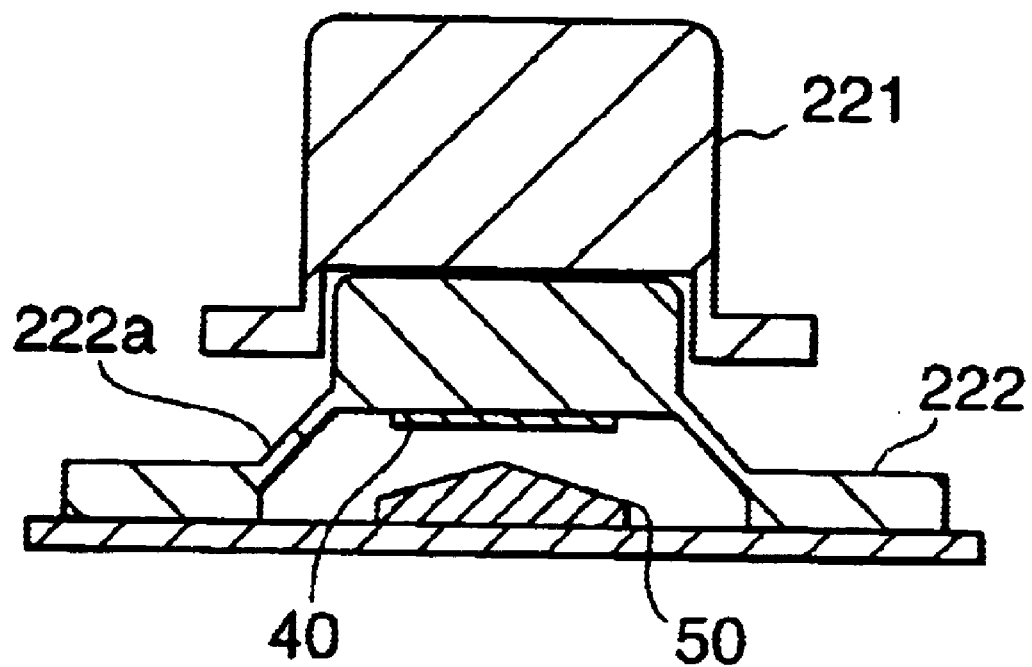
FIG. 53 is a frontal cross-sectional view of another variation example of the detecting element.

Now, in the detecting elements of the above-described configurations, the positions of the resistor 40 and electroconductive member 50 in the operating unit may be reversed. For example, as shown in FIG. 53, an arrangement may be made wherein the resistor 40 is applied by adhesion to the inner top surface of the elastic portion 222a formed on the elastic member 222, and the electroconductive member 50 is placed at a position facing the resistor 40, yielding the same effects and advantages as the above-described detecting elements.

It should be noted that the present invention is by no means restricted by the above-described embodiments.

For example, the operating device according to the present invention is not restricted to application to an operating device 200 for use with a video game apparatus as shown in FIG. 2; rather, it is needless to say that the present invention may be applied to various types of operating devices wherein capabilities can be improved by enabling digital operation and analog operation.

According to the present invention as described above, the configuration is such that with the pressing operation of a single operator, multi-bit digital signals enabling analog control are output from multi-bit digital signal output means, and on the other hand, single-bit digital signals enabling digital control are output from binary digital signal output means, so both digital operation and analog operation can be realized with a single operator, simply by selecting between these digital signals with switching means and outputting the same.

What is claimed is:

1. An operating device, comprising:
   an operator operable by pressing;
   a detecting element for outputting analog signals corresponding to the pressing operation of said operator;
   first digital signal output means for converting analog signals output from said detecting element in response to the pressing operation of said operator into digital signals comprising multiple bits according to the output level thereof;
   second digital signal output means for outputting digital signals comprising single bit according to change in the analog signals output from said detecting element; and
   switching means for switching output between digital signals output from said first digital signal output means and digital signals output from said second digital signal output means.

2. An operating device according to claim 1, wherein said detecting element is a pressure-sensitive element placed at a position where pressing force acting upon said operator is transferred.

3. An operating device according to claim 1, wherein said detecting element comprises:
   an electroconductive member which moves in conjunction with said operator and has elasticity; and
   a resistor placed at the position where said electroconductive member makes and breaks contact;
   and wherein said resistor outputs analog signals according to the area of contact of said electroconductive member.

4. An operating device according to claim 1, wherein said detecting element comprises:
   a resistor which moves in conjunction with said operator; and
   an electroconductive member which has elasticity and is placed at the position where said resistor makes and breaks contact;
   and wherein said resistor outputs analog signals according to the area of contact of said electroconductive member.

5. An operating device according to claims 3 or 4, wherein said electroconductive member is of a configuration which deforms at the surface thereof facing said resistor according to the contact pressure applied thereupon with said resistor, such that the area of contact with said resistor changes.

6. An operating device according to claim 5, wherein said electroconductive member is formed so as to have a mountain-shaped longitudinal-sectional form.

7. An operating device according to claim 5, wherein said electroconductive member is formed so as to have a trapezoidal longitudinal-sectional form.

8. An operating device according to claim 5, wherein said electroconductive member is formed so as to have a shape wherein the cross-sectional area thereof becomes smaller in steps toward the apex facing said resistor.

9. An operating device according to claim 5, wherein said electroconductive member is formed such that the surface facing said resistor has a spherical shape.

10. An operating device according to claim 3 or 4, wherein said resistor is formed so as to have a shape wherein the cross-sectional area thereof becomes smaller toward the apex facing said electroconductive member.

11. An operating device according to claim 10, wherein said resistor is formed so as to have a mountain-shaped longitudinal-sectional form.

12. An operating device according to claim 10, wherein said resistor is formed so as to have a trapezoidal longitudinal-sectional form.

13. An operating device according to claim 10, wherein said resistor is formed such that the surface facing said electroconductive member has a spherical shape.

14. An operating device according to claim 3 or 4, wherein said resistor is formed so as to have a shape wherein the cross-sectional area thereof becomes smaller in steps toward the apex facing said electroconductive member.

15. An operating device according to claims 3 or 4, wherein said electroconductive member is of a configuration which deforms according to the contact pressure applied thereupon with said resistor, such that the area of contact with said resistor changes;
   and wherein said resistor divides the contact area of said electroconductive member by gaps, and is configured so as to increase in steps the contact area of said electroconductive member in conjunction with the deformation thereof.

* * * * *